United States Patent
Kitagawa et al.

(10) Patent No.: US 7,305,933 B2
(45) Date of Patent: Dec. 11, 2007

(54) SEASONING APPARATUS, AND PRODUCT MANUFACTURING SYSTEM PROVIDED THEREWITH

(75) Inventors: Kazumi Kitagawa, Ritto (JP); Yasushi Yakushigawa, Ritto (JP); Takao Yoshikawa, Ritto (JP); Akira Kosaka, Kobe (JP)

(73) Assignee: Ishida Co., Ltd., Kyoto (JP)

( * ) Notice: Subject to any disclaimer, the term of this patent is extended or adjusted under 35 U.S.C. 154(b) by 10 days.

(21) Appl. No.: 10/488,031

(22) PCT Filed: May 28, 2003

(86) PCT No.: PCT/JP03/06717

§ 371 (c)(1),
(2), (4) Date: Feb. 27, 2004

(87) PCT Pub. No.: WO03/099032

PCT Pub. Date: Dec. 4, 2003

(65) Prior Publication Data

US 2004/0244681 A1    Dec. 9, 2004

(30) Foreign Application Priority Data

May 29, 2002  (JP) ............................. 2002-155000
Nov. 21, 2002 (JP) ............................. 2002-337574
Nov. 21, 2002 (JP) ............................. 2002-337575

(51) Int. Cl.
*B05C 19/04* (2006.01)
*B05C 19/06* (2006.01)
*B05C 13/02* (2006.01)

(52) U.S. Cl. ................. 118/19; 118/24; 118/303; 118/416; 118/686; 118/620; 118/621; 177/25.18; 53/111 R

(58) Field of Classification Search ............. 118/19, 118/24, 303, 416, 686, 50.1, 620, 621; 99/494; 426/295, 289, 309, 302; 427/242, 425; 222/56, 222/58, 77; 177/25.18; 53/111 R; 366/156.1; 198/671, 675, 550.6
See application file for complete search history.

(56) References Cited

U.S. PATENT DOCUMENTS 3,152,010 A    10/1964  Case
3,368,363 A *  2/1968   Alaburda et al. .............. 62/64

(Continued)

FOREIGN PATENT DOCUMENTS

JP    55-124453 A    9/1980

(Continued)

*Primary Examiner*—Laura Edwards
(74) *Attorney, Agent, or Firm*—Global IP Counselors, LLP

(57) ABSTRACT

The present invention provides a seasoning apparatus capable of evenly seasoning each individual article, without seasoning any too heavily or too lightly. Therein, a screw having a helical blade is installed in a tube. The helical blade provides partitions that are provided upright between an article supply port and a discharge port. An article group, before seasoning, is accommodated in a section partitioned by the partitions, the motor rotates the screw, and the article group is transported from the supply port to the discharge port. Therein, each article group is transported to the discharge port separated from other article groups, and each individual article in the article group is seasoned evenly with the same seasoning processing time and the same seasoning supply ratio. In addition, the constitution of the seasoning apparatus is simplified because the screw simultaneously serves the two functions of separating and transporting the article groups.

32 Claims, 38 Drawing Sheets

U.S. PATENT DOCUMENTS

| | | | |
|---|---|---|---|
| 3,536,035 A * | 10/1970 | Watkins | 118/24 |
| 3,648,596 A | 3/1972 | Zito | |
| 3,771,696 A * | 11/1973 | Yoshioka | 222/199 |
| 4,543,907 A | 10/1985 | Fowler | |
| 4,548,286 A * | 10/1985 | Sashiki et al. | 177/1 |
| 4,658,708 A * | 4/1987 | Rastoin | 99/323.9 |
| 5,385,086 A * | 1/1995 | Burns et al. | 99/451 |
| 5,401,534 A | 3/1995 | Bourreau et al. | 427/212 |
| 5,554,221 A * | 9/1996 | Center et al. | 118/19 |
| 6,331,323 B1 * | 12/2001 | Adler-Nissen et al. | 426/523 |
| 6,588,363 B1 * | 7/2003 | Burke et al. | 118/13 |

FOREIGN PATENT DOCUMENTS

| | | |
|---|---|---|
| JP | 58-13085 | 1/1983 |
| JP | 63-283541 A | 11/1988 |
| JP | 2535580 | 8/1992 |
| JP | 9-028298 A | 2/1997 |
| WO | WO-94/18858 A1 | 9/1994 |
| WO | WO-02/41715 A2 | 5/2002 |

* cited by examiner

Fig. 20

| ROTATION NO. | ARTICLE DISCHARGE (#15) | SECOND SEASONING (#14) | AGITATE (#13) | FIRST SEASONING (#12) | ARTICLE SUPPLY (#11) |
|---|---|---|---|---|---|
| 1 | ... | B | C | D | Ⓐ |
| 2 | B | C | D | A | ... |
| 3 | ... | ... | C | D | A |
| 4 | ... | C | D | A | Ⓑ |
| 5 | C | D | A | B | ... |
| 6 | ... | ... | D | A | B |
| 7 | ... | D | A | B | Ⓒ |
| 8 | D | A | B | C | ... |
| 9 | ... | ... | A | B | C |
| 10 | ... | A | B | C | Ⓓ |
| 11 | A | B | C | D | ... |
| 12 | ... | ... | B | C | D |
| 13 | ... | B | C | D | Ⓐ |

Fig. 23

| ROTATION NO. | ARTICLE DISCHARGE (#14) | SECOND SEASONING (#13) | FIRST SEASONING (#12) | ARTICLE SUPPLY (#11) |
|---|---|---|---|---|
| 1 | ... | B | C | Ⓐ |
| 2 | B | C | A | ... |
| 3 | ... | ... | C | A |
| 4 | ... | C | A | Ⓑ |
| 5 | C | A | B | ... |
| 6 | ... | ... | A | B |
| 7 | ... | A | B | Ⓒ |
| 8 | A | B | C | ... |
| 9 | ... | ... | B | C |
| 10 | ... | B | C | Ⓐ |

*Fig. 24*

| ROTATION NO. | ARTICLE DISCHARGE (#14) | AGITATE (#13) | FIRST SEASONING (#12) | ARTICLE SUPPLY (#11) |
|---|---|---|---|---|
| 1 | ... | B | C | Ⓐ |
| 2 | B | C | A̲ | ... |
| 3 | ... | ... | C | A |
| 4 | ... | C | A̲ | Ⓑ |
| 5 | C | A | B | ... |
| 6 | ... | ... | A̲ | B |
| 7 | ... | A | B | Ⓒ |
| 8 | A | B | C | ... |
| 9 | ... | ... | B | C |
| 10 | ... | B | C | Ⓐ |

Fig. 38
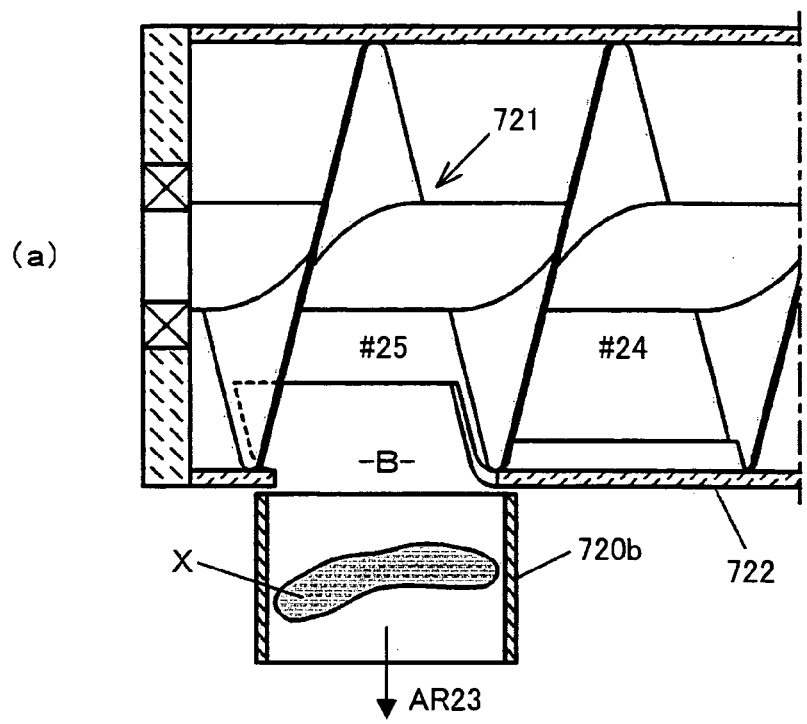
(a)
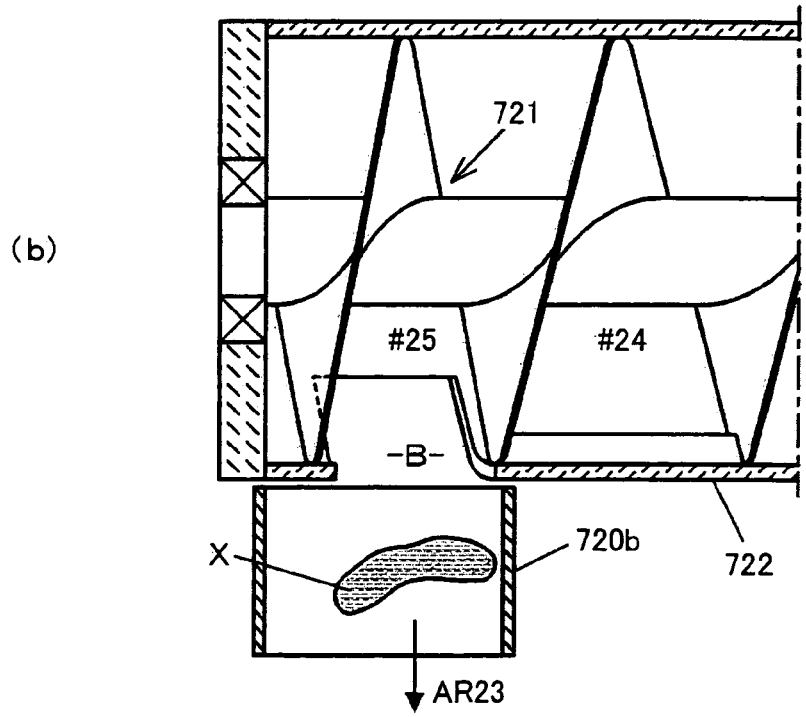
(b)

SEASONING APPARATUS, AND PRODUCT MANUFACTURING SYSTEM PROVIDED THEREWITH

FIELD OF THE INVENTION

The present invention relates to foodstuffs manufacturing, such as the seasoning and transport of articles like snacks.

RELATED ART

An example of a production line for snacks like potato chips is disclosed in Examined Japanese Patent Publication No. 4-35132, which discloses a seasoning process implemented using a tubular tumbler with an opening at both ends. Namely, the tumbler is arranged so that the shaft axis is inclined at a prescribed angle, rather than being horizontal, the tumbler is made to rotate around the shaft, and articles are supplied therein from the upper opening. While the articles bounce around due to the rotation of the tumbler, the incline of the tumbler moves the articles downward, and the articles exit the tumbler from the lower opening. At that time, articles are supplied into the tumbler from the upper opening along with seasoning of a quantity commensurate with the quantity of supplied articles. From the time the articles enter the tumbler until the articles exit the tumbler, the articles bounce around, during which time the articles are agitated with the seasoning, thereby becoming seasoned. Moreover, the proportion of seasoning supplied to the articles, i.e., the mix proportion, is optimally adjusted, thereby seasoning the articles to just the right level.

In the above related art, the tumbler is arranged upstream of the weighing apparatus, and the articles seasoned by the tumbler are accordingly supplied to the weighing apparatus. In this case, the tumbler feeds seasoned groups of articles to the weighing apparatus without interruption so that a shortfall of articles does not occur at the weighing apparatus. In response to the processing performance of the weighing apparatus, or the processing performance of the packaging apparatus arranged further downstream of the weighing apparatus, groups of articles, for which seasoning has been completed, continuously exit from the lower opening of the tumbler, and groups of articles that have not been seasoned and seasoning continuously enter into the upper opening of the tumbler. In other words, the state is such that groups of articles continuously flow inside the tumbler from the upstream to the downstream of the tumbler. Further, the quantity of seasoning supplied is commensurate with the quantity of articles supplied to the tumbler; the seasoning supply quantity is large when the article supply quantity is large, the seasoning supply quantity is small when the article supply quantity is small, and the seasoning supply quantity is set so that the prescribed optimal mix proportion is always maintained.

Incidentally, because there is thus a continuous entry and exit of articles into and out of the tumbler, wherein seasoning is performed, the quantity of articles present in the tumbler, and the time that each article stays in the tumbler, are not constant. Sometimes, the quantity of the articles in the tumbler is decreased, or the staying time of the articles is increased, thereby producing heavily seasoned articles. In addition, sometimes the quantity of articles in the tumbler is increased, or the staying time of the articles is decreased, thereby producing lightly seasoned articles. The aforementioned publication mentions that the seasoning processing time is adjusted by adjusting the angle of inclination of the tumbler. However, that mention is from the overall, average perspective of one cluster of an article group; given the use of a tumbler in the aforementioned structure, it is virtually impossible to adjust the seasoning processing time for each individual article in the tumbler. This is because the tumbler has a structure such that it is possible for articles to exit freely from the lower opening of the tumbler at any time; consequently, there will be articles that will surely exit earlier than others, while there will be other articles that will surely exit later than others. As a result, for example, articles that exit earlier from the tumbler have a short staying time in the tumbler, i.e., the seasoning processing time (time in contact with the seasoning) is short, and therefore the seasoning lightens. On the other hand, the quantity of articles remaining in the tumbler decreases by the quantity of articles that exited earlier in this manner (the seasoning ratio increases), and the seasoning therefore becomes heavy.

In other words, in the related art that uses a tumbler having a tubular structure with openings at both ends as mentioned above, the supply ratio (mixing ratio) of articles and seasoning is maintained at a prescribed optimal ratio if the overall flow rate (transport rate) of one particular cluster of a group of articles is taken as an average. However, it is fundamentally unavoidable that, within the articles of that single group, there will be some unevenness in the seasoning, some being heavily seasoned and some being lightly seasoned. Accordingly, it is difficult to uniformly season each and every article at a prescribed optimal ratio.

SUMMARY OF THE INVENTION

One object of the present invention is, when seasoning articles during transport, to evenly season each and every article at a prescribed optimal mixing ratio, without seasoning any articles either too heavily or too lightly.

The seasoning apparatus as recited in the first aspect of the present invention is a seasoning apparatus that transports groups of articles which are supplied from an upstream apparatus to a downstream apparatus, including transport means and seasoning feeding means. The transport means has a supply part and a discharge part and accommodates each article group supplied at the supply part in a separate section, and transports each of the groups of articles to the discharge part. The seasoning feeding means supplies seasoning to each of the groups of articles.

According to the present invention, the article group supplied at the supply part and the seasoning supplied by the seasoning feeding means are bundled together as a single unit, and can be transported to the discharge part separated and isolated from other article groups. In other words, during the interval from when a single group of articles and seasoning are supplied to the seasoning apparatus until they are discharged, the exit of existing articles and the entrance of new articles are prohibited. Once a group of articles and seasoning are supplied to the seasoning apparatus (regardless of in what order they are supplied), they do not exit from, nor are new articles or seasoning added to, the seasoning apparatus, even partially, while they are being transported. The article group and seasoning initially supplied to the seasoning apparatus as a single unit are transported toward the discharge part while maintaining that state. Accordingly, the staying time inside the seasoning apparatus, i.e., the seasoning processing time (contact time with the seasoning) is the same for each and every article in a single group of articles and, in that case, the supply ratio and the mixing ratio with the seasoning are maintained at the same level. Consequently, each and every individual article can be evenly seasoned, without seasoning too heavily or too lightly. Further, each and every individual article can be evenly seasoned at the optimal ratio if the article group and seasoning are supplied at a prescribed optimal ratio initially.

The seasoning apparatus as recited in the second aspect of the present invention is the seasoning apparatus as recited in the first aspect, wherein the transport means has a plurality of partitions that partition the sections. The plurality of partitions are provided and arranged between the supply part and the discharge part. In addition, the transport means transports the groups of articles by moving the partitions from the supply part side to the discharge part side with the groups of articles accommodated in the section.

Because the present invention is constituted such that the article group is transported by the movement of partitions, the constitution of the seasoning apparatus is simplified. In other words, the article group is isolated and accommodated in the section partitioned by the partitions, and the section is moved by the movement of the partitions, thereby transporting the article group to the discharge part with the article group isolated as is. Thus, the partitions simultaneously serve the two overlapping functions of separating and transporting, simplifying the constitution of the seasoning apparatus.

The seasoning apparatus as recited in the third aspect of the present invention is the seasoning apparatus as recited in the second aspect, wherein the transport means has a screw, a tube, and screw rotating means. The screw extends between the supply part and the discharge part. The tube has the screw installed therein. The drive source rotates the screw about a rotary shaft. In addition, the screw has a helical blade that forms the plurality of partitions. The section is a space partitioned by the helical blade in the tube.

According to the present invention, the constitution of the transport means is further embodied, and the movement of the partitions is achieved by the rotation of the screw. In other words, the helical blade of the screw forms a plurality of partitions, and a plurality of sections (the number of which depends upon the number of turns of the helical blade) partitioned by the helical blade are formed along the axial direction inside the tube. When a single group of articles and seasoning are supplied into a section, they are separated and isolated from other groups, and they are bundled together as a single unit, wherein the exit of existing articles and the entrance of new articles are prohibited while being transported. Further, if the screw is rotated about an axis in the tube, then the rotation of the helical blade moves the partitions and sections together in the axial direction. In this case, the direction of movement can be made from the supply part side to the discharge part side by selecting the rotational direction, thereby making it possible to transport the article group from the supply part to the discharge part with the article group separated as is.

Moreover, a plurality of sections can be provided, all at once, just by using one set comprising a screw and a tube, and the plurality of article groups separately accommodated in each section respectively can be simultaneously transported in parallel to the discharge part, one after the other.

The seasoning apparatus as recited in the fourth aspect of the present invention is the seasoning apparatus as recited in the third aspect, wherein the screw extends approximately horizontally between the supply part and the discharge part.

In the present invention, because the screw and the tube, which are relatively long objects, are arranged so that they extend approximately in the horizontal direction rather than in the vertical direction, the height of the seasoning apparatus is kept short. In addition, the article group supplied to the seasoning apparatus is spread thinly in the horizontal direction and does not form a thick cluster, the seasoning satisfactorily contacts the articles present in the cluster of the article group, thereby achieving satisfactory seasoning. In contrast, because the tumbler used in the related art transports articles by freely dropping them and freely sliding them downward of their own weight, the tumbler would not serve the function of transporting if it were arranged horizontally, and therefore it is inevitably necessary to arrange the tumbler somewhat upright. As a result, the height of the tumbler in the vertical direction tends to increase, and articles inside the cluster of the article group tend to be difficult to be exposed to the exterior (the surface) of the cluster, therefore tending to make seasoning difficult.

The seasoning apparatus as recited in the fifth aspect of the present invention is the seasoning apparatus as recited in the fourth aspect, wherein each of the sections is a space lower than the rotary shaft of the screw.

Within the helical space, the present invention uses the space below the rotary shaft of the screw as a section that accommodates the article group and seasoning, isolated from other article groups, taking into consideration: the fact that each of the individual spaces partitioned by the helical blade are not closed but rather are mutually connected helically; the fact that the article group and seasoning collect in the lower part inside the tube; and the fact that the article group and seasoning are blocked by the helical blade at least in the portion below the rotary shaft of the screw, and cannot go back and forth between the adjacent section.

The seasoning apparatus as recited in the sixth aspect of the present invention is the seasoning apparatus as recited in one of the third through fifth aspects, further including comprising a discharge port and a tube rotating means. The discharge port is provided at the peripheral surface of the tube in the discharge part. The tube rotating means rotates the tube about an axis. In addition, the tube rotating means controls the discharge of each of the groups of articles by selectively arranging, by the rotation of the tube, the discharge port at a lower article drop discharge position.

The present invention forms a discharge port in the tube wherein the screw is installed, and rotates the tube, thereby controlling the discharge of the seasoned article group by changing the position of the discharge port. Consequently, it is possible to arbitrarily switch between the drop-discharge state (because the screw and the tube extend in the approximately horizontal direction, the article group is dropped and discharged from the seasoning apparatus when the discharge port is positioned therebelow) and the non-discharge state (positions other than below) of the article group, e.g., serving the same function as a timing hopper. Moreover, because this configuration is integrated with the seasoning apparatus, it is more compact than separately providing a regular timing hopper.

Furthermore, in the case where the article group is transported by the rotation of the screw, article groups inside adjacent sections successively arriving at the discharge part will unfortunately be continuously discharged without any break if the discharge port is continuously positioned below. In contrast, the present invention isolates each individual article group into adjacent sections by switching the discharge port between both the discharge position (lower position) and other positions (non-discharge positions) (e.g., switching the discharge port to a non-discharge position when the next section arrives at the discharge part), making it possible to discharge from the seasoning apparatus article groups one at a time, timewise sectioned off from adjacent article groups. Consequently, the present invention enables, for example, the discharge of the article group from the discharge part while maintaining the quantity of the article group supplied at the supply part unchanged.

The seasoning apparatus as recited in the seventh aspect is the seasoning apparatus as recited in the fourth or fifth aspect, further including a supply port, and a tube rotating means. The supply port is provided at the peripheral surface of the tube in the supply part. The tube rotating means rotates the tube about an axis. In addition, the tube rotating means controls the supply of each of the groups of articles by selectively arranging, by the rotation of the tube, the supply port at an upper article drop supply position.

In a case where the article group is transported by the rotation of the screw, there is a possibility in the present invention that an article group will be supplied straddling the helical blade as it successively passes by the supply port if the supply port is continuously positioned above (because the screw and the tube extend approximately in the horizontal direction, there is a possibility that an article group will be dropped and supplied to the seasoning apparatus at any time via the supply port if the supply port is continuously positioned above). If this occurs, a single unit of an article group intended to be accommodated in a single section will unfortunately be divided and accommodated in two adjacent sections disordering the control of the quantity of the article group in each section.

In contrast, the present invention avoids the mistaken supply of a single unit of an article group straddling a plurality of adjacent sections by switching the supply port between both a supply position (upper position) and other positions (non-supply positions) (e.g., switching the supply port to the non-supply position when the helical blade of the next section traverses the supply port).

The seasoning apparatus as recited in the eight aspect of the present invention is the seasoning apparatus as recited in the fourth or fifth aspect, further including a discharge port, a supply port, and a tube rotating means. The discharge port is provided at the peripheral surface of the tube in the discharge part. The supply port is provided at the peripheral surface of the tube in the supply part. The tube rotating means rotates the tube about an axis. In addition, the tube rotating means simultaneously controls the discharge and supply of each of the groups of articles by selectively arranging, by the rotation of the tube, the discharge port at the lower article drop discharge position, and selectively arranging the supply port at an upper article drop supply position, respectively.

The present invention prevents the unnecessary complication of the rotational control of the tube by achieving both the discharge control of the article group as recited in the sixth aspect of the present invention and the supply control of the article group as recited in the seventh aspect, as well as by simultaneously changing the position of the discharge port and the position of the supply port (concurrently for both).

The seasoning apparatus as recited in the ninth aspect is the seasoning apparatus as recited in any one of the first through eighth aspects, further including an agitating means. The agitating means agitates each of the groups of articles and seasoning while the article group supplied with seasoning is being transported to the discharge part.

In the present invention, the article group supplied to the seasoning apparatus is agitated with the seasoning while being transported, thereby reliably seasoning the article group. In this case, because an article group and seasoning are agitated in each section in a state wherein they are grouped into single units, each and every individual article is reliably flavored without the exit of an existing, or entrance of a new, article group or seasoning.

The seasoning apparatus as recited in the tenth aspect of the present invention is the seasoning apparatus as recited in any one of the fourth through eighth aspects, further including an agitating means. The agitating means agitates each of the groups of articles and seasoning while the article group supplied with seasoning is being transported to the discharge part. In addition, the agitating means includes a comb-up member provided on the helical blade. Further, the agitating means performs agitation of the article group and seasoning collected at the bottom part of the tube by combing the article group and seasoning upward with the comb-up member during rotation of the screw. The screw rotating means reduces the rotational speed of the screw when the comb-up member performs comb-up.

The present invention embodies the constitution of an agitating means for the case in which the transport means includes a screw, and agitates the article group and seasoning collected at the bottom part in a section by combing upward with the comb-up member provided on the helical blade of the screw. As a result, the articles are rolled around, and a uniform seasoning is achieved without any unevenness, even among individual articles that are at differing regions of a single article. Moreover, because the combing up (agitation) of the article group and seasoning is performed slowly over time, even more uniform seasoning is achieved without any unevenness. In addition, the present invention prevents problems such as the comb-up member kicking up articles at a high speed and transferring the articles to an adjacent section.

The seasoning apparatus as recited in the eleventh aspect of the present invention is the seasoning apparatus as recited in any one of the sixth through eighth aspects, further including an agitating means. The agitating means agitates each of the groups of articles and seasoning while the article group supplied with seasoning is being transported to the discharge part. In addition, the agitating means includes a comb-up member provided on the helical blade. Further, the agitating means performs agitation of the article group and seasoning collected at the bottom part of the tube by combing the article group and seasoning upward with the comb-up member during rotation of the screw. The screw rotating means reduces the rotational speed of the screw when the comb-up member performs comb-up. The tube rotating means changes the position of the discharge port, so as to synchronize with the reduction of the rotational speed of the screw by the screw rotating means when the comb-up member performs comb-up.

The present invention further embodies the operation of the tube rotating means for the case in which the positions of the discharge port and the supply port are changed by the rotation of the tube. The present invention changes the positions of the discharge port and supply port synchronized to the reduction of the rotational speed of the screw in order to perform agitation. As a result, it suffices to change the positions of the discharge port and supply port (rotational speed of the tube) at a low speed. For example, it is possible to reverse the rotational direction of the tube with a small load, and it is possible to start rotating a stopped tube with a small load.

The seasoning apparatus as recited in the twelfth aspect of the present invention is the seasoning apparatus as recited in any one of the third through eleventh aspects, wherein the tube is transparent.

The present invention enables the external observation of the contents of the tube or the seasoning apparatus. As a result, the progress status of the work can be confirmed, and it can be determined whether the work is proceeding correctly or encountering a failure. In addition, if, for example, the supply of the article group and the supply of the seasoning are performed manually, then it is possible to time each supply well because of the relationship between the screw and the helical blade.

The seasoning apparatus as recited in the thirteenth aspect of the present invention is the seasoning apparatus as recited in any one of the first through twelfth aspects, further including an electric charging means. The electric charging means electrically charges at least one of the groups of articles and the seasoning.

Because the present invention adheres the seasoning to the article group using an electrostatic function, the seasoning process is completed in a short time period. In addition, uniform seasoning is implemented without any unevenness, and the yield in adhering the seasoning increases.

The seasoning apparatus as recited in the fourteenth aspect of the present invention is the seasoning apparatus as recited in the third aspect, further including an electric charging means. The electric charging means electrically charges at least one of the groups of articles and the seasoning. The tube is an electrical insulator.

The tube of the present invention is an electrical insulator, i.e., a dielectric, and therefore the tube does not conduct electricity. As a result, the adherence of the electrically charged article group or seasoning to the tube is suppressed, and the article group and seasoning are well interspersed, thereby making satisfactory contact and satisfactorily agitating the article and seasoning together. In addition, the seasoning does not, for example, become lumpy or accumulate on the inner surface of the tube, thereby inhibiting problems such as those lumps locally adhering to the articles.

The seasoning apparatus as recited in the fifteenth aspect of the present invention is the seasoning apparatus as recited in the first aspect, wherein the seasoning feeding means supplies a quantity of seasoning corresponding to the quantity of each of the groups of articles.

In the present invention, the quantity of seasoning supplied corresponds to the quantity of the article group supplied to the seasoning apparatus; if the quantity of articles supplied is large, then the quantity of seasoning supplied is large, and if the quantity of articles is small, then the quantity of seasoning is likewise small, thereby continuously maintaining a prescribed optimal ratio. Furthermore, each and every individual article in every article group or every section is seasoned just right.

Furthermore, the quantity of the article group may be the detected by the weight of the article group, or may be a preset fixed quantity (set value).

The seasoning apparatus as recited in the sixteenth aspect of the present invention is the seasoning apparatus as recited in the first aspect, further including a control means. The control means controls the transport means so that the article group supplied with seasoning is reciprocatingly moved to the discharge part side and the supply part side.

In the present invention, because the article group is reciprocatingly moved to the discharge part side and the supply part side while the article group supplied with seasoning is being transported, the total transport distance of the article group and the total movement distance of the section are lengthened, and the staying time and contact time of the article group and the seasoning can thereby be sufficiently lengthened. As a result, the staying time and agitation time of the article group with the seasoning are satisfied and uniform seasoning is reliably implemented with hardly any heavily seasoned parts or lightly seasoned parts. Moreover, the article group and seasoning, or the section, were made to move reciprocatingly as an expedient for that purpose, e.g., even if the total transport distance and movement distance lengthen, the apparent required transport distance and movement distance do not lengthen, and it is consequently possible to avoid lengthening of the seasoning apparatus. As a result, there is no need to struggle with the issue of the installation location of the seasoning apparatus because it does not require a large area.

The seasoning apparatus as recited in the seventeenth aspect of the present invention is the seasoning apparatus as recited in the sixteenth aspect, wherein the transport means has a screw, a tube, and screw rotating means. The screw extends between the supply part and the discharge part. The tube has the screw installed therein. The drive source rotates the screw about a rotary shaft. In addition, the screw has a helical blade that forms a plurality of partitions. The control means rotates the screw normally and reversely by controlling the screw rotating means.

In the present invention, a section is formed by the helical blade of the screw, the article group is transported by the rotation of the screw, and the article group is thereby reciprocatingly moved to the discharge part side and the supply part side by the normal and reverse rotation of the screw. In this manner, nearly all of the constituent components included in the sixteenth aspect are provided by just employing one set of a screw and tube, thus simplifying the constitution of the seasoning apparatus.

The seasoning apparatus as recited in the eighteenth aspect of the present invention is the seasoning apparatus as recited in the seventeenth aspect, wherein the screw extends approximately horizontally between the supply part and the discharge part.

The seasoning apparatus as recited in the nineteenth aspect is the seasoning apparatus as recited in the sixteenth aspect, wherein the control means controls the seasoning feeding means such that the seasoning feeding means, in accordance with the reciprocating motion of an article group, supplies seasoning a plurality of times to the same article group.

The present invention can adhere a number of layers of seasoning to an article group. As a result, the articles can be seasoned well where, for example, the same type of seasoning is supplied. Further, rich seasoning can be achieved where different types of seasoning are supplied. In addition, it is possible to reduce the number of seasoning feeding means.

The seasoning apparatus as recited in the twentieth aspect of the present invention is the seasoning apparatus as recited in the seventeenth aspect, further including an agitating means. The agitating means is provided on the helical blade and agitates each of the groups of articles and seasoning while the article group supplied with seasoning is being transported to the discharge part. The screw rotating means is controlled so that the rotational speed of the screw decreases during the interval when the agitating means agitates the article group and seasoning.

In the present invention, because the article group and the seasoning are agitated while the article group supplied with seasoning is being transported, each individual article in the article group is rolled and turned over, thereby eliminating a situation where, for example, seasoning adheres to only one side of an article. As a result, seasoning adheres over the entire article without any unevenness, thus reliably seasoning the articles without any unevenness. Furthermore, if such agitation is performed with, for example, a planar plate, then the agitation effect will increase, thereby more reliably enabling seasoning of each individual article without any unevenness.

Moreover, because agitation of the article group and seasoning by the agitating member is performed slowly over time, the article group is thereby uniformly seasoned much more reliably, and each individual article is seasoned without any unevenness. In addition, because the agitating member does not kick up the articles at a high speed, there is virtually no concern that articles will move to an adjacent section through the helical space. Furthermore, the present invention inhibits the occurrence of problems such as the agitating member strongly contacting the articles, thereby cracking, chipping, and breaking articles.

The seasoning apparatus as recited in the twenty-first aspect of the present invention is the seasoning apparatus as recited in the first aspect, wherein there is at least one section whose area as viewed planarly is greater than a planar area of a section that is closer to the support part.

In the present invention, because the surface area, viewed planarly, of the section increases while the article group supplied with seasoning is being transported, the article group separated and accommodated in the section is spread thinly without becoming a thick cluster, and seasoning adheres well to each individual article in the article group. As a result, the staying time and agitation time of the article group with the seasoning are satisfied, and uniform seasoning is reliably implemented with hardly any heavily seasoned parts or lightly seasoned parts.

The seasoning apparatus as recited in the twenty-second aspect of the present invention is the seasoning apparatus as recited in the twenty-first aspect, wherein the transport means has a screw, a tube, and screw rotating means. The screw extends between the supply part and the discharge part. The tube has the screw installed therein. The drive source rotates the screw about a rotary shaft. In addition, the screw has a helical blade that forms a plurality of partitions. Each of the sections is a space partitioned by the helical blade in the tube. There is at least one section whose spacing as partitioned by the plurality of partitions is wider than the spacing of a section that is closer to the support part.

In the present invention, a section is formed by the helical blade of the screw, the article group is transported by the rotation of the screw, and the area of the section, viewed planarly, increases by the widening of the spacing of the plurality of partitions of the helical blade. In this manner, nearly all of the constituent components included in the twenty-first aspect of the present invention are provided by just employing one set of a screw and tube, thus simplifying the constitution of the seasoning apparatus.

The seasoning apparatus as recited in the twenty-third aspect of the present invention is the seasoning apparatus as recited in the twenty-second aspect of the present invention, further including a plate. The plate is provided on the helical blade between the plurality of partitions whose spacing widens, and agitates the article group and seasoning.

In the present invention, because the article group and the seasoning are agitated while the article group supplied with seasoning is being transported, each individual article in the article group is rolled and turned over, thereby eliminating a situation where, for example, seasoning adheres to only one side of an article. Accordingly, seasoning adheres over the entire article without any unevenness, thus reliably seasoning the articles without any unevenness. Furthermore, if such agitation is performed with, for example, a planar plate, then the agitation effects will increase, thereby more reliably enabling seasoning of each individual article without any unevenness.

Furthermore, as the agitation effect of the articles increases attendant with the articles being kicked up by the plate, there is a concern that articles will move to an adjacent section through the helical space. However, as discussed earlier, because the area of the section viewed planarly increases while the article group supplied with seasoning is being transported, the piled thickness of the article group (height of the article group) decreases, thereby reducing the possibility that articles will move into the adjacent section through the helical space, even if, for example, articles are kicked up by the plate. Accordingly, the agitation speed due to the plate, i.e., the rotational speed of the screw, can be increased, thereby improving the processing performance of the seasoning apparatus.

The seasoning apparatus as recited in the twenty-fourth aspect of the present invention is the seasoning apparatus as recited in the twenty-third aspect, wherein the plate is approximately vertical before arriving directly above the rotary shaft of the screw by the rotation of the screw.

In the present invention, the agitating plate takes on a position extending approximately in the vertical direction before arriving directly above the screw shaft by the rotation of the screw. Consequently, the articles lifted up and agitated by the plate at that point in time all drop downward. Accordingly, the present invention nearly eliminates the concern that articles thereby agitated by the plate will move to an adjacent section through the helical space riding, as is, on the plate. As a result, the agitation speed due to the plate (rotational speed of the screw) can be increased, thereby improving the processing performance of the seasoning apparatus.

The seasoning apparatus as recited in the twenty-fifth aspect of the present invention is the seasoning apparatus as recited in the twenty-third aspect, wherein the tip part of the plate in the rotational direction is proximate to the inner surface of the tube, and is thinner than the other parts of the plate.

In the present invention, because the tip part of the plate in the rotational direction is proximate to the inner surface of the tube, articles in a section in the tube can be scooped up and agitated by the plate in a large quantity without the articles escaping. Moreover, because the tip part of the plate is relatively thin in that case, the shock when the plate and articles make contact is reduced, articles easily ride upon the plate, thereby inhibiting the occurrence of cracking, chipping, and breaking of the articles.

The seasoning apparatus as recited in the twenty-sixth aspect of the present invention is the seasoning apparatus as recited in the twenty-third aspect, wherein the screw rotating means is controlled so that the rotational speed of the screw decreases during the interval when the plate agitates the article group and seasoning.

In the present invention, because agitation of the article group and seasoning by the plate is performed slowly over time, the article group is thereby uniformly seasoned much more reliably, and each individual article is seasoned without any unevenness. In addition, because the plate does not kick up the articles at a high speed, there is virtually no concern that articles will move to an adjacent section through the helical space. Furthermore, the present invention inhibits the occurrence of problems such as the plate strongly contacting the articles, thereby cracking, chipping, and breaking articles.

The seasoning apparatus as recited in the twenty-seventh aspect of the present invention is the seasoning apparatus as recited in the first aspect, wherein the transport means has a screw, a tube, and screw rotating means. The screw extends approximately horizontally between the supply part and the discharge part. The tube has the screw installed therein. The drive source rotates the screw about a rotary shaft. In addition, the screw has a helical blade that forms the plurality of partitions. Each of the sections is a space partitioned by the helical blade in the tube. Furthermore, in a portion of the helical blade that partitions a section wherein an article group supplied with seasoning is accommodated, a plate is provided that agitates the seasoning and the article group.

In the present invention, while an article group supplied with seasoning is being transported in a seasoning apparatus constituted so that a section is formed by the helical blade of the screw and the article group is transported by the rotation of the screw, the article group and seasoning are agitated. Consequently, each individual article in the article group is rolled around, thereby eliminating, for example, the adherence of seasoning to only one side of an article, for each individual article, thus ensuring that seasoning adheres to the entire article without any unevenness, and that the article is reliably seasoned without any unevenness. Moreover, if such agitation is performed with, for example, a planar plate, then the agitation effect will increase, thereby more reliably enabling seasoning of each individual article without any unevenness.

The seasoning apparatus as recited in the twenty-eighth aspect of the present invention is the seasoning apparatus as recited in the twenty-seventh aspect, wherein the plate is approximately vertical before arriving directly above the rotary shaft of the screw by the rotation of the screw.

The seasoning apparatus as recited in the twenty-ninth aspect of the present invention is the seasoning apparatus as recited in the twenty-seventh aspect, wherein the tip part of the plate in the rotational direction is proximate to the inner surface of the tube, and is thinner than the rest of the plate.

The seasoning apparatus as recited in the thirtieth aspect of the present invention is the seasoning apparatus as recited in the twenty-seventh aspect, wherein the screw rotating means is controlled so that the rotational speed of the screw decreases during the interval when the plate agitates the article group and seasoning.

The product manufacturing system as recited in the thirty-first aspect of the present invention includes a seasoning apparatus, and a weighing apparatus. The seasoning apparatus is the apparatus as recited in any one of the first through thirtieth aspects. The weighing apparatus weighs articles and supplies the weighed groups of articles to the seasoning apparatus.

In the present invention, articles seasoned by the seasoning apparatus are weighed beforehand by the weighing apparatus. Consequently, seasoning does not adhere to the weighing apparatus, reducing the need to clean the weighing apparatus. In addition, it is possible, when changing over the type of articles and when changing over the type of seasoning, to omit work such as removing remaining seasoning adhered to the weighing apparatus by the production of the previous product. In particular, if the weighing apparatus is a large, combination weighing apparatus provided with numerous hoppers and chutes, then the advantageous effect of reducing or omitting that cleaning work is extremely large.

The product manufacturing system as recited in the thirty-second aspect of the present invention is the product manufacturing system as recited in the thirty-first aspect, wherein the weighing apparatus creates article weight data for the groups of articles, and the seasoning feeding means supplies seasoning to the article group based on the article weight data from the weighing apparatus. For example, the seasoning feeding means adjusts the quantity of the seasoning based on the article weight data.

In the present invention, the quantity of seasoning supplied corresponds to the quantity of the article group supplied to the seasoning apparatus; if the quantity of articles supplied is large, then the quantity of seasoning supplied is large, and if the quantity of the articles is small, then the quantity of seasoning is likewise small. Thereby a continuous prescribed optimal ratio is maintained, and each and every individual article in every article group or every section is seasoned just right.

The product manufacturing system as recited in the thirty-third aspect of the present invention is the product manufacturing system as recited in the thirty-first aspect, further including a packaging apparatus. The packaging apparatus receives the groups of articles from the seasoning apparatus and packages the groups of articles discharged from the seasoning apparatus. Further, the weighing apparatus weighs a single package unit quantity of the packaging apparatus, divides the articles of the single package unit quantity into a plurality of article groups, and supplies groups of articles to the seasoning apparatus, a quantity of articles in each of the groups of articles being a divided single package unit quantity of the packaging apparatus.

In the present invention, articles are divided into small lots, yielding more favorable agitation and seasoning. For example, if producing a 100-gram (single package unit quantity) product, then the weighing apparatus weighs 100 grams of articles, divides those articles into two 50-gram article groups and supplies them to the seasoning apparatus, or divides them into four 25-gram article groups and supplies them to the seasoning apparatus. Because the quantity of one article group separated and transported by the seasoning apparatus can be kept to a small quantity without being constrained by the unit quantity of a single package of the packaging apparatus, the articles can be satisfactorily agitated and seasoned in small lots even if, for example, the unit quantity of a single package of the packaging apparatus is large. Furthermore, when the discharge of seasoned articles from the seasoning apparatus to the packaging apparatus is divided into, for example, two article groups, those two divided article groups are consecutively discharged, after which a spacing is timewise partitioned between the current section and the head section of the next single package unit quantity. Thereby, the single package unit quantity weighed by the weighing apparatus is maintained and discharged to the packaging apparatus. In addition, timewise partitioning between adjacent single package unit quantities prevents articles from getting caught in the sealed portions in the packaging apparatus.

BRIEF EXPLANATION OF DRAWINGS

FIG. 20 is a tabular time chart that depicts one example of the characteristic operation of the seasoning apparatus according to the fifth embodiment for the case in which the article group is reciprocatingly moved toward the discharge part side and toward the supply part side, and is transported to the discharge part.

FIG. 23 is a tabular time chart, similar to the one in FIG. 20, that depicts one example of the characteristic operation of the seasoning apparatus of the product manufacturing system according to the sixth embodiment for the case in which the article group is reciprocatingly moved toward the discharge part side and toward the supply part side, and is transported to the discharge part.

FIG. 24 is a tabular time chart, similar to the one in FIG. 23, that depicts one example of the characteristic operation of the seasoning apparatus of the product manufacturing system according to the sixth embodiment for the case in which there is only one seasoning feeder.

FIG. 38 is a side cross-sectional view of the downstream part of the seasoning apparatus in order to explain the functions of the ninth embodiment of the present invention. FIG. 38(a) depicts the problem to be solved by the ninth embodiment, and (b) depicts the ninth embodiment that solves that problem.

PREFERRED EMBODIMENTS

First Embodiment

Figure 1:
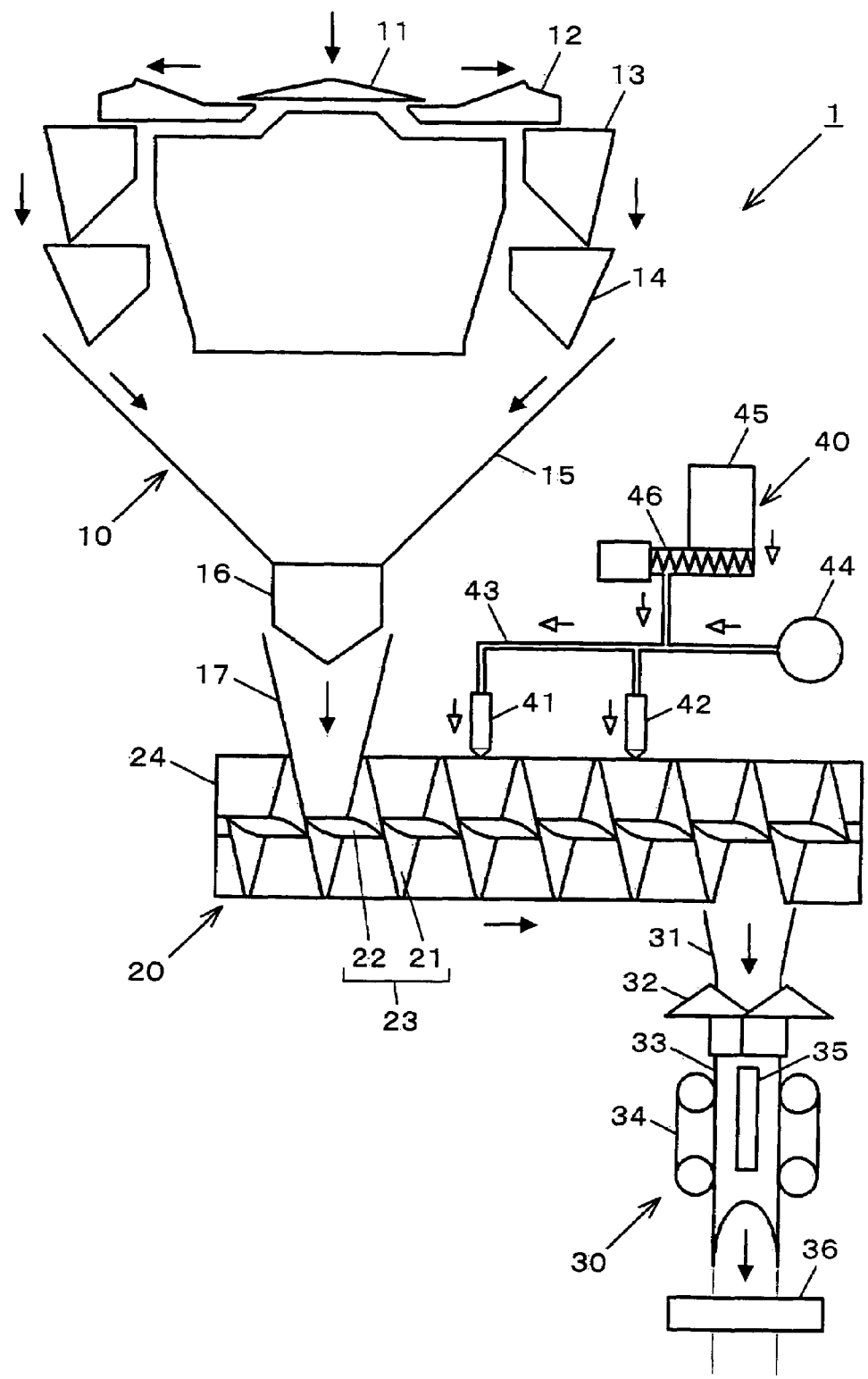
FIG. 1 is a block diagram of the product manufacturing system according to the first embodiment of the present invention.

FIG. 1 is a block diagram of a product manufacturing system 1 provided with a seasoning apparatus 20 according to the present embodiment. The black arrows show the direction of flow of the articles, and the white arrows show the direction of flow of the compressed air and the seasoning. The product manufacturing system 1 weighs, seasons, and packages snacks like potato chips, and includes, in sequence of the direction of the flow of the articles from the upstream side, a weighing apparatus 10 (an example of upstream apparatus), the seasoning apparatus 20, and a packaging apparatus 30 (an example of downstream apparatus).

<Overview of Weighing Apparatus>

The weighing apparatus 10 is a well-known combinational weighing apparatus. Namely, a feeder like a belt conveyor and a bucket conveyor (not shown) supplies a large quantity of articles onto a dispersion table 11 where the articles are dispersed and supplied to a plurality of pool hoppers 13 . . . 13 by a plurality of feeders 12 . . . 12, and are then weighed by a plurality of weigh hoppers 14 . . . 14. Further, each weight value participates in a combination calculation, whereupon articles are discharged from the weigh hoppers 14 . . . 14 corresponding to the optimal combination, and are collected in a timing hopper 16 by a collection chute 15. At an appropriate time, the timing hopper 16 opens (e.g., targeting the time at which, as described later, only a first section #1 of the seasoning apparatus 20 is in communication with a supply port A positioned at a drop supply position which is located above the seasoning apparatus 20), and an article group is supplied to the seasoning apparatus 20 via an intake chute 17. The weighing apparatus 10 weighs out a single package unit quantity of the packaging apparatus 30 (e.g., a net weight of 100 grams in this embodiment), and supplies the articles of the single package unit quantity to the seasoning apparatus 20 as a single article group.

<Overview of the Seasoning Apparatus>

The seasoning apparatus 20 includes a screw 23 having a helical blade 21 and a screw shaft 22; and a tube 24 wherein the screw 23 is installed. The screw 23 and the tube 24 extend horizontally. The upstream side end part of the tube 24 is positioned directly below the intake chute 17, and belongs to the article supply part. The downstream end part of the tube 24 is positioned directly above the packaging apparatus 30, and belongs to the article discharge part.

The seasoning apparatus 20 further comprises a seasoning feeder 40. The seasoning feeder 40 includes spray guns 41, 42, which are provided and arranged in the center part of the tube 24 in the longitudinal direction. The spray guns 41, 42 are connected to an air compressor 44 via a conduit 43. The powdered seasoning stored in the storage tank 45 is measured out by a screw feeder 46 and introduced to the conduit 43. The powdered seasoning thereby introduced rides upon compressed air and is sprayed from nozzles of the spray guns 41, 42 into the tube 24.

<Overview of the Packaging Apparatus>

The packaging apparatus 30 is a well-known vertical pillow-type packaging machine. In other words, a bag is made by bending a strip of packaging material (not shown) into a tubular shape around a vertically extending tube 33 by a former 32, while at the same time dragging the strip downward by pull-down belts 34, 34, simultaneously forming a longitudinal seal by a longitudinal sealing apparatus 35, and then forming a transverse seal by a transverse sealing apparatus 36. Further, the interval between a transverse seal and a transverse seal, i.e., the bag interior, is filled with the seasoned article group dropped and discharged from the seasoning apparatus 20 via an intake chute 31 and the tube 33, completing the product (in this example, a bag filled with snacks).

<Details of the Seasoning Apparatus>

Figure 2:
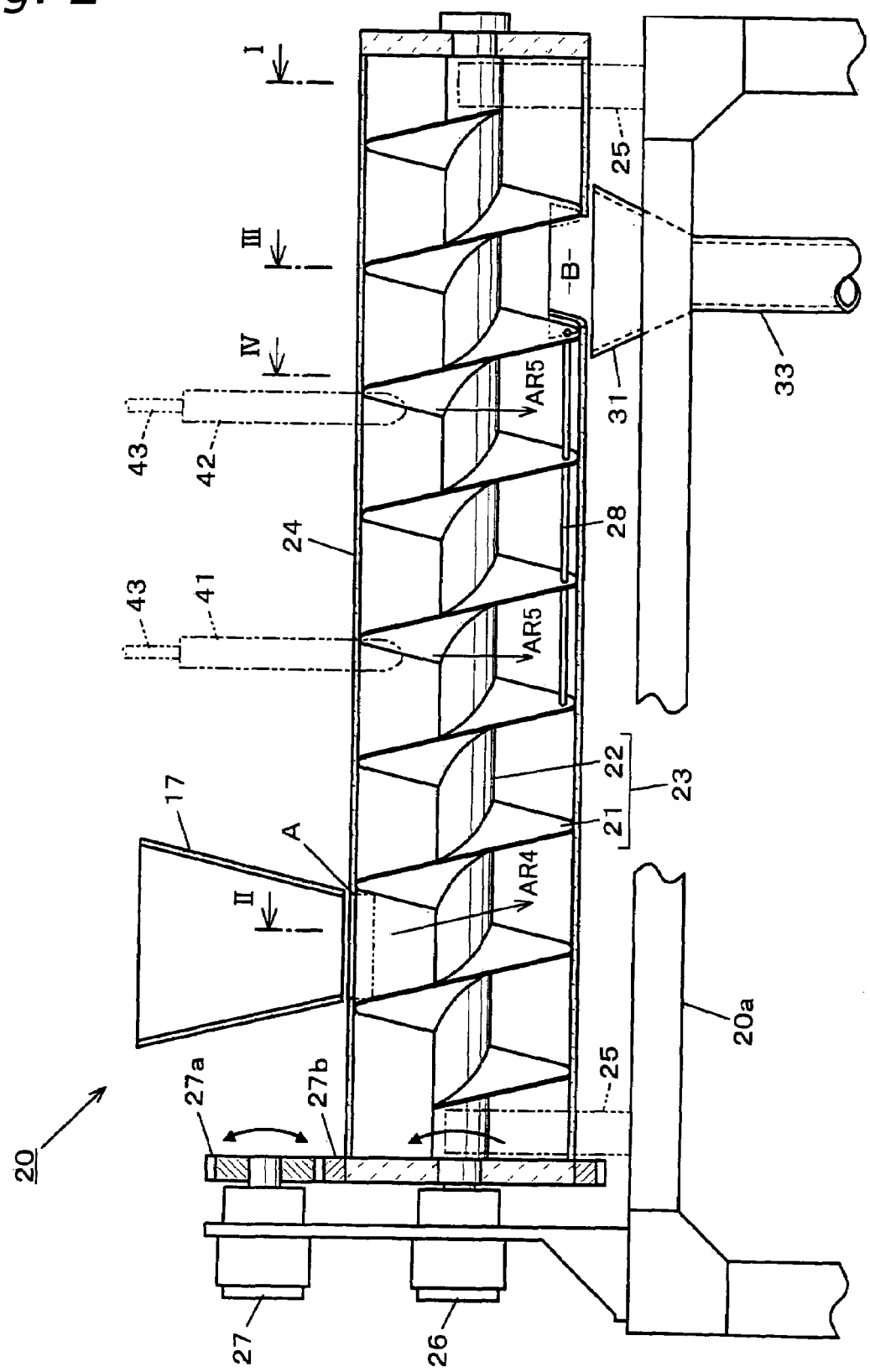
FIG. 2 is a longitudinal cross-sectional view, seen from the side, of the seasoning apparatus provided in the product manufacturing system according to the first embodiment.
Figure 3:
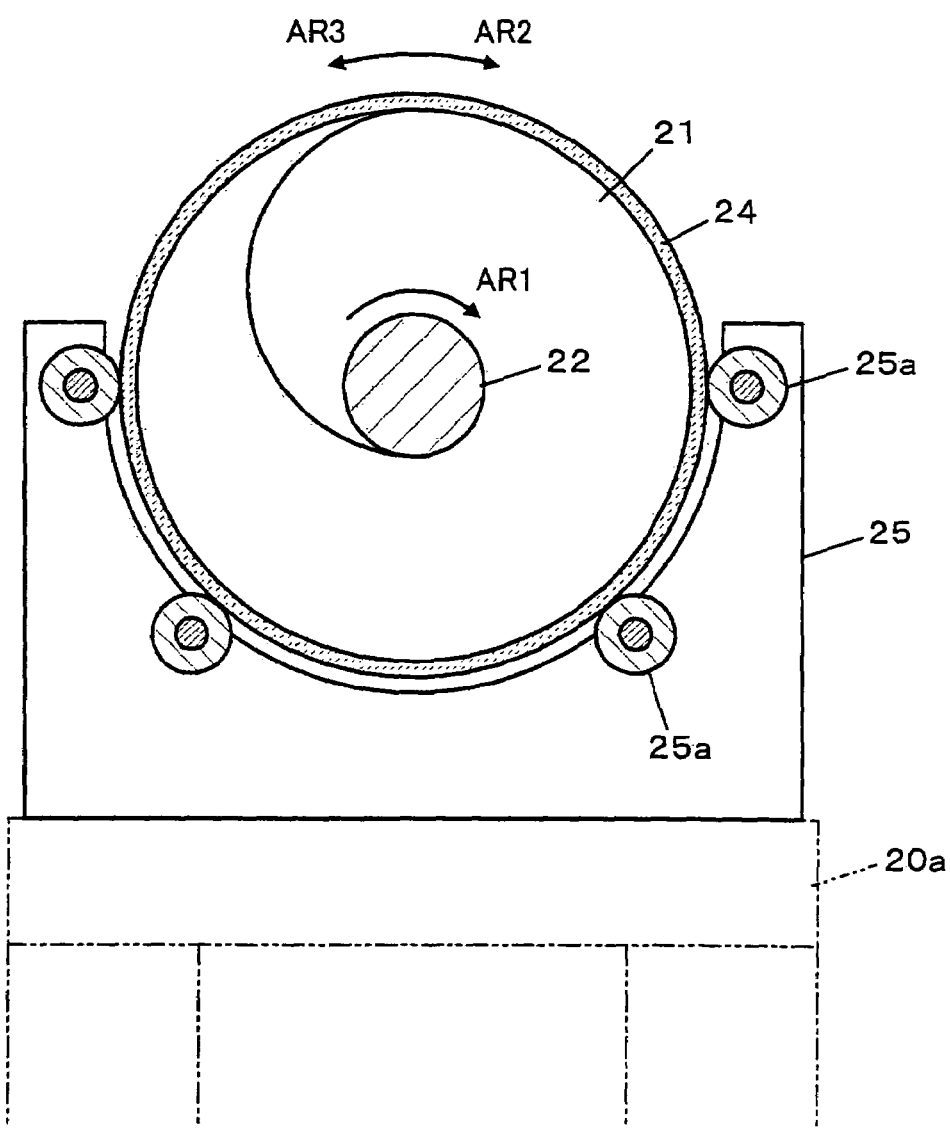
FIG. 3 is a longitudinal cross-sectional view, seen from the downstream side, of the product manufacturing system according to the first embodiment, viewed from the arrow I of FIG. 2.

The seasoning apparatus 20, as shown enlarged in FIG. 2, is mounted, for example, on top of a platform 20a. The tube 24 is supported freely rotatably around a shaft by a pair of support units 25, 25. The support units 25 are constituted so that they support the tube 24 using rollers 25a . . . 25a, as shown in FIG. 3. The cross sections of the inner peripheral surface of the tube 24, which the helical blade 21 slidably contacts, and the outer peripheral surface, which the rollers 25a rollably contact, are circular. The tube 24 is made of a highly transparent resin (e.g., an acrylic resin).

As shown in FIG. 2, the helical blade 21 in the present embodiment is wound around a helix a plurality of times (eight times in the example shown in the figure), each time at the same pitch. As a result, the helical blade 21 provides a plurality of partitions arrayed horizontally inside the tube 24, and a plurality of sections partitioned by adjacent partitions and arrayed horizontally. Of course, the helical blade 21 helically partitions just the space inside the tube 24. Each of the spaces partitioned by the helical blade 21 is not closed, but is mutually connected helically. However, because the article group and the seasoning accumulate at the bottom part inside the tube 24, the helical blade 21 blocks the article group and the seasoning, at least in the part below a screw shaft 22, such that the article group and seasoning cannot move back and forth to and from adjacent sections. Consequently, within this helical space, the portion below the screw shaft 22 can be used as a section that accommodates the article group and seasoning and separates them from other article groups and seasoning. In this sense, it is better to avoid accommodating in the section a group of articles of a quantity that fills up beyond the screw shaft 22 because articles that fill up beyond the screw shaft 22 will travel through the helical space and be unfortunately transported to the adjacent section (regardless of whether on the upstream side or the downstream side).

The sections at both ends of the helical blade 21 keep appearing and disappearing. For example, in the state shown in FIG. 2, the upstream side end part of the helical blade 21 is positioned below the screw shaft 22, and a section is consequently created at the upstream end part of the helical blade 21. However, the downstream end part of the helical blade 21 is positioned above the screw shaft 22, and a section is consequently not created at the downstream end part of the helical blade 21. If the screw 23 rotates by 180°, then the situation reverses. In the present embodiment, the sections that continuously appear are referred to as, from the upstream side, the first section (#1), the second section (#2), . . . , and the sixth section (#6) (refer to FIG. 8).

Figure 4:
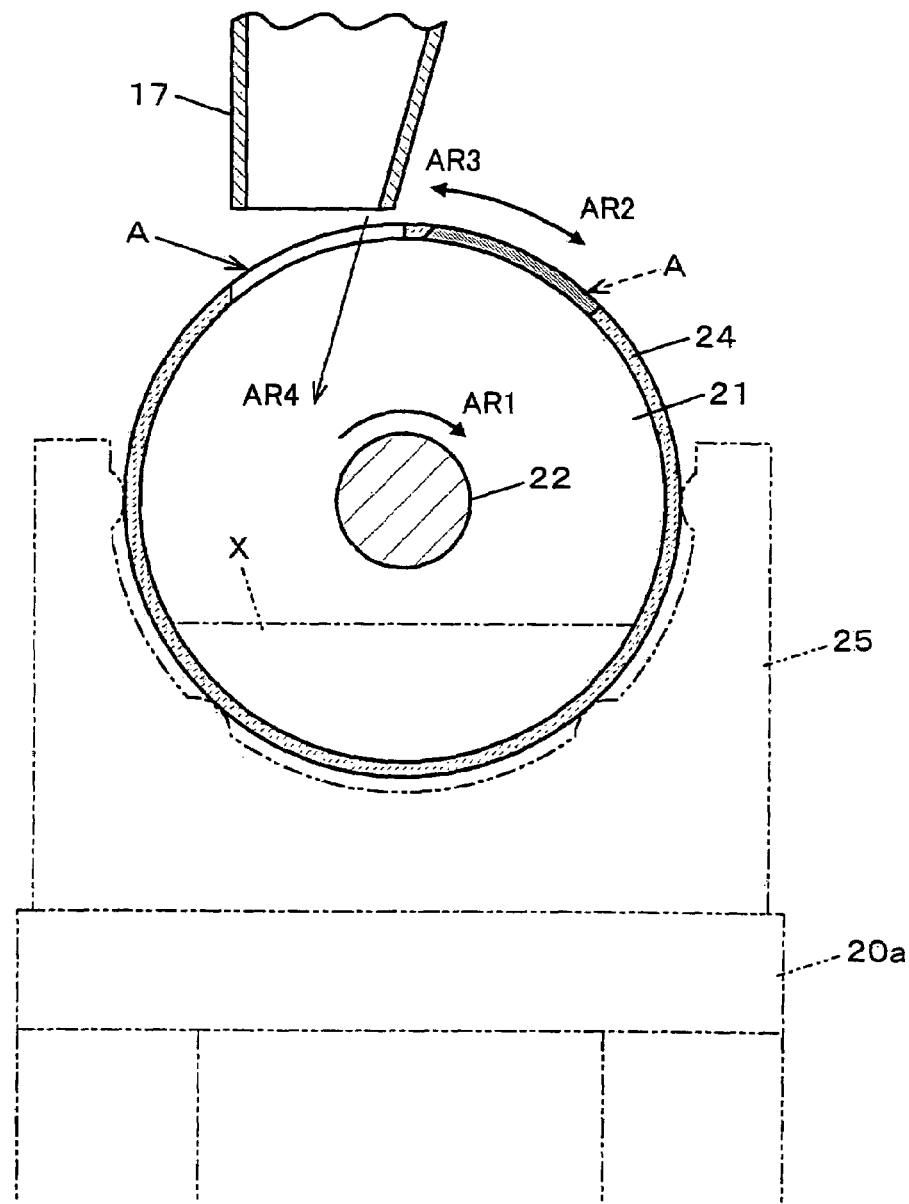
FIG. 4 is a longitudinal cross-sectional view, seen from the downstream side, of the product manufacturing system according to the first embodiment, viewed from the arrow II of FIG. 2.

The first section is the section wherein the article group is first supplied to the seasoning apparatus 20 from the weighing apparatus 10 via the intake chute 17. In the peripheral surface of the tube 24, a supply port A is formed in the region opposing the intake chute 17, i.e., the article supply part. As shown in FIG. 4, the supply port A is not positioned directly above the screw shaft 22 when supplying articles, but rather is positioned displaced toward the first section side. In addition, the lower end part of the intake chute 17 is not positioned directly above the screw shaft 22, but rather is positioned displaced toward the first section side. Furthermore, the intake chute 17 itself is inclined toward the first section side. Thereby, the article group X supplied from the weighing apparatus 10 via the intake chute 17 is surely accommodated in the first section, as shown by the arrow AR4, and does not enter the helical space on the upstream side thereof. Furthermore, the intake chute 17 is fixed to the platform 20a by a fashioner and the like (not shown).

Figure 5:
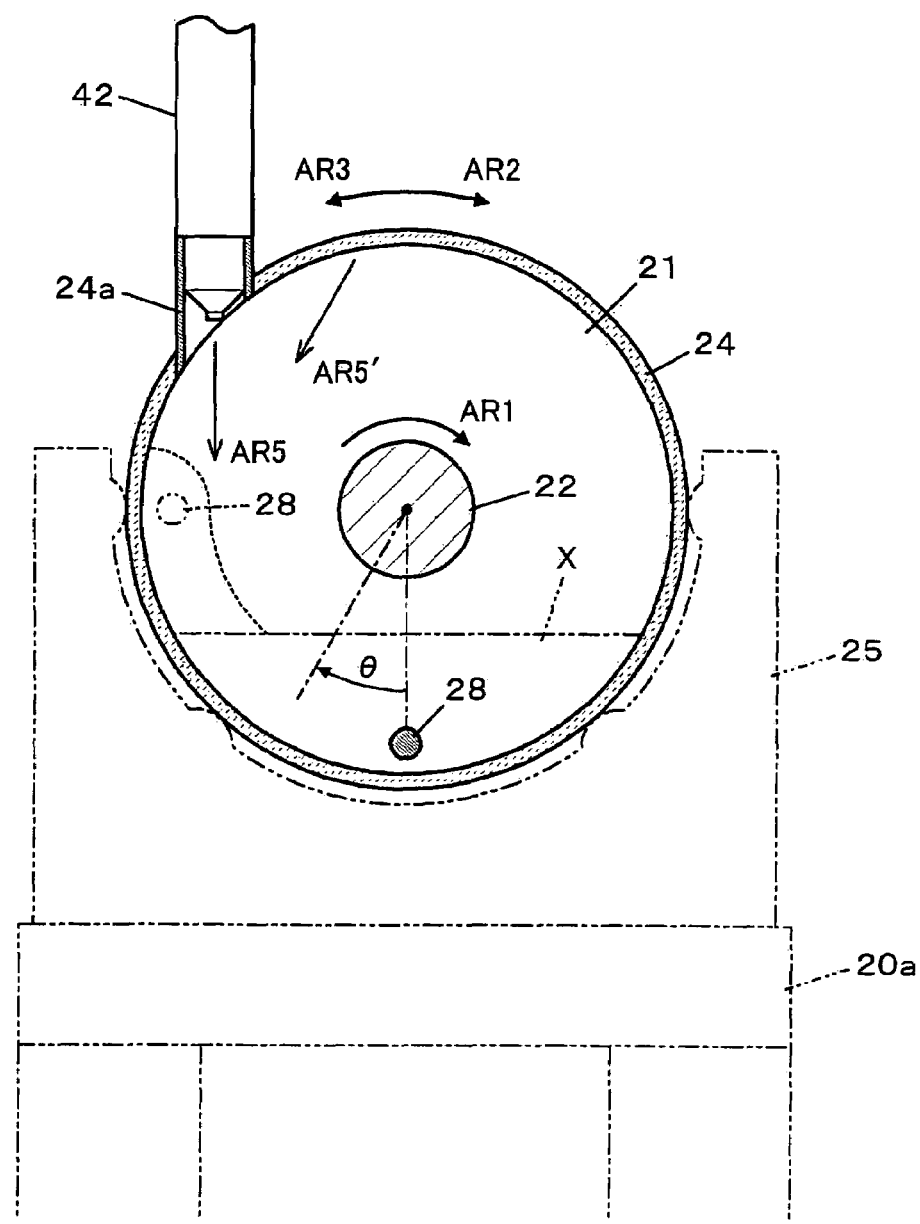
FIG. 5 is a longitudinal cross-sectional view, seen from the downstream side, of the product manufacturing system according to the first embodiment, viewed from the arrow III of FIG. 2.

The third section and the fifth section are sections wherein the spray guns 41, 42 supply powdered seasoning. The tip parts of the spray guns 41, 42 are press fitted to sealing members 24a, 24a, which are arranged upright on the peripheral surface of the tube 24, as shown in FIG. 5. The spray guns 41, 42 are thereby fixed to the tube 24. Spray guns 41, 42 are further supported by a bracket (not shown), which enhances the strength of the support. As shown by the arrow AR5, the spray guns 41, 42 in the present embodiment spray powdered seasoning aiming more toward the region that is closer to the inner peripheral surface of the tube 24 than the screw shaft 22. The spray guns 41, 42 spray a quantity of powdered seasoning corresponding to the quantity of the article group separately accommodated in each section (in this example, one package unit quantity of the packaging apparatus 30). Thereby, the supply ratio and the mix ratio of the article group and the seasoning in each section are continuously maintained at the prescribed optimal ratio. Furthermore, because the set value of one package unit quantity of the packaging apparatus 30 is predetermined, the quantity of powdered seasoning, which is proportional thereto, is a value determined beforehand.

Figure 6:
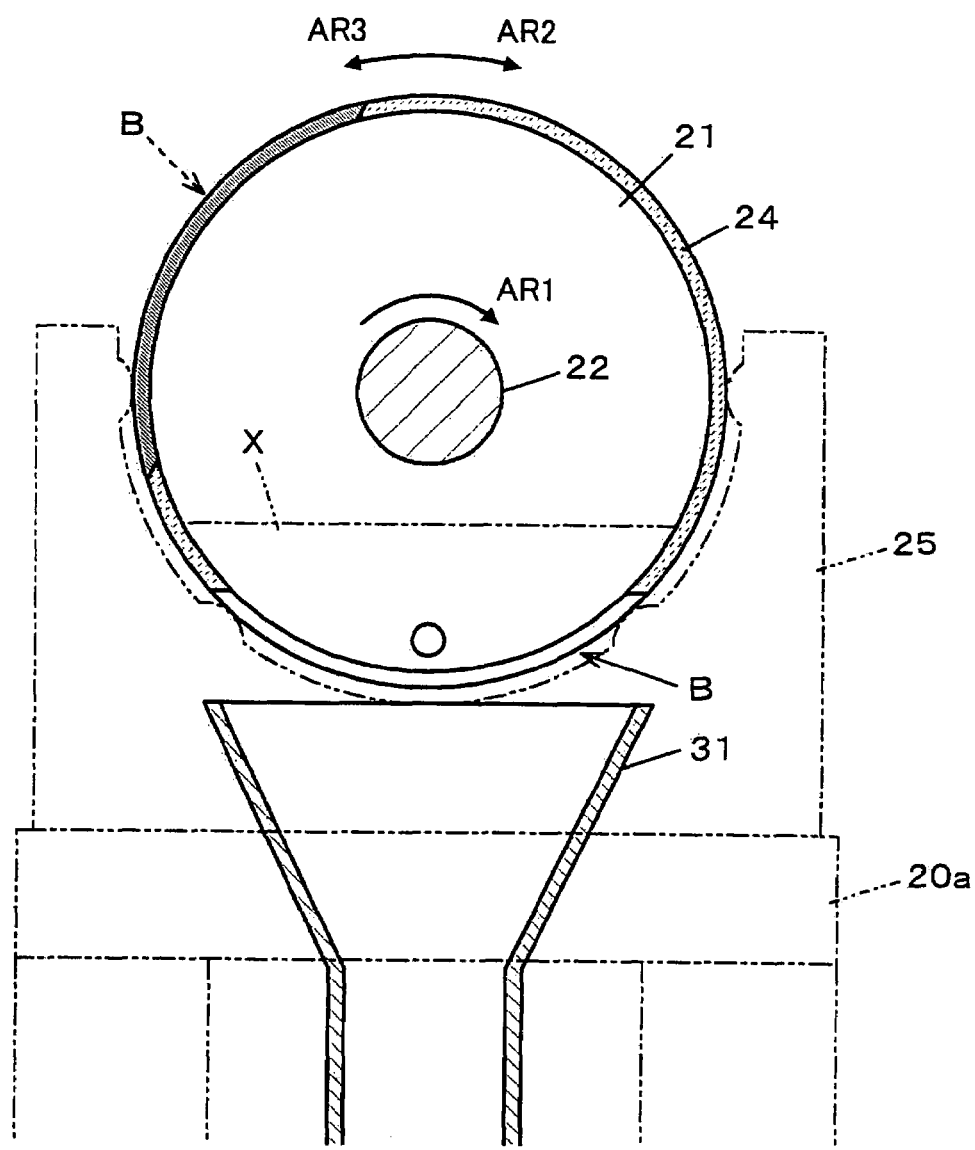
FIG. 6 is a longitudinal cross-sectional view, seen from the downstream side, of the product manufacturing system according to the first embodiment, viewed from the arrow IV of FIG. 2.

The sixth section is the section where the seasoned article group is discharged from the seasoning apparatus 20 to the packaging apparatus 30. In other words, a discharge port B is formed in the peripheral surface of the tube 24 at a region opposing the intake chute 31 of the packaging apparatus 30, i.e., at the article discharge part. As shown in FIG. 6, the discharge port B is positioned directly below the screw shaft 22 when discharging articles. In addition, the upper end part of the intake chute 31 is also positioned directly below the screw shaft 22. Thereby, the article group X that accumulates in the lower part inside the tube 24 forms one cluster, and is discharged from the seasoning apparatus 20 to the packaging apparatus 30 within a short time period.

As shown in FIG. 2, two motors 26, 27 are provided on one end of the tube 24 (the upstream side in the example shown in the drawing). The first motor 26 rotates the screw 23 around a shaft. The output shaft of the motor 26 is directly coupled to the screw shaft 22. The rotation of the first motor 26 and the screw 23 in the clockwise direction as seen from the downstream side (the AR1 direction in FIG. 3 through FIG. 6) rotates the helical blade 21 in the same AR1 direction, moves all sections (#1-#6) together from the upstream side to the downstream side, and transports the article group and seasoning accommodated in each section from the supply part (supply port A) side to the discharge part (discharge port B) side.

A second motor 27 rotates the tube 24 around a shaft. A pinion 27a installed on the output shaft of the motor 27 engages a large-diameter gear 27b installed on the outer peripheral surface of the tube 24. The normal and reverse rotation of the second motor 27 rotates the tube 24 along with the supply port A and the discharge port B in the clockwise direction (in the AR2 direction of FIG. 3 through FIG. 6) or in the counterclockwise direction (in the AR3 direction of the same figures), as seen from the downstream side.

As shown in FIG. 2, a comb-up member 28 is provided and mounted to the helical blade 21 from the third section across to the fifth section. The comb-up member 28 moves together with the helical blade 21 as an integrated unit, and follows a circular motion about the screw shaft 22 attendant with the rotation of the screw 23. As a result, when the comb-up member 28 passes below the screw shaft 22, it contacts the article group and seasoning collected in the lower part of the third section (#3) through the fifth section (#5) inside the tube 24. Further, as shown by the chain-link line in FIG. 5, the article group X and seasoning are combed upwards along the inner peripheral surface of the tube 24, and are thereby agitated. The article group X is thinly spread along the inner peripheral surface, and each individual article that constitutes the cluster of the article group X is externally exposed and well mixed with seasoning. As a result, each individual article is uniformly seasoned without any unevenness.

<Operation of the Seasoning Apparatus>

Figure 7:
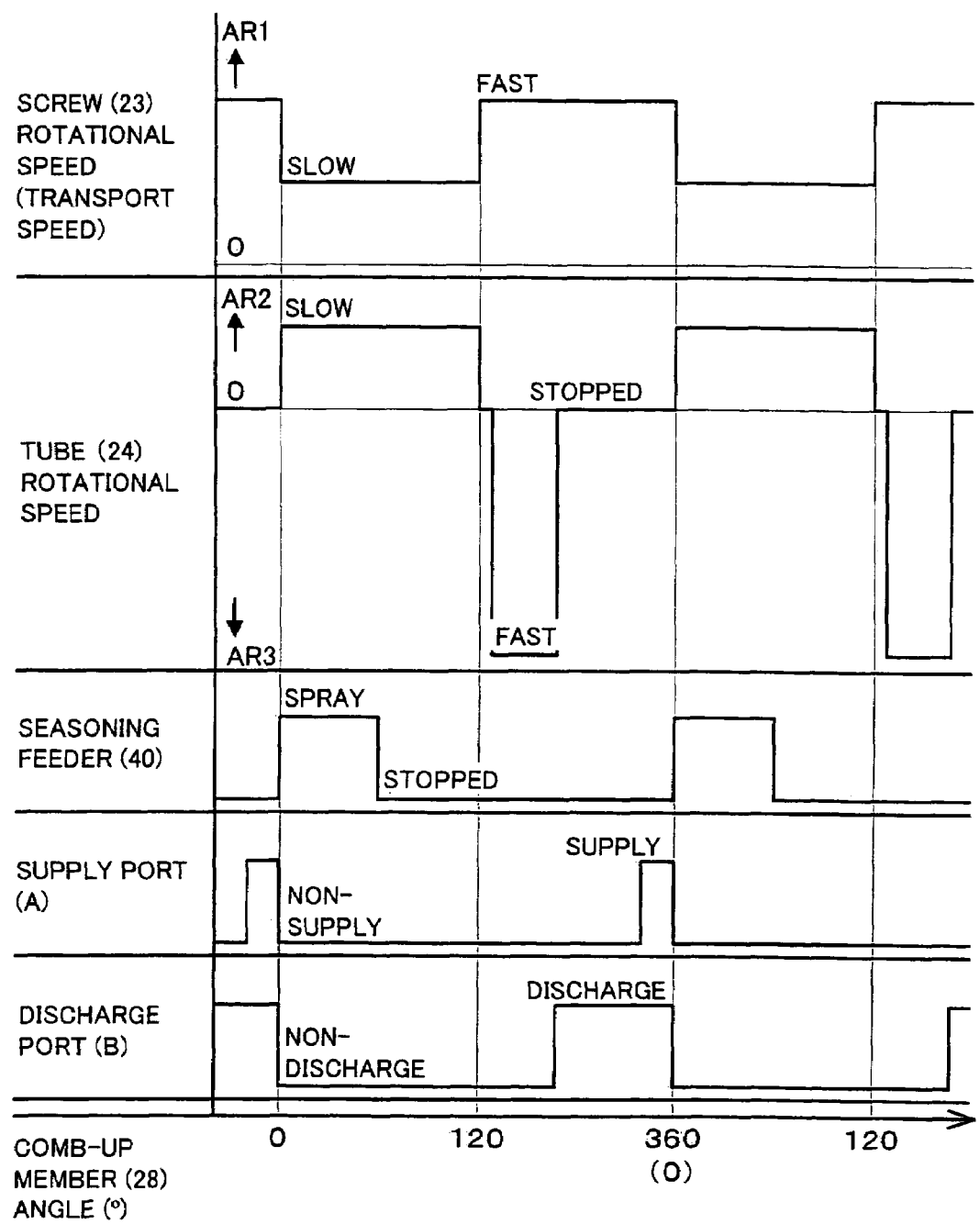
FIG. 7 is a time chart of the operation of each component of the seasoning apparatus according to the first embodiment.
Figure 8:
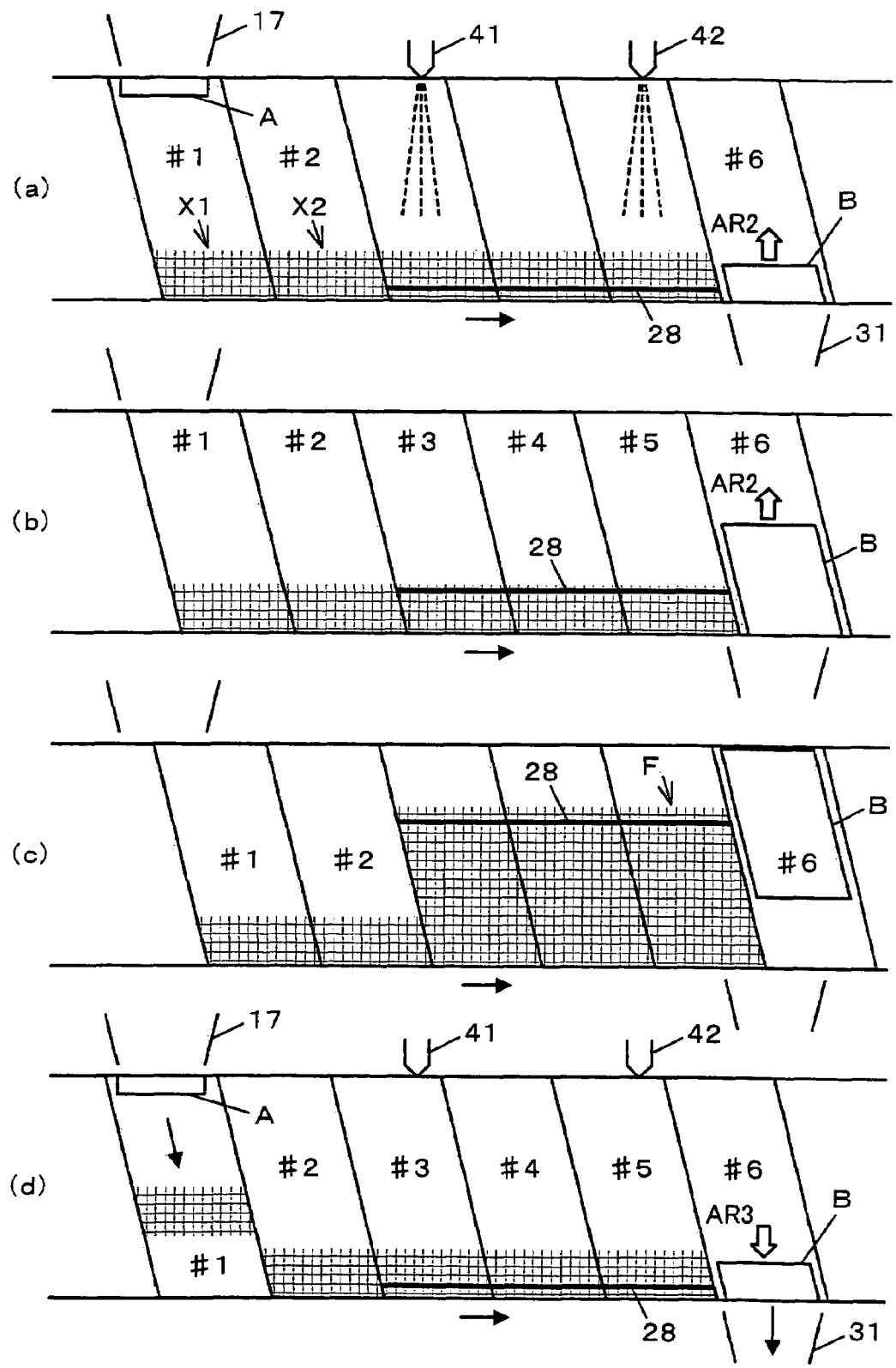
FIG. 8 is a schematic diagram that shows the operation of each component of the seasoning apparatus according to the first embodiment.

The following explains the operation of the seasoning apparatus 20, referencing FIG. 7 and FIG. 8. In FIG. 7, the horizontal axis is not the time axis, but rather is the rotational angle of the screw 23. Herein, for the sake of convenience, the position at which the comb-up member 28 is directly below the screw shaft 22 is taken to be 0° (position shown by the solid line in FIG. 5). From 0° onward, the horizontal axis is the rotational angle θ in the AR1 direction. As is clear from the figure, the interval from 0° to 360° is one rotation of the screw 23, wherein articles in each section (#1-#6) advance by one pitch. Furthermore, the length of the horizontal axis and the screw rotational angle θ are not proportional, but the length of the horizontal axis and the time are proportional.

First, the screw 23 continuously rotates in the AR1 direction. However, there are times when the rotational speed during one rotation (transport speed) is fast, and times when it is slow. Namely, the rotational speed of the screw 23 is reduced when the comb-up member 28 combs up the article group. Thereby, the comb-up operation is performed slowly over time, and the article group X is uniformly seasoned without any unevenness. In addition, it is possible to inhibit articles from being caught, cracked, chipped, and the like, by the comb-up member 28. In the present embodiment, the rotational speed of the screw 23 is reduced in the 0°-120° range of the screw rotational angle. The sole reason for reducing the rotational speed of the comb-up member 28 until it rises to a position higher than the screw shaft 22 (until 120°) is to prevent the comb-up member 28 from kicking the articles upward and undesirably moving them through the helical space to an adjacent section (particularly to an upstream section). However, the timing at which the rotational speed of the screw 23 is reduced can be appropriately varied in accordance with the quantity of the article group X, and the like. For example, it is also acceptable to reduce the rotational speed from around the point where the screw rotational angle is −60° (300°), thereby softening the shock when the comb-up member 28 and the article group X make initial contact.

FIG. 8 depicts an outline of operation during one rotation of the screw 23, i.e., during the time in which each section (#1-#6) advances by one pitch. The diagrams (a), (b), (c), and (d) in the same figure depict aspects at which the screw rotational angle is 0°, approximately 45°, approximately 120°, and approximately 360°, respectively. In FIG. 8(a), the supply port A is oriented upward (at this time, the supply port A is at the article drop supply position shown in FIG. 4). In addition, the discharge port B is oriented downward (at this time, the discharge port B is at the article drop discharge position shown in FIG. 6). However, in FIG. 8(a), the supply of the article group (X1) to the first section (#1) via the supply port A has already been completed, and the discharge of the seasoned article group from the sixth section (#6) via the discharge port B has also been completed.

At this time, the supply port A is positioned between the upper parts of the helical blade 21 that partition the front and rear (upstream side and downstream side) of the first section (#1), and does not protrude beyond the upper part of the helical blade 21, neither on the upstream side nor on the downstream side. In other words, it can be said that the supply port A is in communication only with the first section. Accordingly, the article group X from the intake chute 17 of the weighing apparatus 10 does not straddle the helical blade 21, and is not divided into and supplied to a plurality of sections. In addition, the discharge port B is likewise positioned between the lower parts of the helical blade 21 that partition the front and rear of the sixth section (#6) and does not protrude beyond the lower part of the helical blade 21, neither on the upstream side nor on the downstream side. In particular, it at least does not protrude on the upstream side. In other words, although the discharge port B is in communication with the sixth section, it can be said that it is not in communication with the fifth section. Accordingly, only the article group X6 in the sixth section is discharged to the intake chute 3 1 of the packaging apparatus 30, and is not mixed with and discharged with the article group X5 in the fifth section.

Based on the state shown in FIG. 8(a), the article groups X1-X5 in the first section (#1) through the fifth section (#5) are separated from other article groups, and are transported toward the downstream side. However, the sixth section advances empty, as is, further downstream than the article discharge part. In addition, when the screw rotational angle is 0°, the supply of powdered seasoning from the spray guns 41, 42 commences. As shown in FIG. 7, the supply of seasoning continues until the screw rotational angle is approximately 60°.

Furthermore, when the screw rotational angle is 0°, as in the state shown in FIG. 8(a), the tube 24 begins to rotate in the AR2 direction. As shown in FIG. 7, this rotation continues until the screw rotational angle reaches approximately 120°. In addition, the rotational speed of the tube 24 at this time is the same as the rotational speed of the screw 23 (a slow rotational speed). Namely, the screw 23 and the tube 24 mutually rotate at the same speed in the same directions AR1, AR2 with the same timing (synchronized by the screw rotational angle in the range of 0°-120°). As a result, the supply port A, discharge port B, and the spray guns 41, 42 provided integrated with the tube 24 move slowly in the AR2 direction, as shown in FIGS. 8(b) and (c). At this time, the comb-up member 28 integrated with the screw 23 also moves slowly in the AR1 direction. Furthermore, in FIGS. 8(b) and (c), the supply port A and the spray guns 41, 42 move to the opposite side of the tube 24, and are no longer visible. For the reader's reference, the position of the supply port A when the screw rotational angle is approximately 45° is shown by diagonal lines in FIG. 4. In addition, the position of the discharge port B when the screw rotational angle is approximately 120° is shown by diagonal lines in FIG. 6. Furthermore, the position of the comb-up member 28 shown by the chain-link line in FIG. 5 is the position at which the screw rotational angle is approximately 90°, and the arrow AR5' shows the direction of the spray of the powdered seasoning of the spray guns 41, 42 when the screw rotational angle is approximately 30°.

As clearly seen in FIG. 8 and FIG. 2, the edge part of the upstream side (fifth section side) of the discharge port B runs diagonally along the helical shape of the helical blade 21 because the sixth section is bottomless across its entirety due to the discharge port B, and the entire quantity of the article group X6 in the sixth section is thereby reliably discharged. In this sense, it does not make a difference even if the edge part of the downstream side of the discharge port B protrudes beyond the helical blade 21. In addition, the discharge port B moves synchronized at the same speed and in the same direction as the helical blade 21 and, as a result, the positional relationship between the discharge port B and the helical blade 21 shown in FIG. 8(a) is maintained as is even in FIGS. 8(b) and (c). In other words, even while the discharge port B is moving in the AR2 direction in the range when the screw rotational angle is 0°-120°, the discharge port B does not go beyond the helical blade 21 on the upstream side, and does not communicate with the fifth section. Accordingly, as shown in FIGS. 8(b) and (c), even if the fifth section (#5) approaches the article discharge part (above the intake chute 31 of the packaging apparatus 30), the article group X5 inside the fifth section (shown in the figure by the Symbol F), is not discharged at this time.

Subsequently, when the screw rotational angle is in the range of 120°-360°, the rotational speed of the screw 23 returns to the regular transport speed (fast speed), as shown in FIG. 7. On the other hand, the tube 24 starts reverse rotation at a high speed in the AR3 direction at the point in time when the screw rotational angle exceeds 120°, and returns to the state shown in FIG. 8(a) when the screw rotational angle is in the vicinity 6f approximately 220°-230°. In other words, the distance at which the tube 24 moves in the AR2 direction is equal to the distance at which the tube 24 moves in the AR3 direction. As a result, the supply port A returns to the upper article drop supply position, the discharge port B returns to the lower article drop discharge position, and the spray guns 41, 42 return to the vertical position. The tube 24 subsequently remains stopped until the screw rotational angle reaches 360° (i.e., until the start of the next cycle). The position shown in FIG. 8(a) during this stoppage (in addition, the positions shown in FIG. 8(d), FIG. 2, and FIG. 4 through FIG. 6) are referred to as the tube actuation position.

At the point in time when the tube 24 returns to the actuation position, the screw 23 has still not completed one rotation. Accordingly, in the article supply part, the upstream portion of the helical blade 21 (partition on the upstream side of the first section) is passing by the supply port A; in the article discharge part, the downstream portion of the helical blade 21 (partition between the fifth section and the sixth section) is passing by the discharge port B. Consequently, with regard to the supply of the article group X, if the article group X is dropped at this time from the weighing apparatus 10 side to the seasoning apparatus 20 side, then the entire quantity of the article group X does not enter the first section of the next cycle, but rather a portion thereof undesirably mixes in with the first section of the previous cycle (second section of the next cycle). Further, at the point in time when the tube 24 returns to the actuation position, the supply of the article group X from the weighing apparatus 10 is placed on standby. As shown in FIG. 8(d), immediately before the screw 23 completes approximately one rotation, the timing hopper 16 of the weighing apparatus 10 is made to open, timed to the completion of the section that is to be the first section (#1) in the next cycle (refer to FIG. 7). In the state depicted in FIG. 8(d), the supply port A positioned at the upper drop supply position is positioned between the front and rear partitions of the first section (#1), and communicates only with the first section #1, the same as in FIG. 8(a).

On the other hand, with regard to the discharge of the seasoned article group X, the subsequent target discharge (F) is already approaching the article discharge part, and that discharge consequently begins from the point in time when the tube 24 returns to the actuation position (refer to FIG. 7). The discharge of the seasoned article group F continues until the sixth section (#6) completely formed (until the screw rotational angle has reached 360°). However, the rotational speed of the screw 23 returns to the regular fast transport speed during that interval, and the transport speed of the article group X increases. In addition, the discharge port B positioned at the lower drop discharge position is broadly open across the entire sixth section, and the entire quantity of the article group F therefore drops, without delay and as a single cluster, into the packaging apparatus 30 within a relatively short time period.

Accordingly, during the interval of time when the tube 24 is stopped at the actuation position (when the screw rotational angle is approximately between 220°-230° and 360°), the supply port A is at the article drop supply position, and the discharge port B is at the article drop discharge position. In contrast, during the interval of time when the tube 24 is moving in the AR2 direction or the AR3 direction, the supply port A is at the non-supply position, and the discharge port B is at the non-discharge position. Thus, the supply (receiving) of the article group X before seasoning, and the discharge of the article group X after seasoning has completed are simultaneously controlled by the simultaneous movement of the upstream supply port A and the downstream discharge port B.

Furthermore, from the perspective of reducing the load of the second motor 27 or simplifying the control of the second motor 27, there is an approach in which, when returning the tube 24 to the actuation position, it may be preferable to return the tube 24 by raising the speed in the AR2 direction, without reversing the rotation to the AR3 direction. In other words, the tube 24 is rotated by one revolution in the fixed direction of AR2, the same as with the screw 23. However, in the present embodiment, the long, thin spray guns 41, 42 are provided upright on the peripheral surface of the tube 24, and extend in the radial direction. Consequently, in fact, continuing to rotate the tube 24 in the same direction is problematic because it requires a large amount of space around the seasoning apparatus 20, and there is the further possibility that the conduit 43 between the spray guns 41, 42 and the air compressor 44 could be swung back and forth and undergo a heavy strain. However, if, for example, the seasoning nozzle is fit into the peripheral surface of the screw shaft 22 belonging to the third section and the fifth section, then it is no longer necessary to provide the long, thin spray guns 41, 42 upright in the peripheral surface of the tube 24, the abovementioned space requirement ceases, the restrictions related to the conduit 43 cease. It also becomes possible to continue rotating the tube 24 in the AR2 direction.

<Characteristics of the Present Embodiment>

The following explains the characteristics of the present embodiment. First, the seasoning apparatus 20 according to the present embodiment transports articles supplied from the weighing apparatus 10 in the article supply part as far as the article discharge part, while seasoning the articles. Namely, the seasoning apparatus 20 seasons the article group X weighed by the weighing apparatus 10 until it is transferred to the packaging apparatus 30, which is a rational approach without any waste.

In addition, the article group X supplied at the supply part and the seasoning supplied by the seasoning feeder 40 are grouped together as a single unit, and are transported to the discharge part separated and isolated from other article groups. Therefore, the article group X and seasoning do not exit from the seasoning apparatus even partially, nor are the new articles and seasoning added to the article group X and seasoning, while they are being transported. Accordingly, the staying time inside the seasoning apparatus 20, i.e., the seasoning processing time (contact time with the seasoning) is the same for each and every article in a single group of articles, and the supply ratio and the mixing ratio of the article group X and the seasoning are maintained at the same level. Consequently, each and every individual article can be evenly seasoned, without seasoning too heavily or too lightly. For example, each and every individual article can be evenly seasoned at the optimal ratio if the article group and seasoning are initially supplied at a prescribed optimal ratio. Furthermore, this is regardless of in what sequence the article group and seasoning are supplied.

Moreover, because the movement of partitions is employed as the means to separate and transport each article group, the constitution of the seasoning apparatus is simplified. In other words, the article group is separated and accommodated in the section partitioned by the partitions, and the section is moved by the movement of the partitions, thereby transporting the article group X to the discharge part with the article group separated as is. In other words, the partitions simultaneously serve the two overlapping functions of separating and transporting.

Next, the quantity of seasoning supplied by the seasoning feeder 40 can be set in accordance with the quantity of the article group X supplied by the weighing apparatus 10 rather than being a preset value, e.g., set large when the quantity of articles supplied is large, and set small when the quantity of articles supplied is small. In this case, the prescribed optimal ratio is continuously maintained, and the flavor is adjusted just right for every article group, in every section, and for each and every article.

Next, because the rotation of the screw 23 is effected by the motion of the partitions, the plurality of partitions and the plurality of sections all move together in the axial direction merely by rotating the screw 23 around the axis inside the tube 24. Moreover, a plurality of sections can be provided, all at once, just by using one set of the screw 23 and the tube 24, and the plurality of article groups X1-X6 separately accommodated in each section respectively can be simultaneously transported in parallel to the discharge part, one after the other. In the present embodiment, the plurality of sections respectively partitioned by the helical blade 21 successively move from the article supply part to the article discharge part by the use of a screw-type conveyor. There is no moving means for each individual section; rather, all that is needed is to rotate a single screw 23, and the constitution is accordingly simplified.

In addition, because the screw 23 and the tube 24, which are relatively long objects, are arranged so that they extend in the horizontal direction rather than in the vertical direction, the height of the seasoning apparatus 20 is kept short. In addition, the article group X supplied to the seasoning apparatus is spread thinly in the horizontal direction and does not form a thick cluster, the seasoning satisfactorily contacts the articles present in the cluster of the article group X, thereby achieving satisfactory seasoning.

Next, the present invention forms a discharge port B in the tube 24, and rotates the tube 24, thereby controlling the discharge of the seasoned article group by changing the position of the discharge port B, e.g., serving a function the same as a timing hopper. Moreover, because it is a timing hopper integrated with the seasoning apparatus 20, it is more compact than separately providing a regular timing hopper (e.g., the timing hopper 16 of the weighing apparatus 10).

Likewise, by forming the supply port A in the tube 24 and rotating the tube 24, the supply of the article group before seasoning is controlled by changing the position of the supply port A. Therefore, problems are prevented, such as, for example, supplying an article group from the weighing apparatus 10 side when the supply port A is still passing by a partition (helical blade 21), thereby mistakenly supplying an article group into the seasoning apparatus 20 straddling the helical blade 21. In other words, as shown by the diagonal line in FIG. 4, the upper part of the tube 24 is blocked when the supply port A is at the non-supply position, thereby preventing the problem of supplying articles unexpectedly into the seasoning apparatus 20, even if, for example, articles are dropped from the intake chute 17 at this time.

Further, simultaneously performing this type of discharge control and supply control of the article group by the rotation of the tube 24 prevents the needless complication of the control of the rotation of the tube 24.

Furthermore, the article group X supplied to the seasoning apparatus 20 is agitated with the seasoning while being transported, thereby reliably seasoning the article group. In this case, because an article group X and seasoning are agitated in each section in a state wherein they are grouped into single units, each and every individual article is reliably flavored without the exit of an existing, or entrance of a new, article group or seasoning.

In that case, because the article group and seasoning collected at the bottom part in a section are agitated by combing by a comb-up member 28, the articles are rolled around, and a uniform seasoning is achieved without any unevenness, when individual articles are compared and when different regions of a single article are compared.

In addition, because the change in the positions of the ports A, B are synchronized to the reduction of the rotational speed of the screw 23 in order to perform agitation, it suffices to change the positions of the ports A, B at a low speed (rotational speed of the tube 24 in the AR2 direction), and it is possible to start rotating the stopped tube 24 in the AR2 direction with a small load.

Further, because the tube 24 is made transparent (e.g., made of an acrylic resin), the situation inside the tube 24 or the seasoning apparatus 20 can be observed externally. As a result, the progress status of the work can be confirmed, and it can be determined whether the work is proceeding correctly or encountering a failure. In addition, if the supply of the article group and the supply of the seasoning are performed manually, then it is possible to time the supply of the article group and seasoning well by visually observing the positional relationship between the screw 23 and the helical blade 21, the positional relationship between each of the sections #1-#6, and the like.

On the other hand, as a characteristic feature of the entire product manufacturing system, because the weighing apparatus 10 is provided upstream of the seasoning apparatus 20 and the packaging apparatus 30 is provided downstream thereof, seasoning does not adhere to the weighing apparatus 10, thereby reducing the need for cleaning work. In addition, it is possible, when changing the type of product and when changing the type of seasoning, to omit work such as removing seasoning adhered to the weighing apparatus 10 during the production of the previous product. In particular, if the weighing apparatus 10 is a large, combination weighing apparatus provided with numerous hoppers 13, 14, 16 and chutes 15, 17, then the advantageous effect of reducing or omitting that cleaning work is extremely large.

Second Embodiment

The first embodiment performed all processing of an article group of a single package unit quantity weighed by the weighing apparatus 10 as a single unit. In other words, the entire quantity of the article group X weighed by the weighing apparatus 10 is supplied (for each single package unit quantity) to a single section of the seasoning apparatus 20, transported, seasoned, and transferred to the packaging apparatus 30. In contrast, in the second embodiment, the article group of a single package unit quantity weighed by the weighing apparatus 10 is intentionally divided into a plurality (of article groups), and those divided article groups are supplied as individual units to the sections of the seasoning apparatus 20, transported, seasoned, and transferred to the packaging apparatus 30. However, as discussed later, because it is necessary to once again collect the plurality of article groups into a single article group (into a single package unit quantity) when transferring to the packaging apparatus 30, the rotation of the tube 24 (controlling the demarcation of the supply and discharge of the article group) is performed every time all of the plurality of divided, supplied sections pass by, rather than every time a single section passes by.

Figure 9:
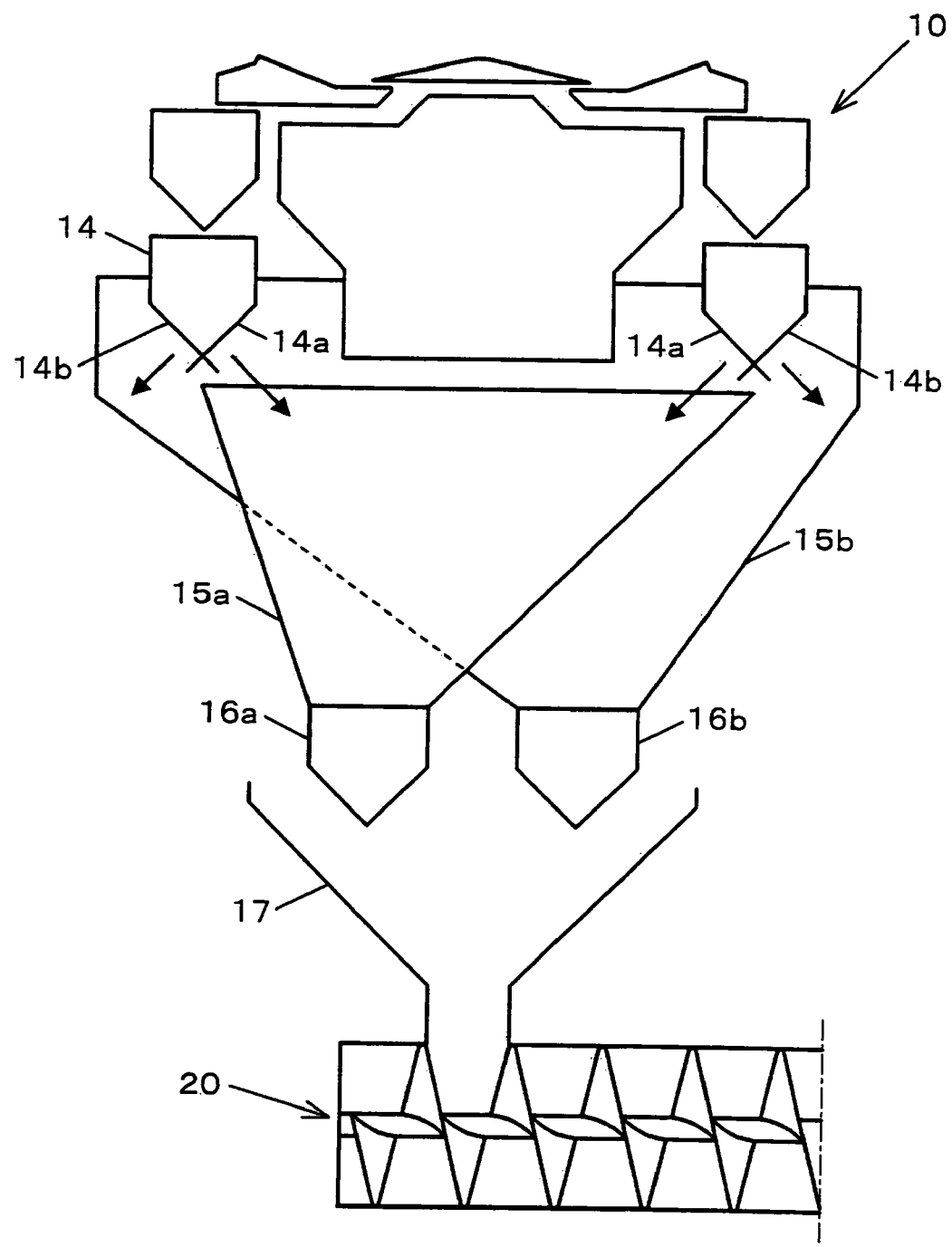
FIG. 9 is a block diagram of the weighing apparatus having a twin-chute structure capable of being employed in the second embodiment of the present invention.

FIG. 9 shows the weighing apparatus 10 capable of being employed in the second embodiment. A characteristic feature of the present embodiment is that the collection chute is an inner and outer dual structure 15a, 15b (twin-chute structure). In the first embodiment, a single section accommodates the entire quantity of the single package unit quantity, and therefore it is necessary to time the discharge every time a single section arrives at the discharge part. In contrast, in the second embodiment, because the articles of a single package unit quantity are divided into and supplied to a plurality of sections, the present embodiment times the demarcation of the discharge every time two sections pass by, if, for example, the articles are divided into and supplied to two sections. In addition, if one section constitutes a single package unit quantity, then the quantity of an article group in that section can be recognized as, for example, the net weight of the product to be produced (in other words, a detecting means that detects the quantity of the article group is provided). However, when divided into and supplied to a plurality of sections, the quantity of the article group supplied to the respective sections must somehow be made known by a separate method. In the second embodiment, a weighing apparatus having a twin-chute structure, as shown in FIG. 9, is employed for that purpose. The chutes 15a, 15b are respectively provided with timing hoppers 16a, 16b, either of which drops articles into the common intake chute 17. The weigh hopper 14 has two gates 14a, 14b, either of which selectively opens when discharging articles. For example, if the inner gate 14a opens, the articles can be collected in one timing hopper 16a using the inner collection chute 15a. Conversely, if the outer gate 14b opens, the articles can be collected in the other timing hopper 16b using the outer collection chute 15b.

The weighing apparatus 10 selects a combination that forms a single package unit quantity (e.g. 100 grams) and, from within that combination, selects two combinations that each form 50 grams. Further, the articles in the weigh hoppers 14 corresponding to one of the 50-gram combinations is discharged to either the inner or outer collection chute, 15a or 15b, and the articles in the weigh hoppers 14 corresponding to the other 50-gram combination are discharged to the other collection chute, 15b or 15a. Further, each of two consecutive sections of the seasoning apparatus 20 are respectively supplied with a 50-gram combinationally weighed article group. The seasoning feeder 40 supplies seasoning to each section in a quantity corresponding to a 50-gram article group, not a 100-gram article group. Based on the above, the second embodiment provides a detecting means that detects the quantity of the article group.

In doing so, the article group X is divided into small lots, yielding more favorable agitation and seasoning of the seasoning and the article group X. In addition, because the quantity of one article group separated and transported by the seasoning apparatus 20 can be kept to a small quantity without being constrained by the single package unit quantity of the packaging apparatus 30, the articles can be satisfactorily agitated and seasoned in small lots even if, for example, the single package unit quantity of the packaging apparatus 30 is large.

Furthermore, because the present product manufacturing system is configured so that packaging is performed immediately after seasoning, the discharge of articles from the seasoning apparatus 20 must be performed so that one group of articles of a single weighing unit quantity is discharged as a single cluster. Moreover, there must be a distinct spacing (demarcation or partition) between clusters. Otherwise, articles will get caught in the horizontal seals in the packaging apparatus 30. Furthermore, when the discharge of seasoned articles from the seasoning apparatus 20 to the packaging apparatus 30 is divided into, for example, two article groups as mentioned earlier, those two divided article groups are consecutively discharged, after which a spacing is timewise partitioned between the current section and the head section of the next single package unit quantity. Thereby, the single package unit quantity weighed by the weighing apparatus 10 is maintained, and discharged to the packaging apparatus 30. In addition, timewise partitioning between adjacent single package unit quantities prevents articles from getting caught in the transverse seals in the packaging apparatus 30.

Third Embodiment

In the first embodiment, it is also acceptable to electrically charge at least one of the article group X and seasoning, and to adhere the seasoning to the article group X using that electrostatic function. The seasoning process is thereby completed within a short time period, and seasoning is performed more uniformly without any unevenness. In addition, the remaining unadhered seasoning is reduced (the seasoning adheres with a good yield). However, when both the article group X and the seasoning are electrically charged, they must be mutually charged with differing polarity.

Figure 10:
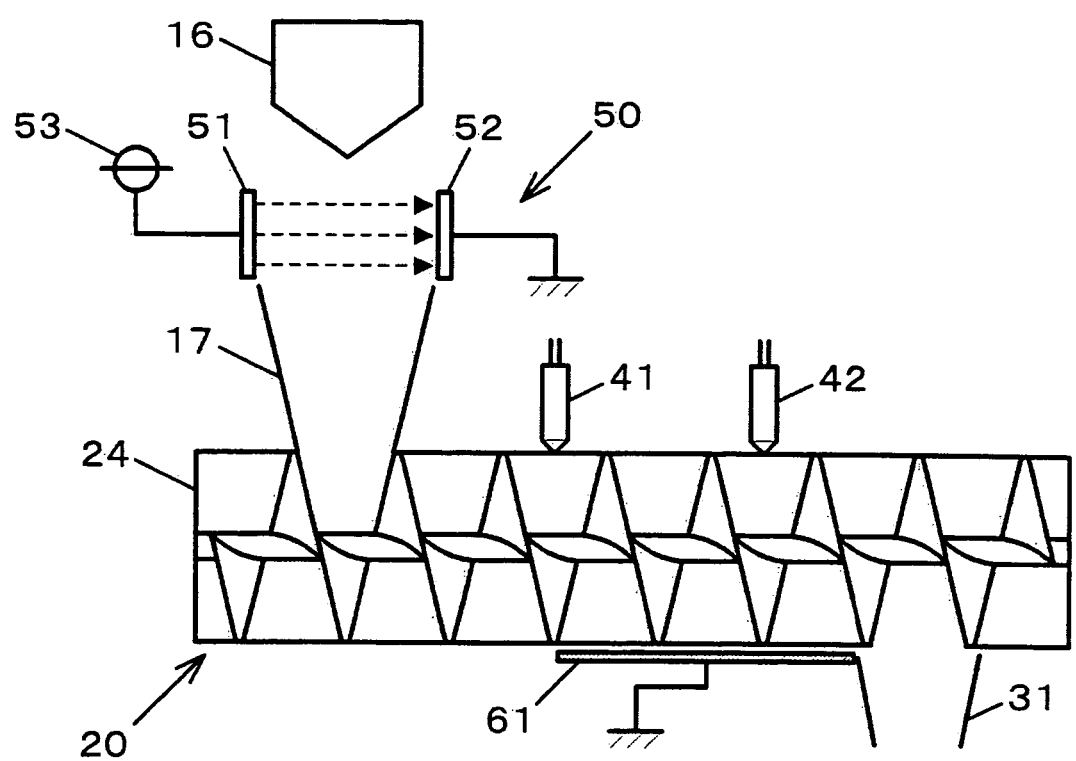
FIG. 10 is a block diagram of the principle parts of the product manufacturing system provided with an electrical charging apparatus capable of being employed in the third embodiment of the present invention.

FIG. 10 shows an electrical charging apparatus 50 capable of being used in the third embodiment. The electrical charging apparatus 50 is arranged between the timing hopper 16 and the intake chute 17 of the weighing apparatus 10, and has a pair of opposing electrodes 51, 52 that interpose the drop pathway of the weighed article group X. One electrode 51 is connected to a high-voltage power supply 53, and the other electrode 52 is grounded, thereby forming an electrical field space between the electrodes 51, 52. The article group X discharged from the timing hopper 16 passes through the electric field space during its drop and, as a result, becomes electrically charged with a prescribed polarity. The electric charging of the seasoning is achieved by, for example, providing a similar electrical charging apparatus in the seasoning supply pathway (conduit 43 and the like) in the seasoning feeder 40.

Thus, when at least one of the article group X and the seasoning are electrically charged, it is preferable that the tube 24 is a dielectric, i.e., an electrical insulator. As a result, the adherence of the electrically charged article group X and seasoning to the tube 24 is inhibited, and the article group X and seasoning are therefore well dispersed, and satisfactorily contact and agitate with one another. In addition, the seasoning does not become lumpy and collect on the inner peripheral surface of the tube 24, preventing problems such as a lump of seasoning locally adhering to an article.

In that case, it is also acceptable to fit a grounded metal plate 61 (e.g., steel plate) to the tube 24 proximate to the lower part of the outer peripheral surface thereof, as shown in FIG. 10. The electrically charged seasoning is actively pulled toward the metal plate 61, with the aim to concentrate the seasoning at the lower part of the tube 24. In doing so, seasoning adheres well to the article group X, which nevertheless tends to accumulate of its own weight at the lower part of the tube 24, and the seasoning is thereby used without any waste.

Fourth Embodiment

Figure 11:
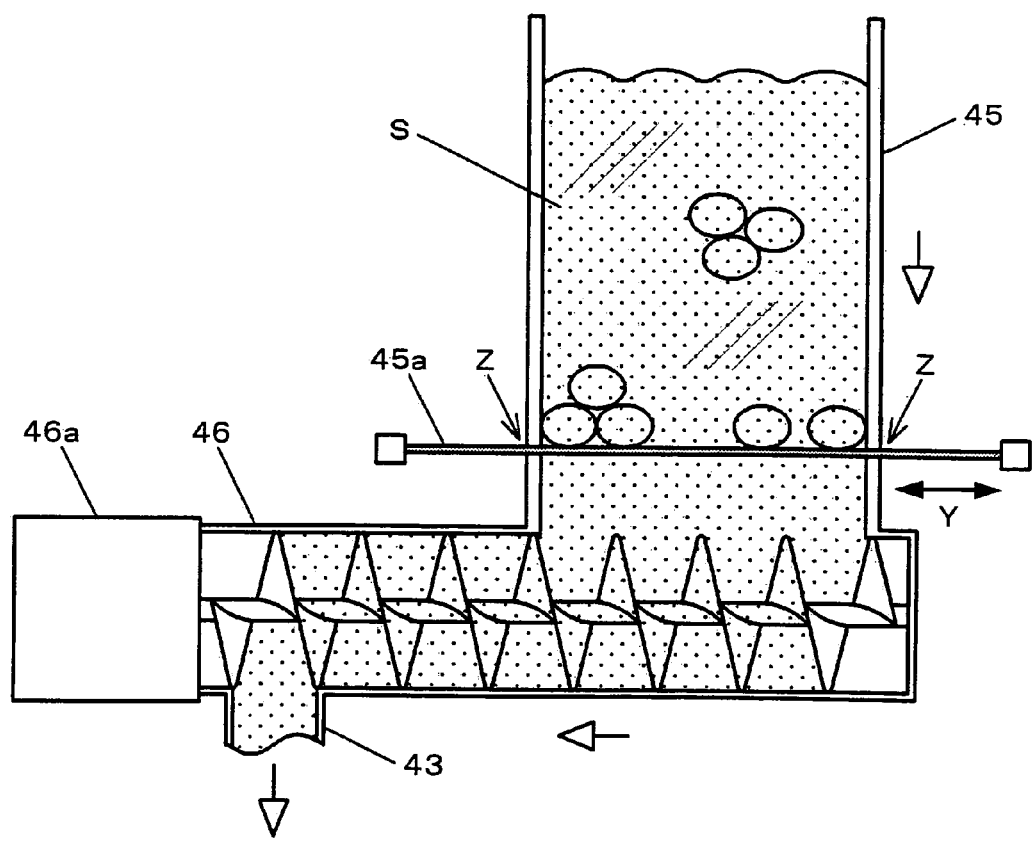
FIG. 11 is an enlarged view of the principle parts of a seasoning feeder of the fourth embodiment according to the present invention.

As depicted enlarged in FIG. 11, there are cases in which the powdered seasoning S stored in the storage tank 45 of the first embodiment agglomerates due to pressure, humidity, and the like. In doing so, supply failures may occur due to the occurrence of seasoning bridging inside the storage tank 45. Further, to prevent agglomeration, solidifying, and bridging of the powdered seasoning, it is conceivable to continuously vibrate the storage tank 45 using a vibrator. However, either this does not completely solve the problem, or increasing the vibration conversely creates the problem of noise.

Further, as shown in FIG. 11, the bottom surface of the storage tank 45 includes a mesh 45a, and the mesh 45a or the storage tank body 45, or both 45, 45a, are reciprocatingly moved or circularly moved as shown by the arrow Y. In doing so, the seasoning in the storage tank 45, in a powdered state as is, passes through the mesh 45a of its own weight. The contact part Z of the storage tank body 45 and the mesh 45a function as a mill, grinding and pulverizing the solidified seasoning in the storage tank 45. In either case, bridging is prevented, and driving the screw feeder 46 by the motor 46a satisfactorily extracts the prescribed amount of seasoning S. Moreover, the reciprocating motion or circular motion of the mesh 45a and the storage tank body 45 obtains an effect to some extent even if not performed vigorously, thereby not creating a noise problem as well.

Fifth Embodiment

Figure 12:
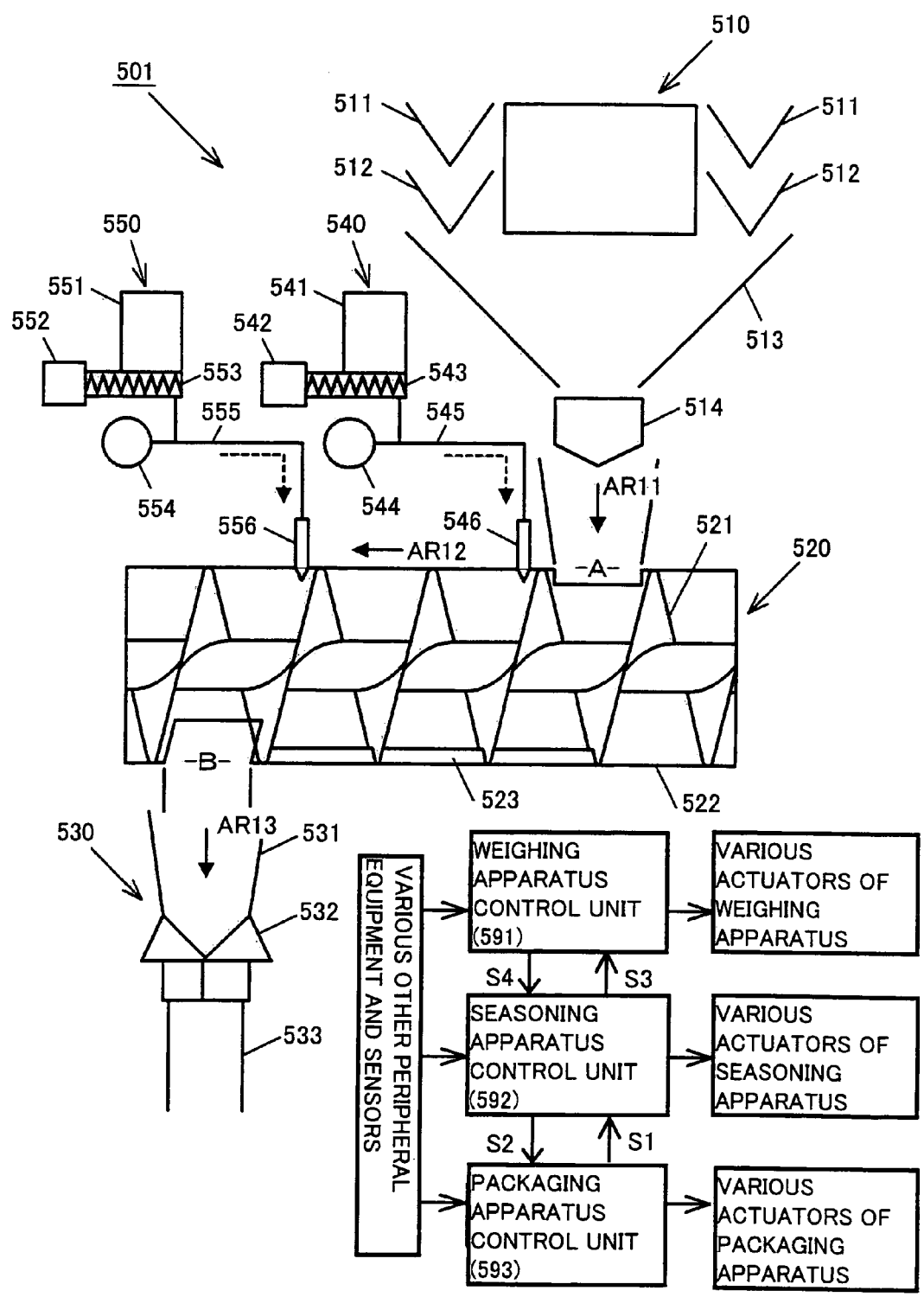
FIG. 12 is a block diagram of the entire product manufacturing system according to the fifth embodiment of the present invention.

FIG. 12 is a block diagram of the entire product manufacturing system 501 according to the fifth embodiment of the present invention. The product manufacturing system 501 weighs, seasons, and packages snacks like potato chips, and includes, in sequence of the direction of the flow of the articles from the upstream side, a weighing apparatus 510, the seasoning apparatus 520, and a packaging apparatus 530.

<Overview of the Weighing Apparatus>

The weighing apparatus 510 is, for example, a well-known combination weighing apparatus, weighs in a plurality of weigh hoppers 512 . . . 512 articles supplied via a plurality of pool hoppers 511 . . . 511, calculates combinations of each weight value, discharges articles from the weigh hoppers 512 . . . 512 corresponding to the optimal combination, and collects the articles in a timing hopper 514 by a collection chute 513. Further, the timing hopper 514 opens, and the collected one group of articles is supplied from an article supply port A to the seasoning apparatus 520 (arrow AR11).

<Overview of the Seasoning Apparatus>

The seasoning apparatus 520 includes a screw 521 that extends horizontally, and a tube 522 wherein the screw 521 is installed. Further, the article group supplied from the article supply port A is transported to the article discharge port B while seasoning (arrow AR12), and that seasoned article group is discharged from the article discharge port B to the packaging apparatus 530 (arrow AR13).

The seasoning apparatus 520 is further provided with seasoning feeders 540, 550. The seasoning feeders 540, 550 have spray guns 546, 556 provided and arranged at the approximate center part in the lengthwise direction of the tube 522. The spray guns 546, 556 are connected to the air compressors 544, 554 via conduits 545, 555. The powdered seasoning stored in storage tanks 541, 551 is measured out by screw feeders 543, 553 by the drive of motors 542, 552, and introduced to the conduits 545, 555. The introduced powdered seasoning rides upon the compressed air produced by the air compressors 544, 554, and is sprayed from the nozzles of the spray guns 546, 556 into the tube 522. Furthermore, it is acceptable for the seasoning feeders 540, 550 to respectively supply the same seasoning, and it is also acceptable to respectively supply different seasonings. In the former case, it is possible, for example, to reliably perform seasoning; in the latter case, it is possible to achieve, for example, rich-flavored seasoning.

<Overview of the Packaging Apparatus>

The packaging apparatus 530 is, for example, a well-known vertical pillow-type packaging apparatus, drags strip packaging material (not shown) downward while forming it into a tubular shape with a former 532 at the periphery of a tube 533 extending vertically, and longitudinally and transversely seals the packaging material, thereby forming a bag. Further, the bag is filled, via an intake chute 531 and the tube 533, with a seasoned article group discharged from the seasoning apparatus 520, thereby completing the product (in the present embodiment, a bag filled with snacks).

<Details of the Seasoning Apparatus>

Figure 13:
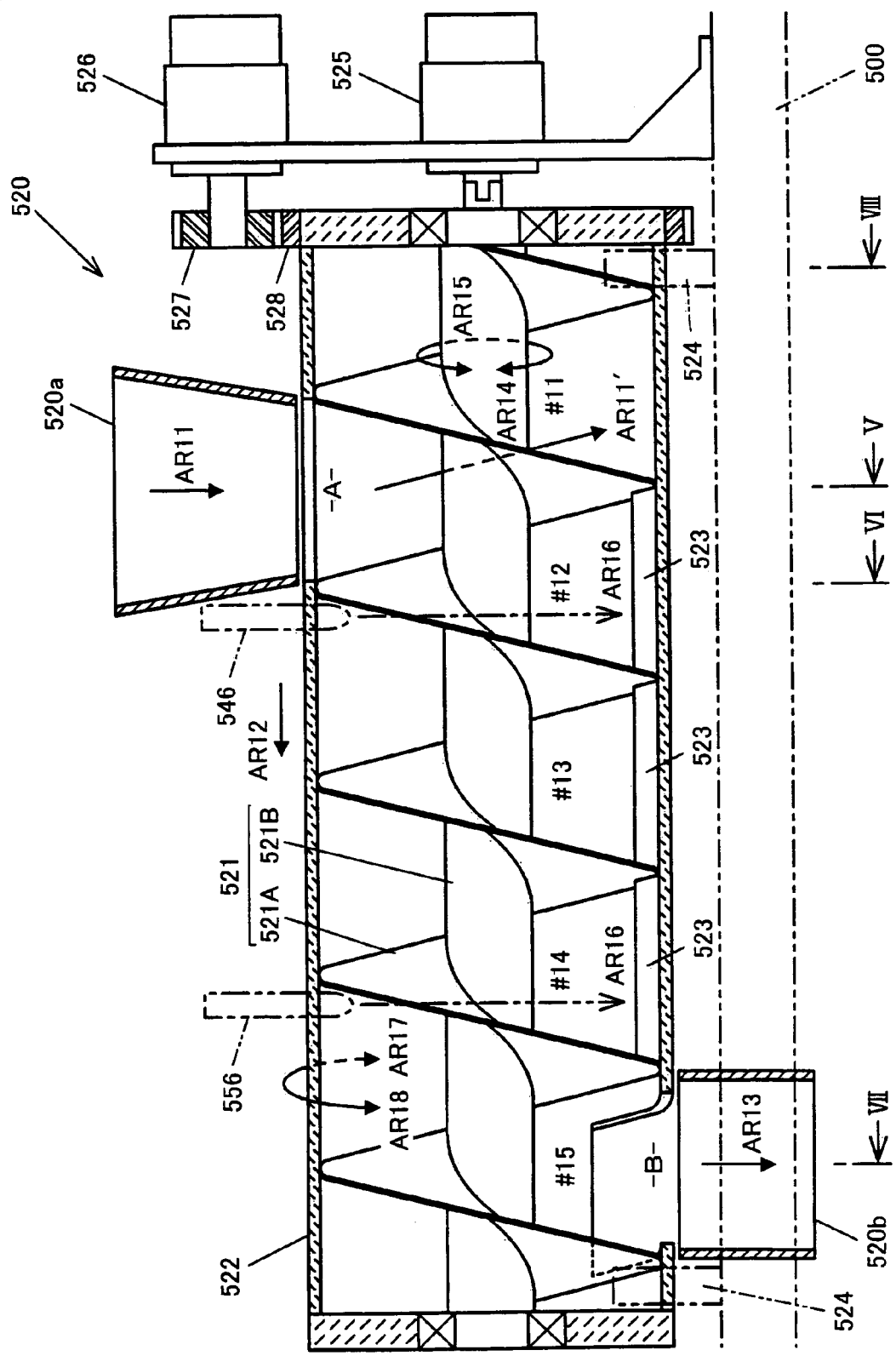
FIG. 13 is a side cross-sectional view of the seasoning apparatus provided in the product manufacturing system according to the fifth embodiment.

As depicted enlarged in FIG. 13, the seasoning apparatus 520 is installed on a platform 500. The upstream part of the seasoning apparatus 520 is provided with the article supply port A and an inlet chute 520a, constituting the supply part of the article group. The downstream part of the seasoning apparatus 520 is provided with the article discharge port B and a discharge chute 520b, constituting the discharge part of the article group.

The screw 521 has a helical blade 521A and a screw shaft 521B, and is rotated in both directions AR14, AR15 around the screw shaft 521B by a motor 525 (arrow AR14 represents normal rotation, and arrow AR15 represents reverse rotation). The helical blade 521A is wound around a helix a plurality of times (5½ times in the example shown) at the same pitch. The helical blade 521A provides a plurality of horizontally arrayed partitions inside the tube 522. The partitions partition spaces inside the tube 522 and demarcate a plurality of sections #11-#15 (five in the example shown) arrayed horizontally. The helical blade 521A helically partitions the space inside the tube 522, and each of the sections #11-#15 are not closed but are mutually and helically connected. However, because the article group and seasoning collect at the bottom part inside the tube 522, the article group and seasoning at the part lower than the screw shaft 521B are blocked by the helical blade 521A, and cannot move back and forth to and from adjacent spaces. Consequently, within the helical space, the part lower than the screw shaft 521B can be used as a section that accommodates the article group and seasoning, and separates them from other article groups and seasoning.

If the motor 525 rotates the screw 521 in the direction of the arrow AR14 (normal rotation), then all sections #11-#15 move together from the upstream side toward the downstream side (move to the discharge part B side), and the article groups accommodated in the sections #11-#15 are transported from the article supply port A to the article discharge port B. In contrast, if the motor 525 rotates the screw 521 in the direction of the arrow AR15 (reverse rotation), then all sections #11-#15 move together from the downstream side to the upstream side (move to the supply part A side), and the article groups accommodated in sections #11-#15 return back to the supply part A side.

Figure 14:
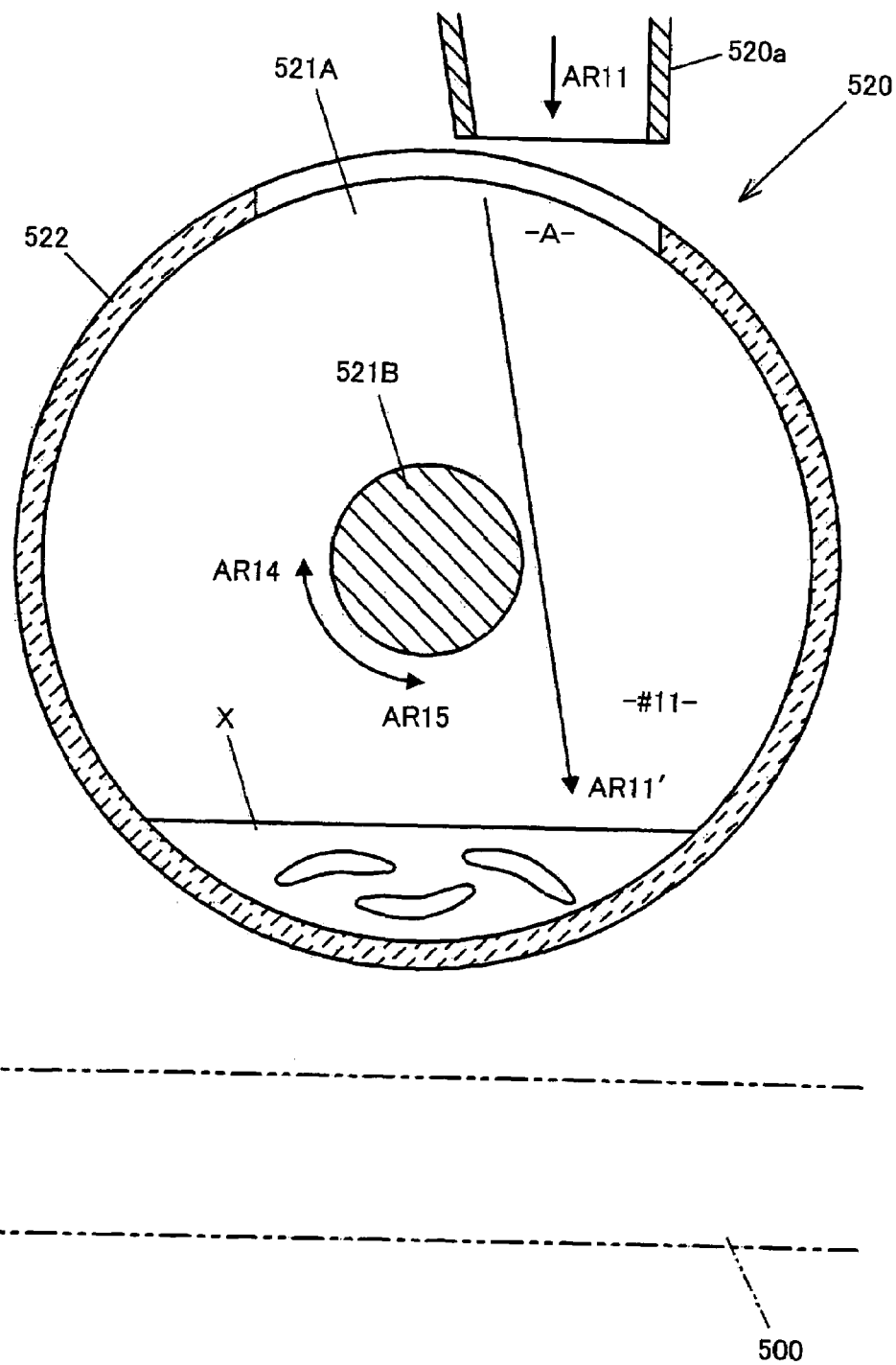
FIG. 14 is a longitudinal cross-sectional view, seen from the upstream side, of the seasoning apparatus according to the fifth embodiment, viewed from the arrow V of FIG. 13.

The first section #11 is a section wherein an article group is initially supplied from the weighing apparatus 510 to the seasoning apparatus 520 via the inlet chute 520a and the article supply port A (article supply section). As shown in FIG. 14, the lower end part of the inlet chute 520a is not directly above the screw shaft 521B, but rather is positioned displaced from the screw shaft 521B. This is because the article group X must enter the first section #11 as shown by the arrow AR11', and must not enter the second section #12 on the downstream side (refer to FIG. 13).

The second section #12 and the fourth section #14 are sections wherein the previously discussed spray guns 546, 556 supply powdered seasoning (seasoning supply sections). Furthermore, FIG. 13 depicts the state wherein the spray guns 546, 556 do not overlap the second section #12 and the fourth section #14 (state in which the rotational angle of the screw 521, discussed later, is 0°). If the sections #11-#15 moved to the downstream side from this point forward, the second section #12 and the fourth section #14 will overlap the spray guns 546, 556, and the powdered seasoning sprayed from the spray guns 546, 556 will be reliably supplied to the second section #12 and the fourth section #14.

Figure 15:
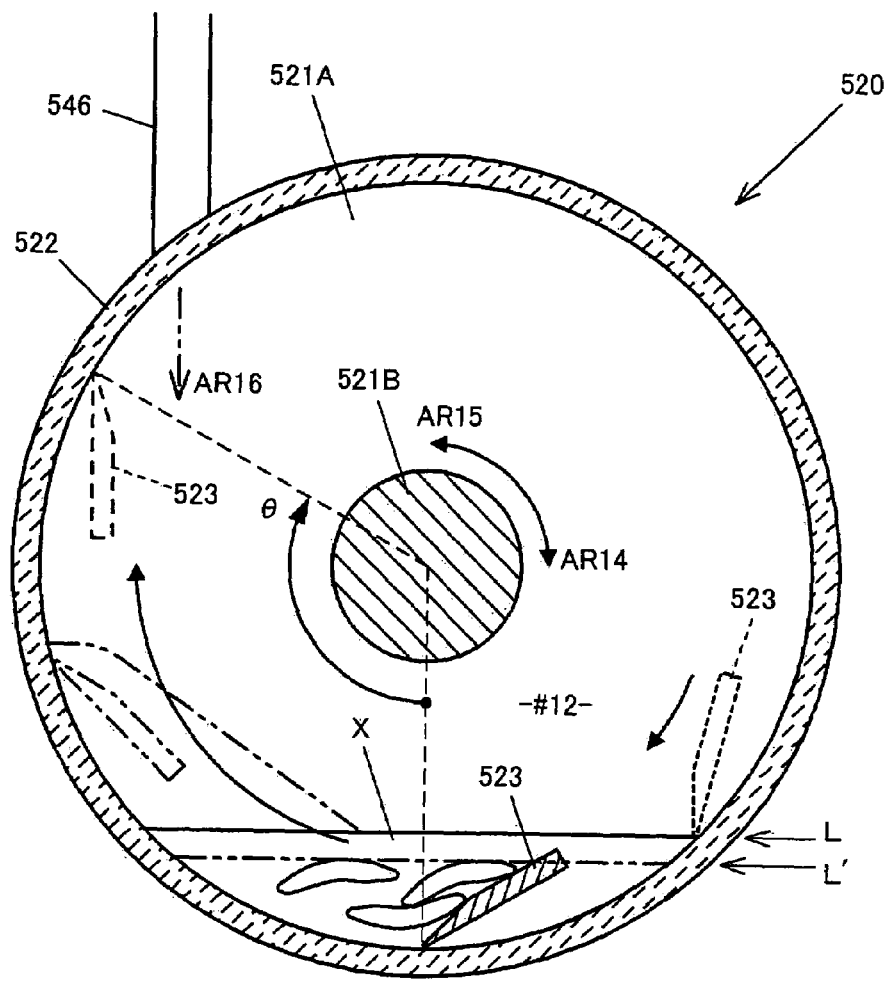
FIG. 15 is a longitudinal cross-sectional view, seen from the upstream side, of the seasoning apparatus according to the fifth embodiment, viewed from the arrow VI of FIG. 13.

As shown in FIG. 15, the spray guns 546, 556 are provided upright on the peripheral surface of the tube 522, and are supported by brackets and the like (not shown). The spray guns 546, 556 spray the powdered seasoning aiming for the region close to the inner peripheral surface of the tube 522 (arrow AR16). The spray guns 546, 556 spray a quantity of powdered seasoning corresponding to the quantity of the article group separately accommodated in each section, and the mix ratio of the article group and the seasoning in each section is continuously maintained at the prescribed optimal ratio.

Figure 16:
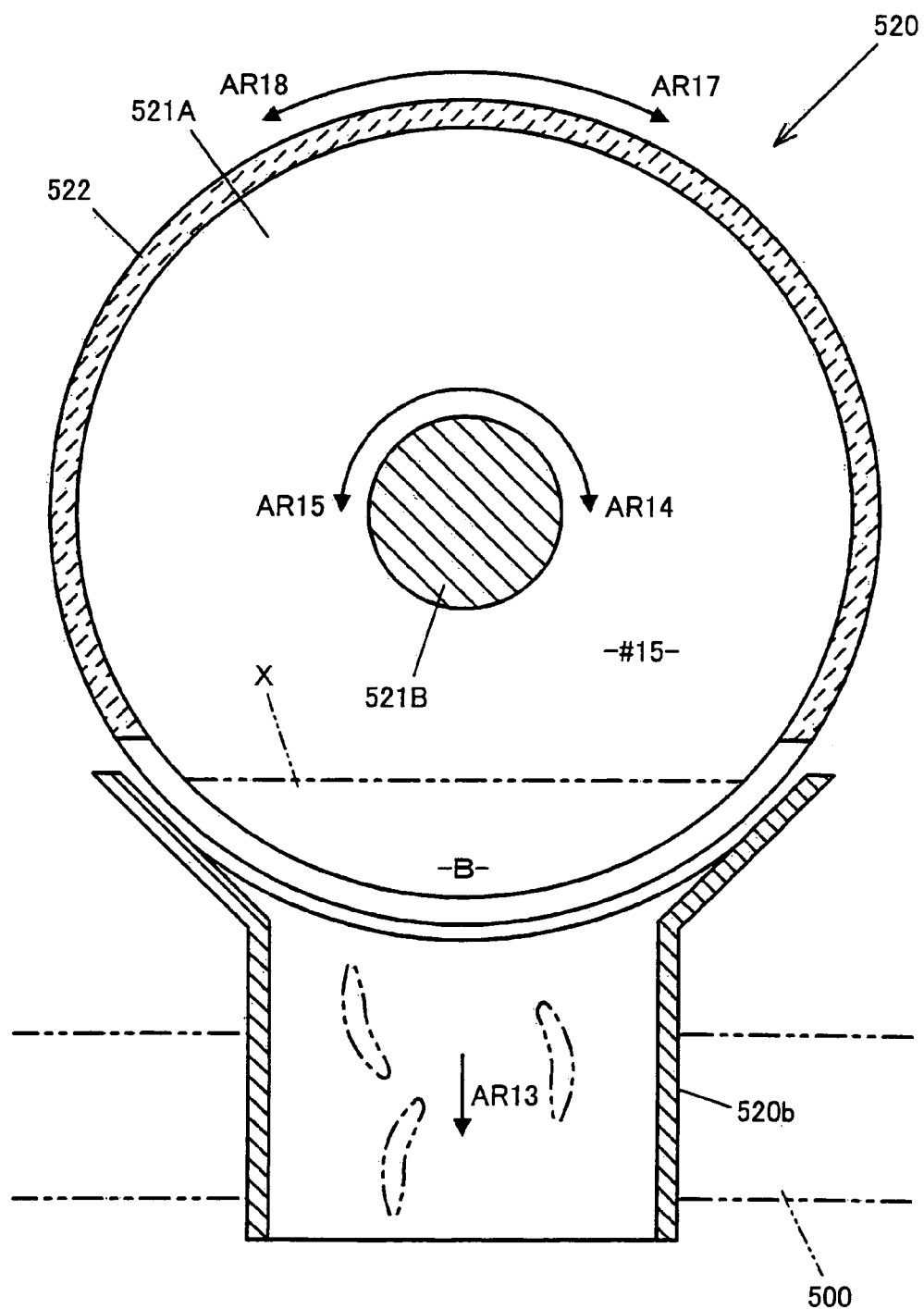
FIG. 16 is a longitudinal cross-sectional view, seen from the upstream side, of the seasoning apparatus according to the fifth embodiment, viewed from the arrow VII of FIG. 13.

The fifth section #15 is a section wherein the seasoned article group is discharged from the seasoning apparatus 520 to the packaging apparatus 530 via the article discharge port B and the discharge chute 520b (article discharge section). As shown in FIG. 16, the article discharge port B is positioned directly below the screw shaft 521B. Thereby, the entire quantity of the seasoned article group X that collected in the bottom part inside the tube 522 is rapidly discharged from the seasoning apparatus 520 to the packaging apparatus 530.

Agitating plates 523 . . . 523 are provided and mounted between the partitions formed by the helical blade 521A from the second section #12 across to the fourth section #14 (herein, the third section #13 is an agitation section). The agitating plate 523 serves the purpose of agitating the article group and seasoning accommodated in each of the second section #12 through the fourth section #14. The agitating plate 523 operates integrated with the helical blade 521A, and moves circularly about the screw shaft 521B attendant with the rotation of the screw 521. As a result, when the agitating plate 523 passes below the screw shaft 521B, it contacts the article group and seasoning accumulated at the lower part of each of the second section #12 through the fourth section #14 inside the tube 522. Further, as shown by the example of the broken chain-link line in FIG. 15 (for the case in which the screw 521 rotates normally in the AR14 direction), the article group X and seasoning are combed upward along the inner peripheral surface of the tube 522, and are thereby agitated. The article group X is thinly spread along the inner peripheral surface, and each individual article that constitutes the article group X is externally exposed and well mixed with seasoning. As a result, the article group X is uniformly seasoned, and each individual article is seasoned without any unevenness.

In other words, while the article group X supplied with seasoning is being transported toward the discharge port B, the article group X and the seasoning are agitated by the agitating plate 523, and individual articles in the article group X roll and be turned over, thereby eliminating, for example, the adherence of seasoning to just one side of an article. Accordingly, seasoning can be adhered over the entirety of each article without any unevenness, thus reliably seasoning each individual article without any unevenness. Moreover, because such agitation is performed by the agitating plate 523 which has a flat surface, the agitation effect increases, thereby enabling each individual article to be more reliably seasoned without any unevenness.

Figure 17:
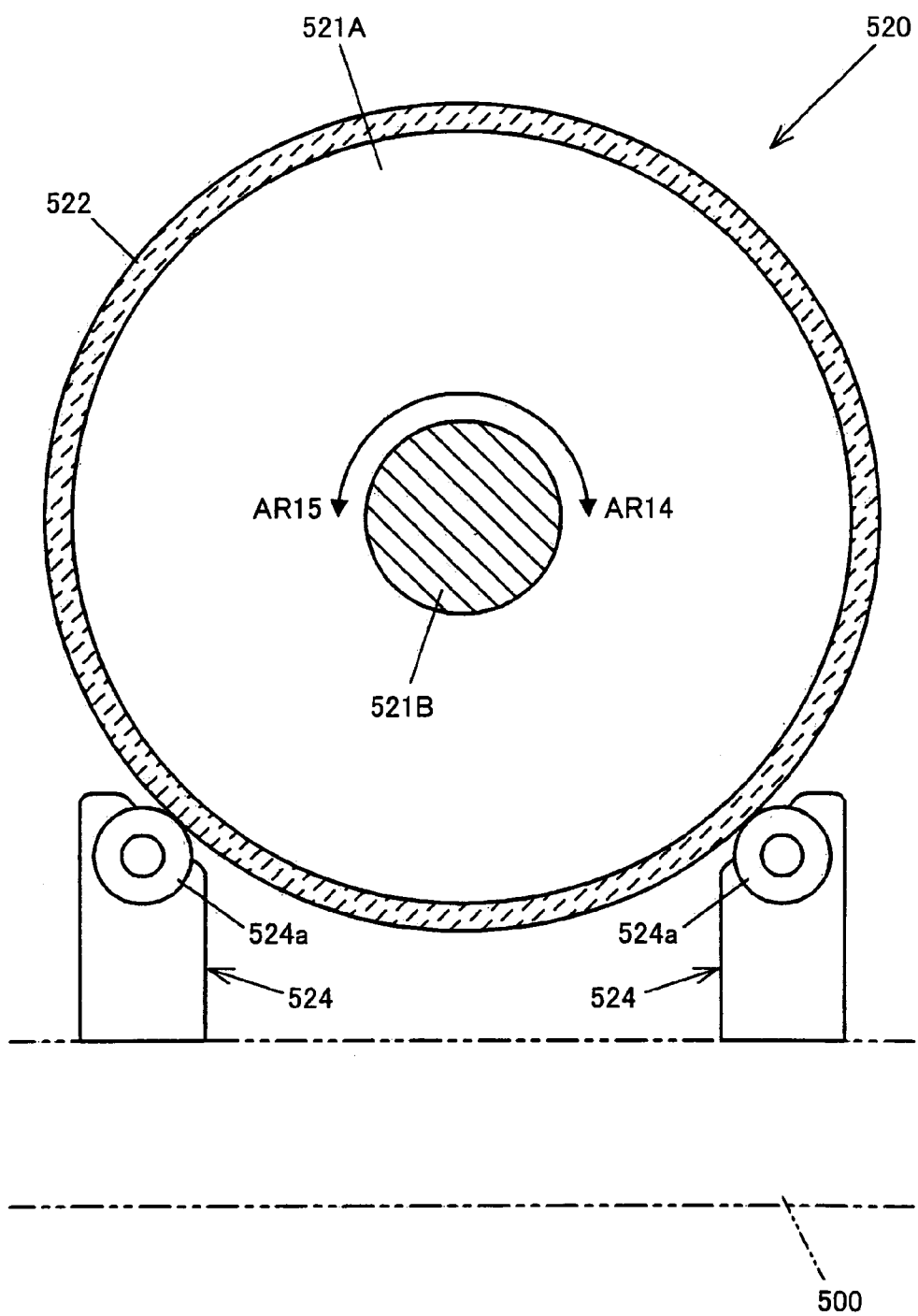
FIG. 17 is a longitudinal cross-sectional view, seen from the upstream side, of the seasoning apparatus according to the fifth embodiment, viewed from the arrow VIII of FIG. 13.

In the present embodiment, the tube 522 is supported freely rotatable around an axis by support units 524 . . . 524. As shown in FIG. 17, the present embodiment is constituted so that each support unit 524 supports the tube 522 using a roller 524a. The tube 522 is cylindrical, and the inner peripheral surface, which slidably contacts the helical blade 521A, and the outer peripheral surface, which rollably contacts the roller 524a, both have a circular cross section. The second motor 526 rotates the tube 522 about an axis via a pinion 527 and a gear 528 (arrows AR17, AR18 in FIG. 13 and FIG. 16). The tube 522 is made of a highly transparent resin (e.g., an acrylic resin), including the end face on the upstream side and the downstream side and not just the body, so that the contents therein can be clearly observed externally.

As shown in FIG. 12, each of the control units 591, 592, 593 of the weighing apparatus 510, the seasoning apparatus 520 and the packaging apparatus 530 receive signals from, for example, other various peripheral equipment and sensors and the like located on the upstream side and downstream side of the product manufacturing system 501, and also mutually exchange signals S1-S4. For example, the control units 591, 592, 593 control various actuators, such as the open-close motors of the weigh hoppers 512, timing hopper 514, and the like in the case of the weighing apparatus 510; the rotary motors 525, 526 of the screw 521, the tube 522, and the like, in the case of the seasoning apparatus 520; and the drive motors of a pull-down belt, a transverse sealing apparatus, and the like, in the case of a packaging apparatus 530.

<Example of Basic Operation>

Figure 18:
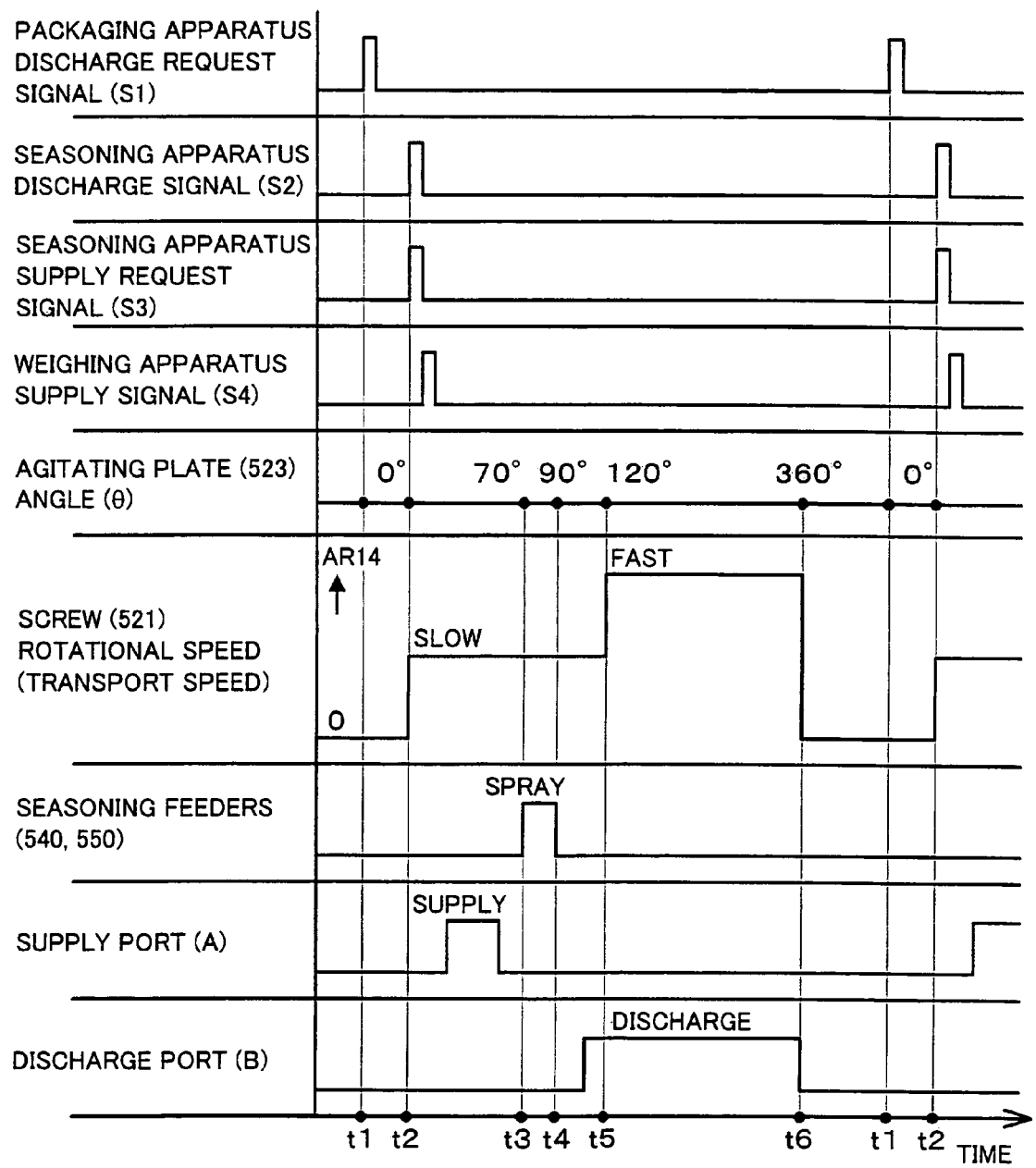
FIG. 18 is a time chart that depicts the basic operation of the seasoning apparatus according to the fifth embodiment for the case in which the article group is moved only toward the discharge part side, and is transported to the discharge part.
Figure 19:
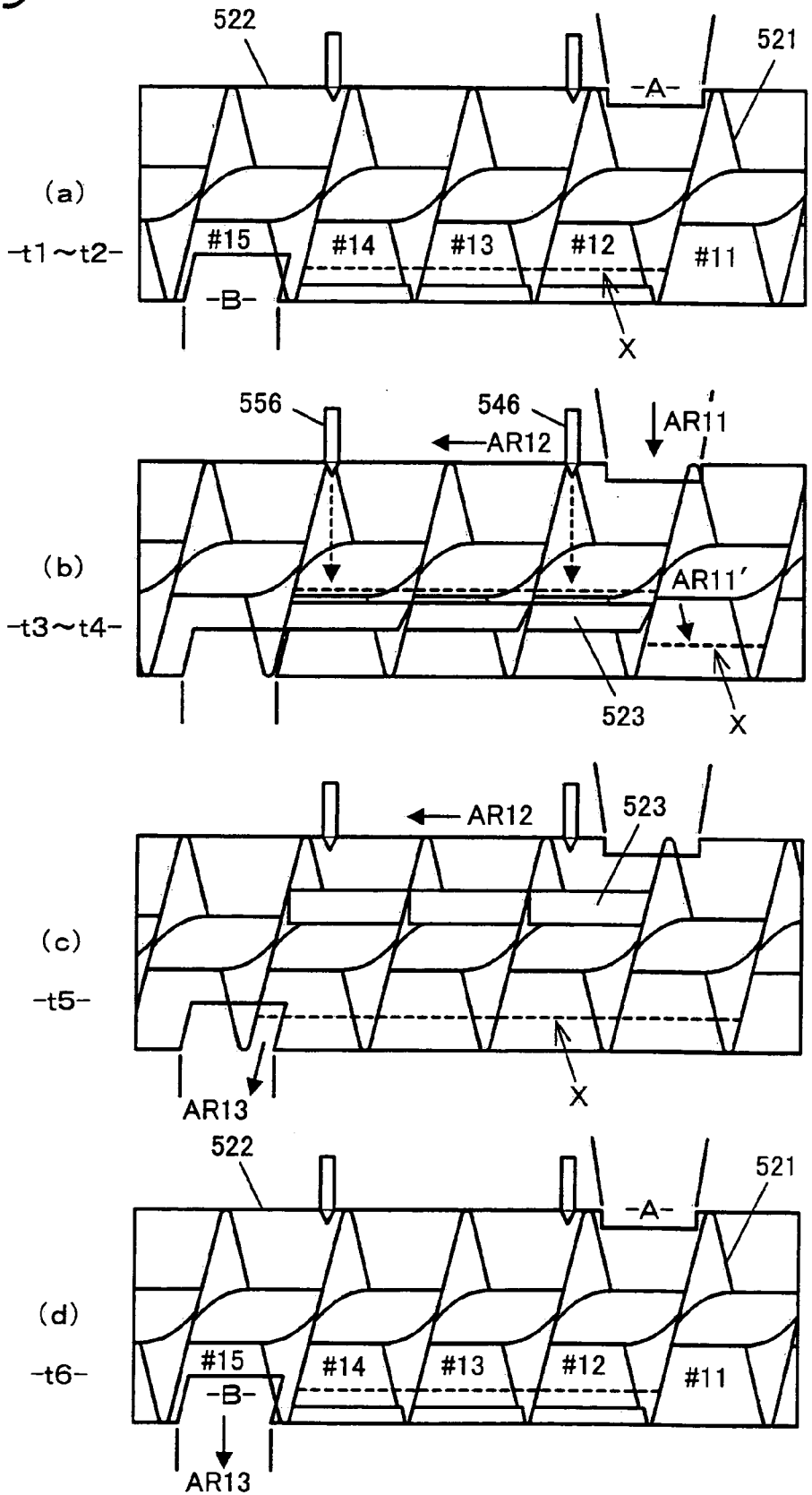
FIG. 19 is an operation diagram that depicts the basic operation of the seasoning apparatus according to the fifth embodiment for the case in which the article group is moved only toward the discharge part side, and is transported to the discharge part.

FIG. 18 is a time chart that depicts one example of the basic control operation of the seasoning apparatus 520 in the product manufacturing system 501, i.e., moving only the article group X to the discharge part B side (for that purpose, the screw 521 rotates only normally in the AR14 direction), and transporting it to the discharge part B. FIG. 19 is the related operation diagram. Basically, in response to a request signal from a downstream apparatus, the product manufacturing system 501 sequentially begins operation of the upstream apparatuses. Namely, as shown in FIG. 18, if the packaging apparatus 530 sends a discharge request signal S1 (time t1) to the seasoning apparatus 520 demanding the discharge of a seasoned article group, the seasoning apparatus 520 receives that signal and, after a prescribed delay time (variable) has elapsed, starts the rotation of the screw 521 and sends a discharge signal S2 back to the packaging apparatus 530 to the effect that a seasoned article group has been discharged (time t2).

In addition to replying with a discharge signal S2, the seasoning apparatus 520 sends a feed request signal S3 to the weighing apparatus 510 demanding the supply of a weighed article group. The weighing apparatus 510 receives that signal, opens the timing hopper 514, and replies to the seasoning apparatus 520 with a feed signal S4 stating that a weighed article group has been discharged. As a result, one group of articles that has been weighed but not yet seasoned pass through the article supply port A, and is supplied to the first section #11 of the seasoning apparatus 520. "SUPPLY" in the article supply port A field of FIG. 18 indicates the time period during which this one group of articles, not yet seasoned, passes through the article supply port A in this manner.

Taking the opportunity of a discharge request signal S1 from the packaging apparatus 530, the screw 521 will perform just one 360° rotation in the AR14 direction, subsequently stop, and then wait to receive the next discharge request signal S1. In that case, the screw 521, as shown by the solid line in FIG. 15, will stand by with the agitating plates 523 . . . 523 at a position directly below the screw shaft 521B (bottom part of the section). In other words, the screw 521 will start rotating from this position (FIG. 19(a)), and will stop at this position (FIG. 19(d)). Each numeric value in the agitating plate 523 angle field in FIG. 18 indicates the rotational angle θ from the reference position (0°) indicated by the line in FIG. 15 in the AR14 direction. Clearly, if the screw 521 rotates by 360°, then each of the sections #11-#15 respectively advance by one pitch.

The screw 521 rotates slowly from 0° to 120°. This interval (t2-t5) is a time period when the agitating plate 523 combs the article group X and seasoning upward from the bottom part of the section along the inner peripheral surface of the tube 522, thereby agitating them, as previously discussed. Thereby, because the article group X and seasoning are agitated slowly over a period of time, the article group X is uniformly seasoned, and each individual article is more reliably seasoned without any unevenness. In addition, there is virtually no concern that the agitating plate 523 will kick up the articles at a high speed and move them to an adjacent section through the helical space. Furthermore, the present embodiment also inhibits problems such as the agitating plate 523 making strong contact with the articles, causing cracking, chipping, and breaking of the articles.

Moreover, as clearly shown by the dotted line in FIG. 15, the tip part of the agitating plate 523 in the rotational direction AR14 is proximate to the inner peripheral surface of the tube 522. Thereby, a large quantity of articles in the tube 522 and in the section can be scooped up and agitated without any escaping. In addition, the tip part of the agitating plate 523 in the rotational direction AR14 is thinner than other parts. Thereby, the present embodiment reduces the shock when the agitating plate 523 and the articles make contact, making it easy for articles to ride upon the agitating plate 523, thereby inhibiting the cracking, chipping, and breaking of the articles.

In addition, as clearly shown by the broken line in FIG. 15, the agitating plate 523 is provided between the partitions formed by the helical blade 521A so that it takes on a position extending approximately in the vertical direction before arriving directly above (180°) the screw shaft 521B due to the rotation of the screw 521. Thereby, at the point in time when the agitating plate 523 is positioned extending approximately in the vertical direction, the articles are lifted up by the agitating plate 523, and the agitated articles are all dropped downward. Accordingly, there is virtually no concern that the articles consequently agitated by the agitating plate 523 will ride on the agitating plate 523 and move to an adjacent section through the helical space. As a result, the agitation speed of the agitating plate 523 (rotational speed of the screw 521, or the transport speed of the article group X) can be increased, thus improving the processing performance of the seasoning apparatus 520.

Furthermore, in the present example, the agitating plate 523 extends approximately vertically (refer to the agitating plate 523 shown by the broken line in FIG. 15) when the screw 521 has rotated 120° (t5: FIG. 19(c)). Namely, when the agitating plate 523 faces downward and finishes dropping all the articles, the screw 521 immediately shifts to a high-speed rotation. Of course, the time at which the agitating plate 523 extends in the vertical direction, and the time at which the screw 521 starts to rotate at a high speed do not have to necessarily coincide, as long as the former occurs prior to the latter.

The seasoning feeders 540, 550 supply the powdered seasoning at an appropriate time period when the agitating plate 523 is combing the article group X upward from the bottom of the section along the inner peripheral surface of the tube 522 (t3-t4: FIG. 19(b)). The time period in which the seasoning is sprayed is set according to: firstly, the timing in which the article group X rides upon the agitating plate 523, is combed upward, and spreads thinly along the inner peripheral surface of the tube 522, thereby clearly exposing each and every individual article externally; secondly, the timing in which the spray guns 546, 556 overlap with the second section #12 and the fourth section #14, as discussed earlier; and thirdly, the timing in which the sprayed seasoning pours down upon the approximately center part of the article group X (center part of the section in the arrayed direction); and the like. In the present example, spraying begins when the screw 521 has rotated 70° (t3) (refer to the agitating plate 523 shown by the chain-link line in FIG. 15), and spraying finishes when the screw 521 has rotated 90° (t4).

The screw 521 rotates rapidly from 120° to 360° (t5-t6: FIG. 19(c)-FIG. 19(d)). Thereby, the transport speed of the article group X increases, improving the processing performance of the seasoning apparatus 520. In addition, the article group X that was in the fourth section #14 finally arrives at the article discharge port B, and is discharged from the fifth section #15 to outside of the seasoning apparatus 520.

The following explains the discharge of the seasoned article group X.

As discussed earlier, the seasoned article group X is dropped from the fifth section #15 to the packaging apparatus 530 via the article discharge port B. In that case, when packaging one bag at a time for each singular section, there must be a distinct spacing (demarcation or partition) between the article group cluster that was previously dropped and discharged and the article group cluster that is to be dropped and subsequently discharged. In other words, it is preferable that the tail end of the article group while falling through the tube 533 of the packaging apparatus 530 be short. Otherwise, articles will get caught in the transverse seals in the packaging apparatus 530. The present operational example is suitable because, at that point, the screw 521 is rotated intermittently and, from the time t6 to the time t2 of the next operation cycle, the transport, seasoning (spraying and agitation of seasoning), and discharge of articles are stopped, during which time a distinct spacing is formed between article groups before and after being dropped and discharged from the seasoning apparatus 520.

<Example of Reciprocating Motion of Articles>

FIG. 20 is a tabular time chart that shows a characteristic operation for controlling the seasoning apparatus 520, i.e., one example of operation wherein the article group X is reciprocatingly moved to the discharge part B side and to the supply part A side (the screw 521 rotates normally in the AR14 direction and reversely in the AR15 direction for that purpose), and then transported to the discharge part B. Furthermore, for the sake of convenience, the second section #12 and the fourth section #14, which are the seasoning supply sections, are respectively denoted as the first seasoning section and the second seasoning section.

Next, a new article group A is supplied to the seasoning apparatus 520 into the first section #11 when, for example, the number of rotations is one (number of rotations of the screw 521 regardless of whether normal or reverse rotation) (the symbol A enclosed by a circle indicates newly supplied article groups; likewise for others). At this time, article groups D, C, B are sequentially accommodated in sections #12-#14, respectively, in the forward transport direction (downstream side). Next, the screw 521 is rotated normally in the AR14 direction and advances once (rotation No. 2), whereupon the frontmost article group B is discharged from the fifth section #15 to outside of the apparatus. The article group A transitions to the second section #12, where it is sprayed with seasoning (the underlining of the symbol A indicates that it is supplied with seasoning; furthermore, only the article group A is underlined in the table), performing the first seasoning. Furthermore, the first section #11 is not supplied with the next article group at this time (sections marked with " . . . " indicate an empty section).

Next, the screw 521 is reversely rotated this time in the AR15 direction and backs up once (rotation No. 3), whereupon the article group A backtracks to the first section #11, while the fourth section #14 becomes empty. At this time, if an agitating plate 523 is provided beforehand in the first section #11 as well (the agitating plate 523 does not particularly interfere with the supply of the article group), then it is more preferable because the staying time and contact time of the article group A with the seasoning not only simply increases, but the article group A is also agitated in the first section #11. Herein, it is better to bring an article group newly supplied to the seasoning apparatus 520 into the presence of seasoning as early as possible. In this sense, the first seasoning is performed at the time of rotation No. 2.

Next, the screw 521 is once again rotated normally in the AR14 direction and advances once (rotation No. 4). The article group A transitions once again to the second section #12, and is then resupplied with seasoning. At this time, the next new article group B is supplied to the first section #11. Next, the screw 521 is rotated normally in the AR14 direction and advances once (rotation No. 5). The frontmost article group C is discharged from the fifth section #15 to outside the apparatus. The article group A is agitated with the seasoning in the third section #13.

Next, the screw 521 is rotated this time, once again, reversely in the AR15 direction and backtracks once (rotation No. 6). In doing so, the article group A returns back once again to the second section #12 where it is sprayed with seasoning once more. Next, the screw 521 advances (rotation No. 7), whereupon the article group A is simply agitated in the third section #13; next, the screw 521 advances once more (rotation No. 8), whereupon the article group A is sprayed with seasoning in the fourth section #14. Next, the screw 521 backtracks (rotation No. 9), whereupon the article group A is simply agitated in the third section #13; next, the screw 521 advances (rotation No. 10), whereupon the article group A is sprayed once again with seasoning in the fourth section #14. Then, the screw 521 advances (rotation No. 11), whereupon the article group A is discharged from the fifth section #15 to outside the apparatus. This type of transport and seasoning operation is the same for each of the other B, C, and D article groups. Furthermore, the state of rotation No. 13 in the table returns to the same state as the first rotation No. 1.

Thus, by rotating the screw 521 normally twice in the AR14 direction and reversely once in the AR15 direction, the section repetitively advances twice and backtracks once. As a result, the article group A (likewise for the other article groups B, C, D) repetitively performs the supply and agitation of seasoning (i.e., the seasoning work) over an extremely long time period: (1) supply→(2) seasoning→(3) transport (or agitation)→(4) seasoning→(5) agitation→(6) seasoning→(7) agitation→(8) seasoning→(9) agitation→(10) seasoning→(11) discharge. In contrast, in just the basic operation previously discussed (refer to FIGS. 18, 8), the article group undesirably quickly exits from the seasoning apparatus 520 in an extremely short time period: (1) supply→(2) seasoning→(3) agitation→(4) seasoning→(5) discharge.

Namely, in the present article reciprocating operation, because the article group is reciprocatingly moved to the discharge part B side and the supply part A side while the article group supplied with seasoning is being transported, the total transport distance of the article group, and the staying time and contact time of the article group and the seasoning can thereby be sufficiently lengthened. As a result, the staying time and agitation time of the article group with the seasoning are satisfied and uniform seasoning is reliably implemented with hardly any heavily seasoned parts or lightly seasoned parts. Moreover, the article group and seasoning were made to move reciprocatingly as an expedient for that purpose, e.g., even if the total transport distance lengthens, the apparent required transport distance (length in the axial direction of the screw 521 and the tube 522) does not lengthen, and it is consequently possible to avoid lengthening of the seasoning apparatus 520. As a result, there is no need to struggle with the issue of the installation location of the seasoning apparatus 520 as well as the product manufacturing system 501 because they do not require a large area.

In addition, attendant with the reciprocating motion of the article group, the same article group (e.g., if A, then A) passes through the first seasoning section #12 and the second seasoning section #14 a plurality of times, and the same article group can be supplied with seasoning a plurality of times corresponding thereto. As a result, the present invention can adhere a number of layers of seasoning to an article group, e.g., reliable seasoning can be performed if, for example, the same seasoning is supplied a number of times; further, rich-flavored seasoning can be achieved if, for example, different seasonings are supplied. Furthermore, in the present example, seasoning is sprayed every time the article group passes through the seasoning sections #12, #14 (total of five times), but the present invention is not limited thereto. It is acceptable to reduce the number of times the seasoning is sprayed. However, even in that case, it is preferable to bring an article group newly supplied to the seasoning apparatus 520 into the presence of seasoning as early as possible, as discussed previously, and the supply of the first seasoning is therefore definitely performed when the article group first moves to the first seasoning section #12.

Sixth Embodiment

Figure 21:
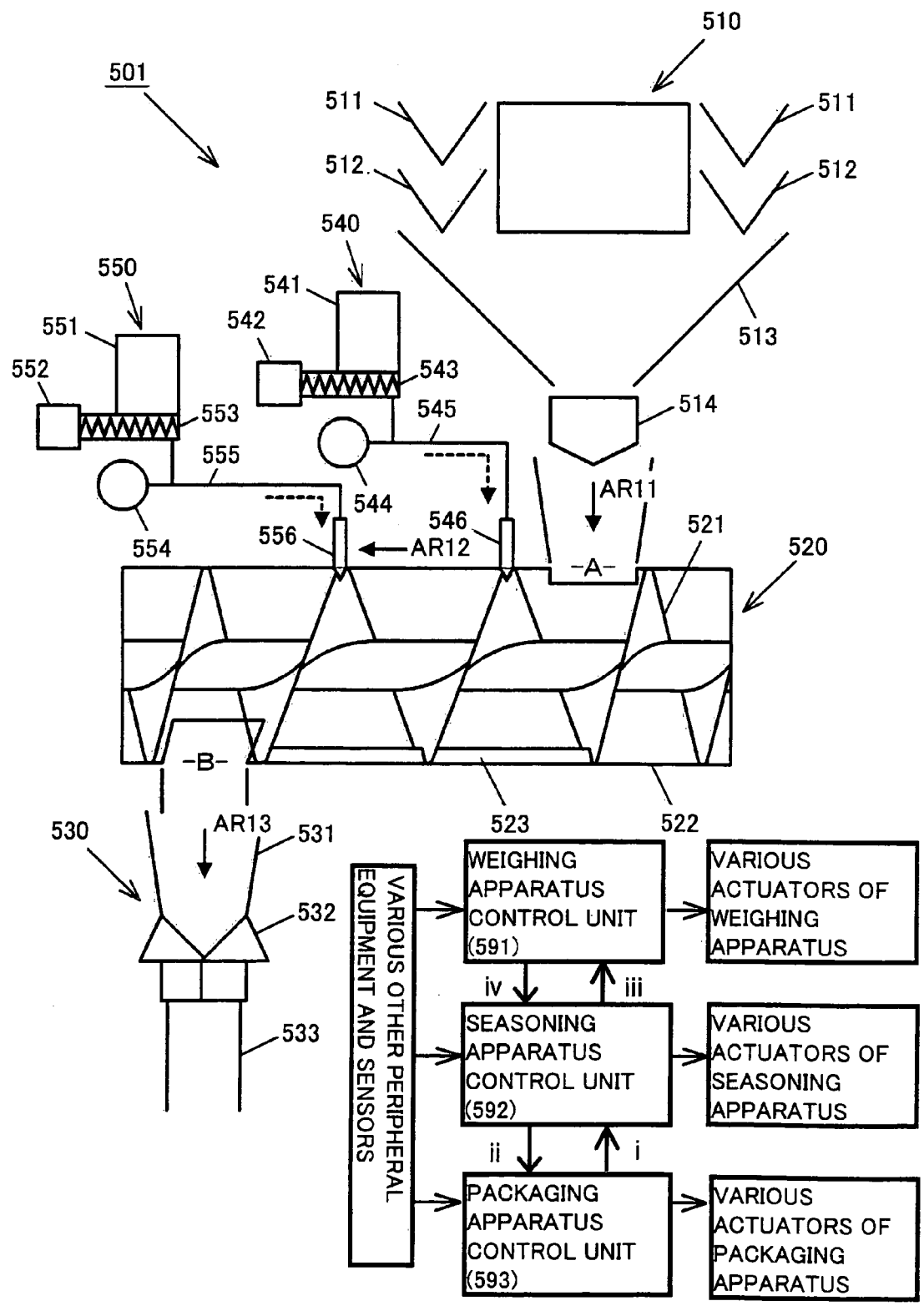
FIG. 21 is a block diagram of the entire product manufacturing system according to the sixth embodiment of the present invention.
Figure 22:
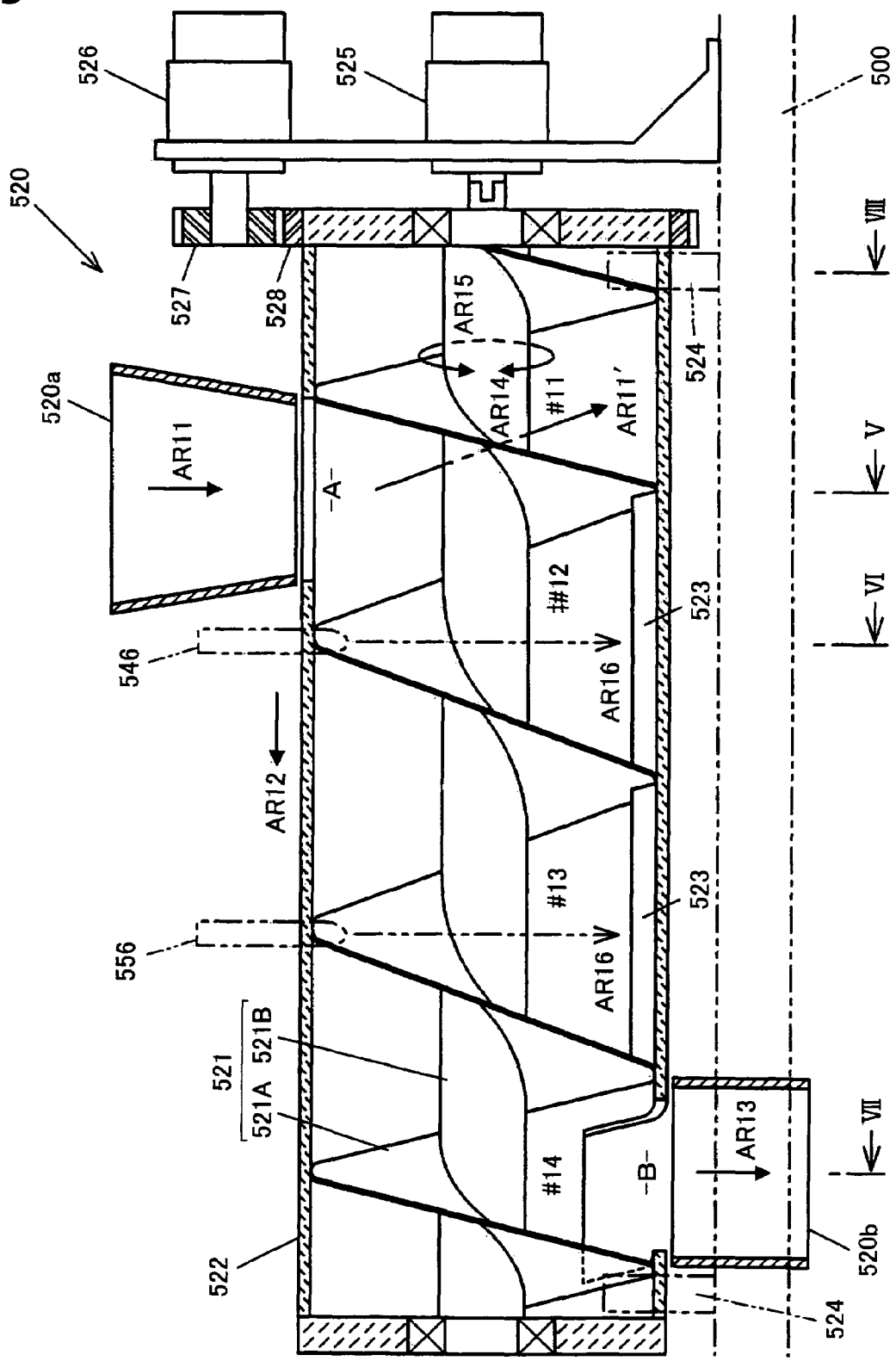
FIG. 22 is a side cross-sectional view of the seasoning apparatus provided in the product manufacturing system according to the sixth embodiment.

FIG. 21 is a block diagram of the entire product manufacturing system 501 according to the sixth embodiment of the present invention, and FIG. 22 is a side cross-sectional view of the seasoning apparatus 520 provided in a product manufacturing system 501 similar to that of FIG. 13. In the present embodiment, the second section #12 and the third section #13 are the seasoning supply sections, and the fourth section #14 is the discharge section. Further, the spacing of the helical blade 521A widens in the seasoning supply sections #12-#13. In other words, while the article group X supplied with seasoning is being transported toward the discharge port B, the plane cross-sectional area (area viewed planarly) of each of the sections #12-#13 enlarges. Thereby, the article groups X separately accommodated in sections #12-#13 spread thinly across without forming a thick cluster, and seasoning adheres well to each and every individual article in the article groups X. As a result, the staying time and agitation time of the article group X with the seasoning will be uniform, and the staying time and agitation time with the seasoning lengthen, thereby reliably achieving much more uniform seasoning.

Furthermore, as was clearly shown in FIG. 15, enlarging the plane cross-sectional area of each of the sections #12-#13 lowers the piled thickness (article group level) of the article group X, as shown by the symbol L' (the piled level of the article group X in the fifth embodiment is assigned the Symbol L), and thereby reduces the possibility that articles will move to an adjacent section through the helical space, even if, for example, articles are kicked up by the agitating plate 523. Accordingly, the agitation speed due to the agitating plate 523, i.e., the rotational speed of the screw 521, can be increased, thereby improving the processing performance of the seasoning apparatus.

Furthermore, in the present embodiment, the agitating plate 523 is not necessarily a plate as in the previous embodiments (e.g., it may also be a round bar). In other words, the article group X is reliably seasoned uniformly just by the fact that the plane cross-sectional area of each of the sections #12-#13 is enlarged while the article group X supplied with seasoning is being transported toward the discharge port B.

<Example of Reciprocating Motion of the Articles>

FIG. 23 is a tabular time chart that depicts one example of the characteristic operation for controlling the seasoning apparatus 520 according to the sixth embodiment, i.e., the operation of reciprocatingly moving the article group X to the discharge part B side and to the supply part A side (the screw 521 rotates normally in the AR14 direction and reversely in the AR15 direction for that purpose), and transporting the article group X to the discharge part B. In this case as well, the section repeatedly advances two times and backtracks one time by the screw 521 performing normal rotation two times in the AR14 direction and performing reverse rotation one time in the AR15 direction. However, compared to the fifth embodiment, the number of sections is one fewer, and therefore the article group A (and likewise for other article groups B, C, D) sequentially performs the operations of: (1) supply→(2) seasoning→(3) transport (or agitation)→(4) seasoning→(5) seasoning→(6) seasoning→(7) seasoning→(8) discharge. Furthermore, even with a small number of sections, the article group resides in the seasoning apparatus 520 over the long time period of eight rotations.

In that case, it is also acceptable to not spray seasoning every time the article group passes through the seasoning sections #12, #13, thereby reducing the number of times that seasoning is sprayed, the same as in the fifth embodiment. However, if the number of times that seasoning is sprayed is reduced, then the number of seasoning feeders may also be reduced, as shown in FIG. 24. FIG. 24 is an example of removing the downstream seasoning feeder 550, and using the third section #13 purely as an agitation section. In this case, the article group A (and likewise for other article groups B, C, D) sequentially performs, as one example, the operations of: (1) supply→(2) seasoning→(3) transport (or agitation)→(4) seasoning→(5) agitation→(6) seasoning→(7) agitation→(8) discharge.

Furthermore, each of the operational examples repeated a pattern of advancing twice and backtracking once. However, the present invention is not limited thereto. Taking the number of sections into consideration, it would also be acceptable to reciprocatingly move the article group to the discharge part B side and the supply part A side using various other patterns, such as, for example, advancing three times and backtracking once, advancing three times and backtracking twice, and advancing four times and backtracking twice, all by combining a plurality of patterns.

Seventh Embodiment

Figure 25:
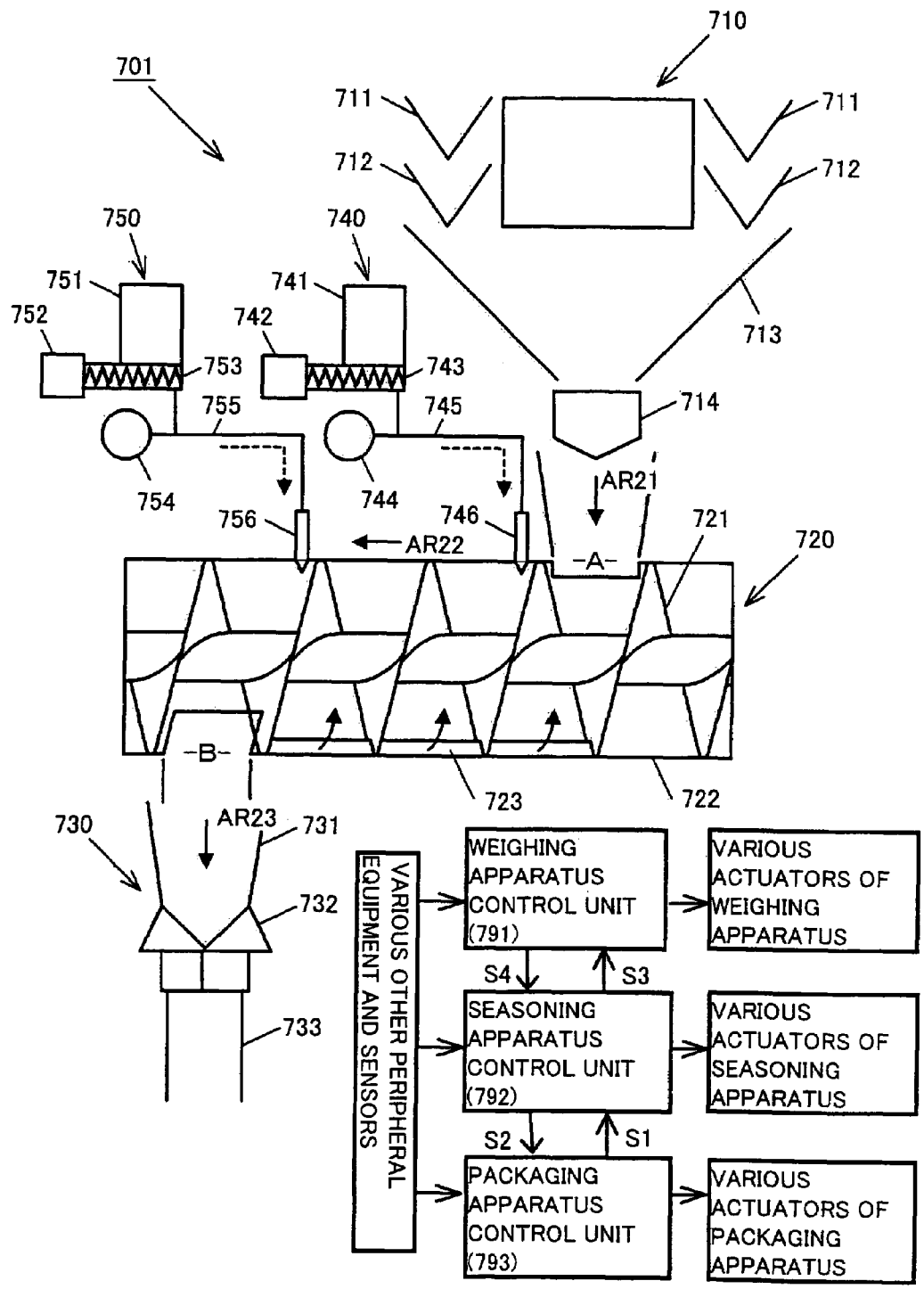
FIG. 25 is a block diagram of the entire product manufacturing system according to the seventh embodiment of the present invention.

FIG. 25 is a block diagram of the entire product manufacturing system 701 according to the seventh embodiment of the present invention. The product manufacturing system 701 weighs, seasons, and packages snacks like potato chips, and includes, in sequence of the direction of the flow of the articles from the upstream side, a weighing apparatus 710, the seasoning apparatus 720, and a packaging apparatus 730.

The weighing apparatus 710 is, for example, a well-known combination weighing apparatus, weighs in a plurality of weigh hoppers 712 . . . 712 articles supplied via a plurality of pool hoppers 711 . . . 711, calculates combinations of each weight value, discharges articles from the weigh hoppers 712 . . . 712 corresponding to the optimal combination, and collects the articles in a timing hopper 714 by a collection chute 713. Further, the timing hopper 714 opens, and the collected one group of articles is supplied from an article supply port A to the seasoning apparatus 720 (arrow AR21).

The seasoning apparatus 720 includes a screw 721 that extends horizontally, and a tube 722 wherein the screw 721 is installed. Further, the article group supplied from the article supply port A is transported to the article discharge port B while seasoning (arrow AR22), and that seasoned article group is discharged from the article discharge port B to the packaging apparatus 730 (arrow AR23).

The seasoning apparatus 720 is further provided with seasoning feeders 740, 750. The seasoning feeders 740, 750 have spray guns 746, 756 provided and arranged at the approximate center part in the lengthwise direction of the tube 722. The spray guns 746, 756 are connected to the air compressors 744, 754 via conduits 745, 755. The powdered seasoning stored in storage tanks 741, 751 is measured out by screw feeders 743, 753 by the drive of motors 742, 752, and introduced to the conduits 745, 755. The introduced powdered seasoning rides upon the compressed air produced by the air compressors 744, 754, and is sprayed from the nozzles of the spray guns 746, 756 into the tube 722. Furthermore, it is acceptable for the seasoning feeders 740, 750 to respectively supply the same seasoning, as well as to respectively supply different seasonings. In the former case, it is possible, for example, to reliably perform seasoning; in the latter case, it is possible to achieve, for example, rich-flavored seasoning.

The packaging apparatus 730 is, for example, a well-known vertical pillow-type packaging apparatus, drags strip packaging material (not shown) downward while forming it into a tubular shape by a former 732 at the periphery of a tube 733 extending vertically, and longitudinally and transversely seals the packaging material, thereby forming a bag. Further, the bag is filled, via an intake chute 731 and the tube 733, with a seasoned article group discharged from the seasoning apparatus 720, thereby completing the product (in the present embodiment, a bag filled with snacks).

Figure 26:
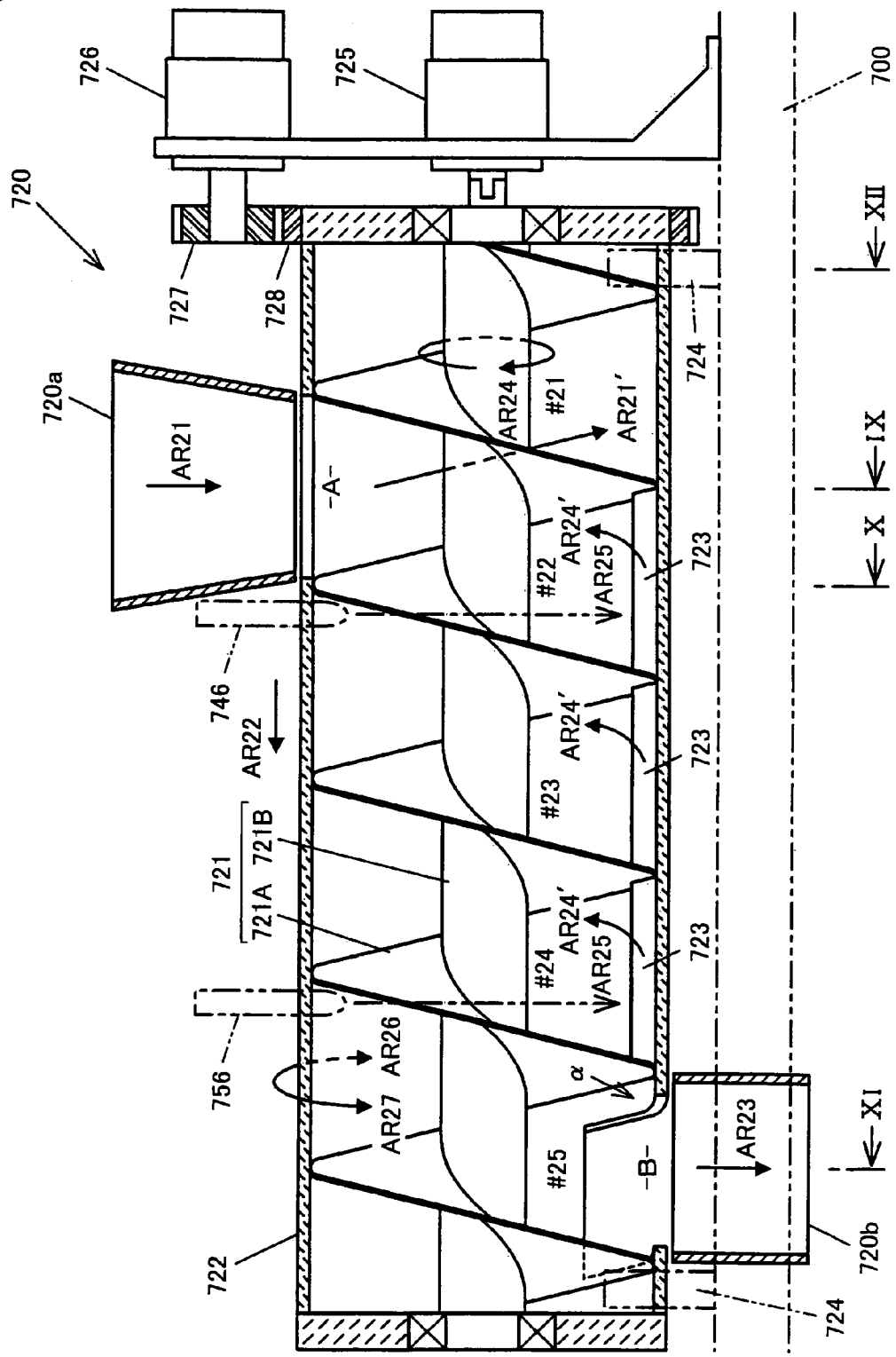
FIG. 26 is a side cross-sectional view of the seasoning apparatus provided in the product manufacturing system according to the seventh embodiment.

As depicted enlarged in FIG. 26, the seasoning apparatus 720 is installed on a platform 700. The upstream part of the seasoning apparatus 720 is provided with the article supply port A and an inlet chute 720a, constituting the supply part of the article group. The downstream part of the seasoning apparatus 720 is provided with the article discharge port B and a discharge chute 720b, constituting the discharge part of the article group.

The screw 721 has a helical blade 721A and a screw shaft 721B, and is rotated around the screw shaft 721B by a motor 725 (arrow AR24). The helical blade 721A is wound around a helix a plurality of times (5½ times in the example shown) at the same pitch. The helical blade 721A provides a plurality of horizontally arrayed partitions inside the tube 722. The partitions partition spaces inside the tube 722 and demarcate a plurality of sections #21-#25 (five in the example shown) arrayed horizontally. The helical blade 721A helically partitions the space inside the tube 722, and each of the sections #21-#25 is not closed but is mutually and helically connected. However, because the article group and seasoning collect at the bottom part inside the tube 722, the article group and seasoning at the part lower than the screw shaft 721B are blocked by the helical blade 721A, and cannot move back and forth to and from adjacent spaces. Consequently, within the helical space, the part lower than the screw shaft 721B can be used as a section that accommodates the article group and seasoning and separates them from other article groups and seasoning. If the motor 725 rotates the screw 721 in the direction of the arrow AR24, then all sections #21-#25 move together from the upstream side toward the downstream side, and the article groups accommodated in the sections #21-#25 are transported from the article supply port A to the article discharge port B.

Figure 27:
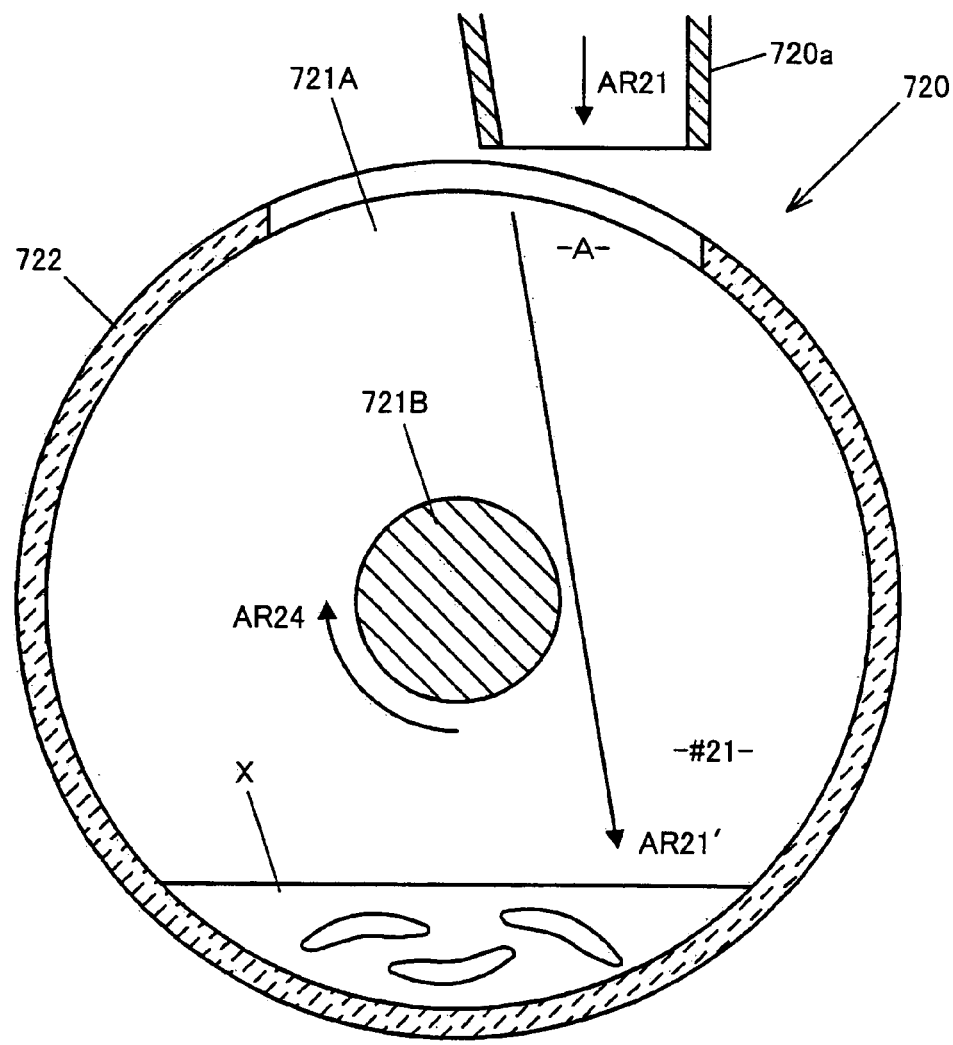
FIG. 27 is a longitudinal cross-sectional view, seen from the upstream side, of the seasoning apparatus of the product manufacturing system according to the seventh embodiment, viewed from the arrow IX of FIG. 26.

The first section #21 is a section wherein an article group is initially supplied from the weighing apparatus 710 to the seasoning apparatus 720 via the inlet chute 720a and the article supply port A (article supply section). As shown in FIG. 27, the lower end part of the inlet chute 720a is not directly above the screw shaft 721B, but rather is positioned displaced from the screw shaft 721B. This is because the article group X must enter the first section #21 as shown by the arrow AR21', and must not enter the second section #22 on the downstream side (refer to FIG. 26).

The second section #22 and the fourth section #24 are sections wherein the previously discussed spray guns 746, 756 supply powdered seasoning (seasoning supply sections). Furthermore, FIG. 26 depicts the state wherein the spray guns 746, 756 do not overlap the second section #22 and the fourth section #24 (state in which the rotational angle of the screw 721, discussed later, is 0°). If the sections #21-#25 move to the downstream side from this point forward, the second section #22 and the fourth section #24 will overlap the spray guns 746, 756, and the powdered seasoning sprayed from the spray guns 746, 756 will be reliably supplied to the second section #22 and the fourth section #24.

Figure 28:
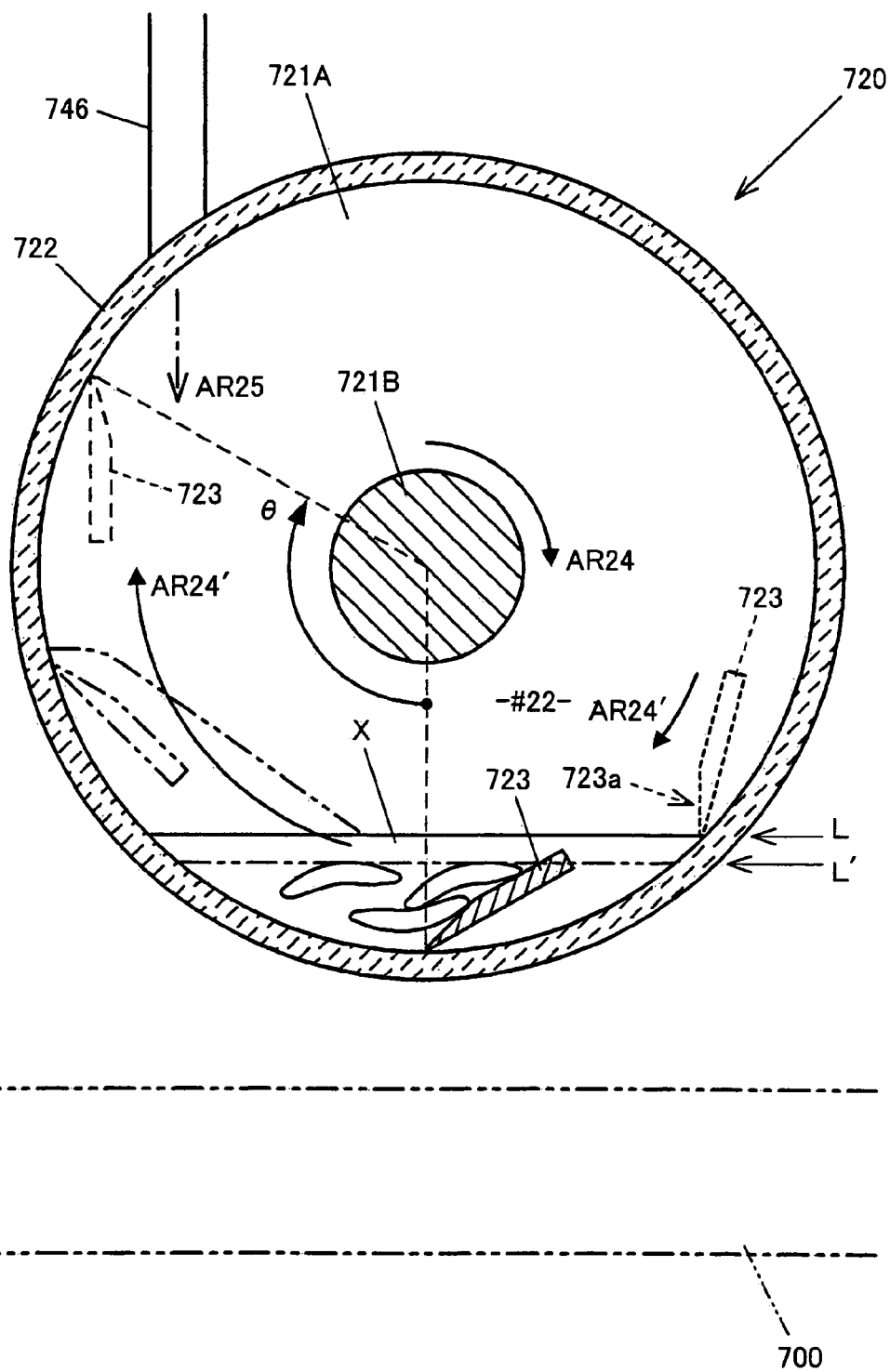
FIG. 28 is a longitudinal cross-sectional view, seen from the upstream side, of the seasoning apparatus of the product manufacturing system according to the seventh embodiment, viewed from the arrow X of FIG. 26.

As shown in FIG. 28, the spray guns 746, 756 are provided upright on the peripheral surface of the tube 722, and are supported by brackets and the like (not shown). The spray guns 746, 756 spray the powdered seasoning aiming for the region close to the inner peripheral surface of the tube 722 (arrow AR25). The spray guns 746, 756 spray a quantity of powdered seasoning corresponding to the quantity of the article group separately accommodated in each section, and the mix ratio of the article group and the seasoning in each section is continuously maintained at the prescribed optimal ratio.

Figure 29:
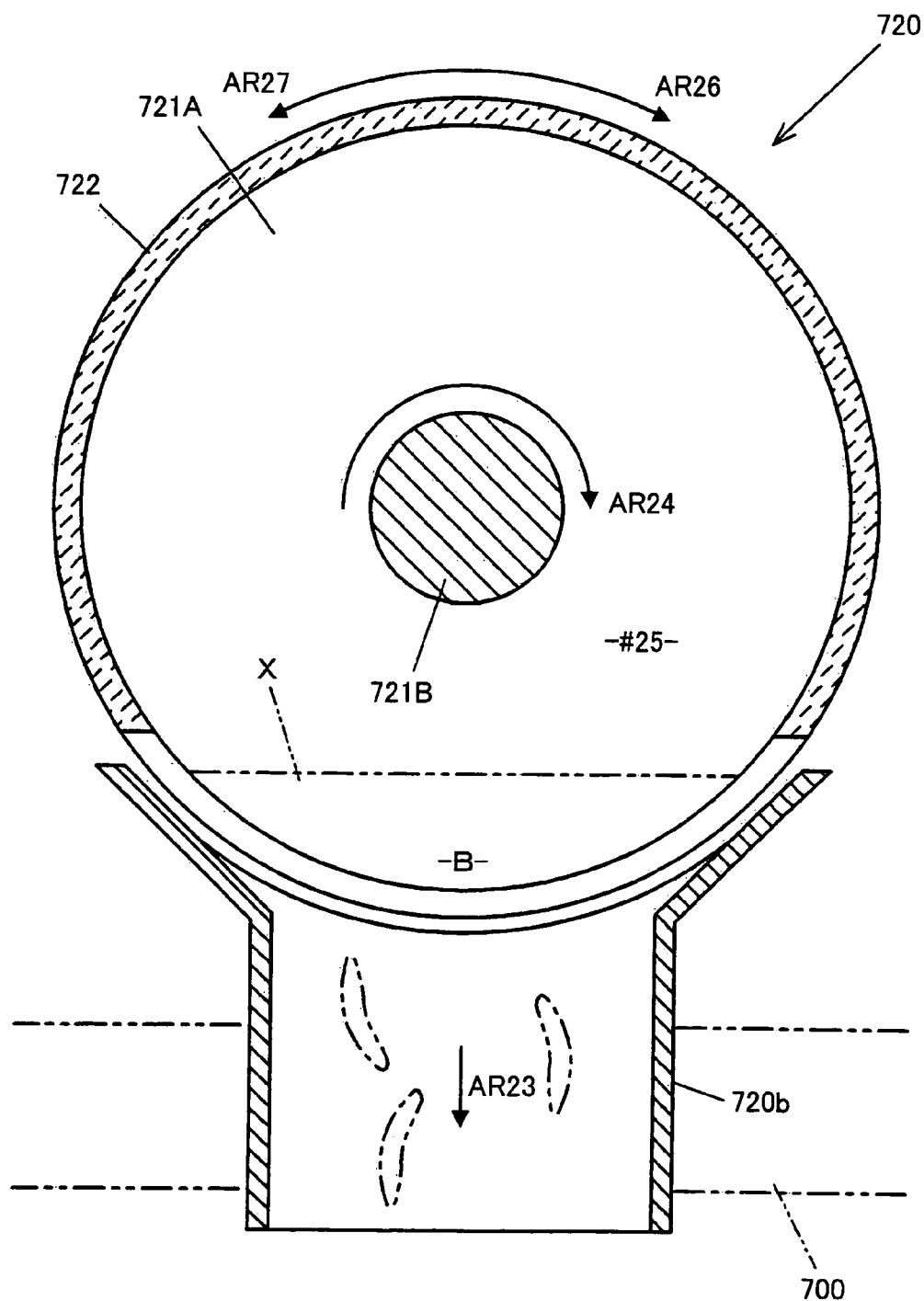
FIG. 29 is a longitudinal cross-sectional view, seen from the upstream side, of the seasoning apparatus of the product manufacturing system according to the seventh embodiment, viewed from the arrow XI of FIG. 26.

The fifth section #25 is a section wherein the seasoned article group is discharged from the seasoning apparatus 720 to the packaging apparatus 730 via the article discharge port B and the discharge chute 720b (article discharge section). As shown in FIG. 29, the article discharge port B is positioned directly below the screw shaft 721B. Thereby, the entire quantity of the seasoned article group X that collected in the bottom part inside the tube 722 is rapidly discharged from the seasoning apparatus 720 to the packaging apparatus 730.

Agitating plates 723 . . . 723 are provided and mounted between the partitions formed by the helical blade 721A from the second section #22 across to the fourth section #24 (herein, the third section #23 is purely an agitation section). The agitating plate 723 serves the purpose of agitating the article group and seasoning accommodated in each of the second section #22 through the fourth section #24. The agitating plate 723 operates integrated with the helical blade 721A, and moves circularly about the screw shaft 721B attendant with the rotation of the screw 721 (arrow AR24'). As a result, when the agitating plate 723 passes below the screw shaft 721B, it contacts the article group and seasoning collected at the lower part of each of the second section #22 through the fourth section #24 inside the tube 722. Further, as shown by the broken chain-link line in FIG. 28, the article group X and seasoning are combed upward along the inner peripheral surface of the tube 722, and are thereby agitated. The article group X is thinly spread along the inner peripheral surface, and each individual article that constitutes the article group X is externally exposed and well mixed with seasoning. As a result, the article group X is uniformly seasoned, and each individual article is seasoned without any unevenness.

In other words, while the article group X supplied with seasoning is being transported toward the discharge port B, due to the agitation of the article group X and the seasoning by the agitating plate 723, the individual articles in the article group X roll and become turned over, thereby eliminating, for example, the adherence of seasoning to just one side of an article. Accordingly, seasoning can be adhered over the entirety of each article without any unevenness, thus reliably seasoning each individual article without any unevenness. Moreover, because such agitation is performed by the agitating plate 723 which has a flat surface, the agitation effect increases, thereby enabling each individual article to be more reliably seasoned without any unevenness.

Figure 30:
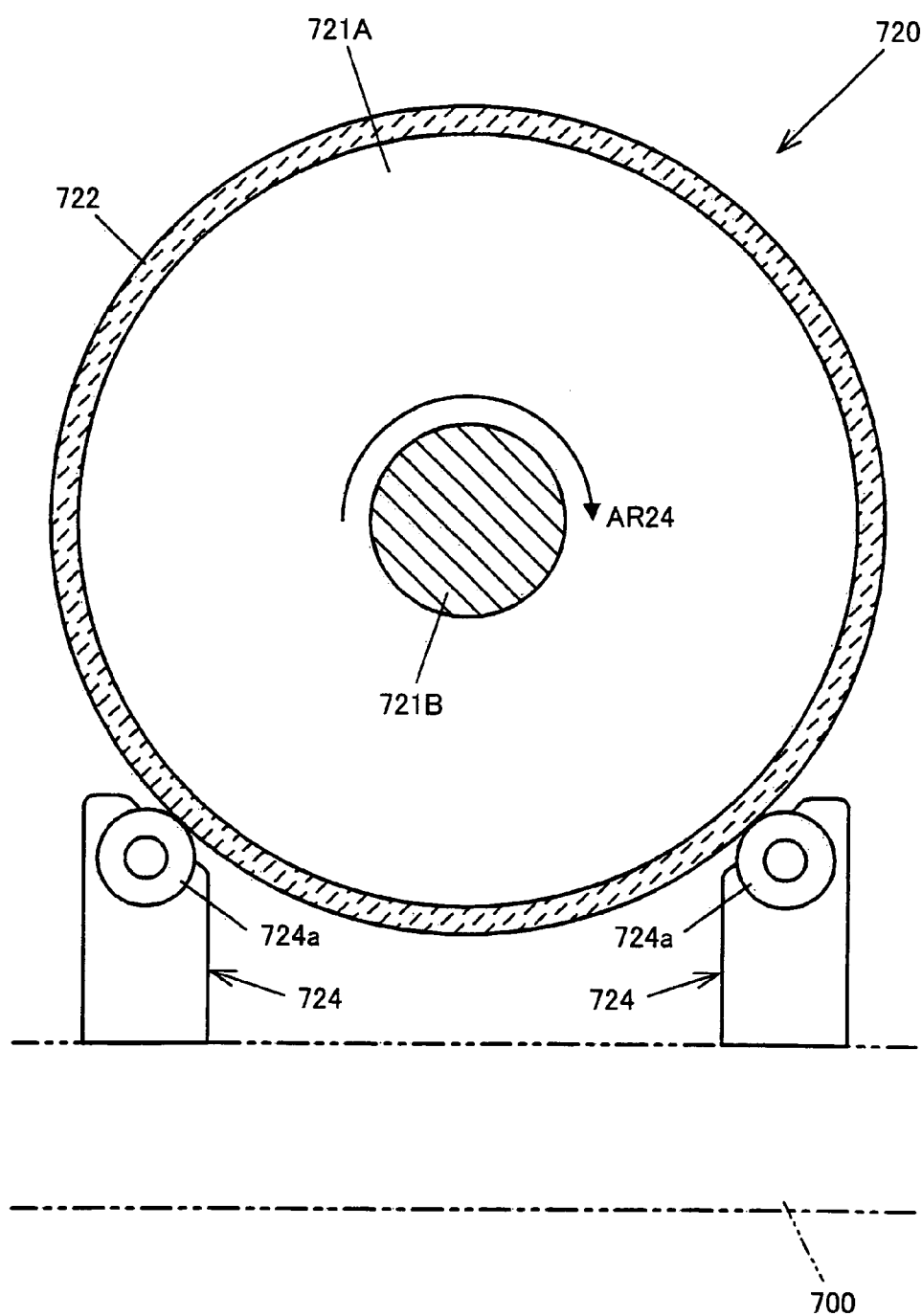
FIG. 30 is a longitudinal cross-sectional view, seen from the upstream side, of the seasoning apparatus of the product manufacturing system according to the seventh embodiment, viewed from the arrow XII of FIG. 26.

In the present embodiment, the tube 722 is supported freely rotatable around an axis by support units 724 . . . 724. As shown in FIG. 30, the present embodiment is constituted so that each support unit 724 supports the tube 722 using a roller 724a. The tube 722 is cylindrical, and the inner peripheral surface, which slidably contacts the helical blade 721A, and the outer peripheral surface, which rollably contacts the roller 724a, both have a circular cross section. The second motor 726 rotates the tube 722 about an axis via a pinion 727 and a gear 728 (arrows AR26, AR27). The tube 722 is made of a highly transparent resin (e.g., an acrylic resin), including the end face on the upstream side and the downstream side and not just the body, so that the contents therein can be clearly observed externally.

As shown in FIG. 25, each of the control units 791, 792, 793 of the weighing apparatus 710, the seasoning apparatus 720 and the packaging apparatus 730 receive signals from, for example, other various peripheral equipment and sensors and the like located on the upstream side and downstream side of the product manufacturing system 701, and also mutually exchange signals S1-S4. For example, the control units 791, 792, 793 control various actuators, such as the open-close motors of the weigh hoppers 712, timing hopper 714, and the like in the case of the weighing apparatus 710; the rotary motors 725, 726 of the screw 721, the tube 722, and the like, in the case of the seasoning apparatus 720; and the drive motors of a pull-down belt, a transverse sealing apparatus, and the like, in the case of a packaging apparatus 730.

<Example of Control Operation>

Figure 31:
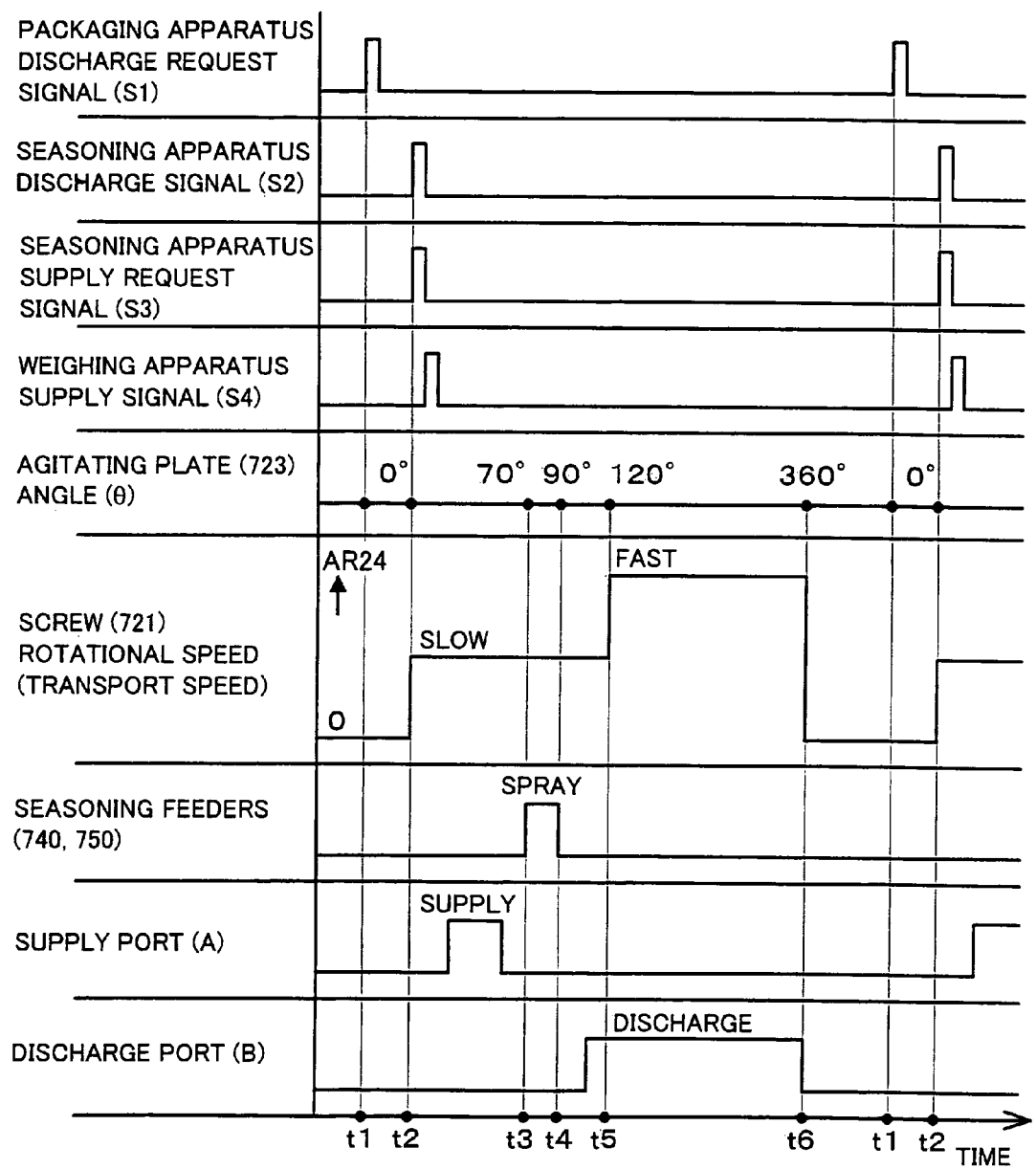
FIG. 31 is a time chart that shows one example of the operation for controlling the seasoning apparatus of the product manufacturing system according to the seventh embodiment.
Figure 32:
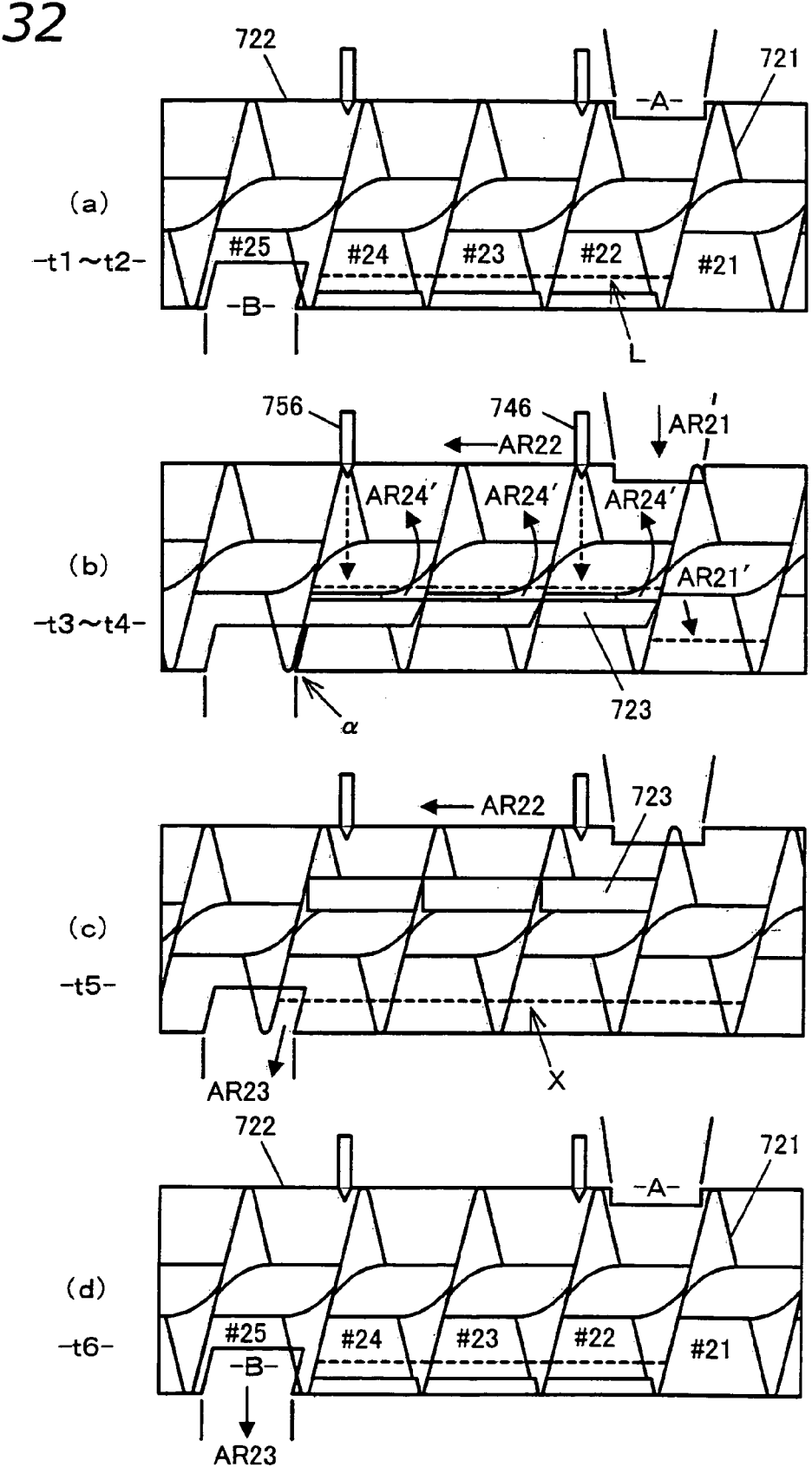
FIG. 32 is an operation diagram that shows one example of the operation for controlling the seasoning apparatus of the product manufacturing system according to the seventh embodiment.

FIG. 31 is a time chart that shows one concrete example of the operation for controlling the seasoning apparatus 720 in the product manufacturing system 701, and FIG. 32 is an operational diagram thereof. Basically, in response to a request signal from a downstream apparatus, the product manufacturing system 701 sequentially begins operation of the upstream apparatuses. Namely, as shown in FIG. 31, if the packaging apparatus 730 sends a discharge request signal S1 (time t1) to the seasoning apparatus 720 demanding the discharge of a seasoned article group, the seasoning apparatus 720 receives that signal and, after a prescribed delay time (variable) has elapsed, starts the rotation of the screw 721 and sends a discharge signal S2 back to the packaging apparatus 730 to the effect that a seasoned article group has been discharged (time t2).

In addition to replying with a discharge signal S2, the seasoning apparatus 720 sends a feed request signal S3 to the weighing apparatus 710 demanding the supply of a weighed article group. The weighing apparatus 710 receives that signal, opens the timing hopper 714, and replies to the seasoning apparatus 720 with a feed signal S4 stating that a weighed article group has been discharged. As a result, one group of articles that has been weighed but not yet seasoned pass through the article supply port A, and is supplied to the first section #21 of the seasoning apparatus 720. "SUPPLY" in the article supply port A field of FIG. 31 indicates the time period during which this one group of articles, not yet seasoned, passes through the article supply port A in this manner.

Taking the opportunity of a discharge request signal S1 from the packaging apparatus 730, the screw 721 will perform just one 360° rotation in the AR24 direction, subsequently stop, and then wait to receive the next discharge request signal S1. In that case, the screw 721, as shown by the solid line in FIG. 28, will stand by, with the agitating plates 723 . . . 723 at a position directly below the screw shaft 721B (bottom part of the section). In other words, the screw 721 will start rotating from this position (FIG. 32($a$)), and will stop at this position (FIG. 32($d$)). Each numeric value in the agitating plate 723 angle field in FIG. 31 indicates, with the position indicated by the line in FIG. 28 as the reference (0°) the rotational angle θ from that position in the AR24 direction. Clearly, if the screw 721 rotates by 360°, then each of the sections #21-#25 respectively advances by one pitch.

The screw 721 rotates slowly from 0° to 120°. This interval (t2-t5) is a time period when the agitating plate 723 combs the article group X and seasoning upward from the bottom part of the section along the inner peripheral surface of the tube 722, thereby agitating them, as previously discussed. Thereby, because the article group X and seasoning are agitated slowly over a period of time, the article group X is uniformly seasoned, and each individual article is more reliably seasoned without any unevenness. In addition, there is virtually no concern that the agitating plate 723 will kick up the articles at a high speed and move them to an adjacent section through the helical space. Furthermore, the present embodiment also inhibits problems such as the agitating plate 723 making strong contact with the articles, causing cracking, chipping, and breaking of the articles.

Moreover, as clearly shown by the dotted line in FIG. 28, the tip part of the agitating plate 723 in the rotational direction AR24' is proximate to the inner peripheral surface of the tube 722. Thereby, a large quantity of articles in the tube 722 and in the section can be scooped up and agitated without any escaping. In addition, the tip part of the agitating plate 723 in the rotational direction AR24' is thinner than other parts. Thereby, the present embodiment reduces the shock when the agitating plate 723 and the articles make contact, making it easy for articles to ride upon the agitating plate 723, thereby inhibiting the cracking, chipping, and breaking of the articles.

In addition, as clearly shown by the broken line in FIG. 28, the agitating plate 723 is provided between the partitions formed by the helical blade 721A so that it takes on a position extending approximately in the vertical direction before arriving directly above (180°) the screw shaft 721B due to the rotation of the screw 721. Thereby, at the point in time when the agitating plate 723 is positioned extending approximately in the vertical direction, the articles are lifted up by the agitating plate 723, and the agitated articles are all dropped downward. Accordingly, there is virtually no concern that the articles consequently agitated by the agitating plate 723 will ride on the agitating plate 723 and move to an adjacent section through the helical space. As a result, the agitation speed of the agitating plate 723 (rotational speed of the screw 721, or the transport speed of the article group X) can be increased, thus improving the processing performance of the seasoning apparatus 720.

Furthermore, in the present example, the agitating plate 723 extends approximately vertically (refer to the agitating plate 723 shown by the broken line in FIG. 28) when the screw 721 has rotated 120° (t5: FIG. 32($c$)). Namely, when the agitating plate 723 faces downward and finishes dropping all the articles, the screw 721 immediately shifts to a high-speed rotation. Of course, the time at which the agitating plate 723 extends in the vertical direction, and the time at which the screw 721 starts to rotate at a high speed do not have to necessarily coincide, as long as the former occurs prior to the latter.

The seasoning feeders 740, 750 supply the powdered seasoning at an appropriate time period when the agitating plate 723 is combing the article group X upward from the bottom of the section along the inner peripheral surface of the tube 722 (t3-t4: FIG. 32($b$)). The time period in which the seasoning is sprayed is set according to: firstly, the timing in which the article group X rides upon the agitating plate 723, is combed upward, spreads thinly along the inner peripheral surface of the tube 722, thereby clearly exposing each and every individual article externally; secondly, the timing in which the spray guns 746, 756 overlap with the second section #22 and the fourth section #24, as discussed earlier; and thirdly, the timing in which the sprayed seasoning pours down upon the approximately center part of the article group X (center part of the section in the arrayed direction); and the like. In the present example, spraying begins when the screw 721 has rotated 70° (t3) (refer to the agitating plate 723 shown by the chain-link line in FIG. 28), and spraying finishes when the screw 721 has rotated 90° (t4).

The screw 721 rotates rapidly from 120° to 360° (t5-t6: FIG. 32($c$)-FIG. 32($d$)). Thereby, the transport speed of the article group X increases, improving the processing performance of the seasoning apparatus 720. In addition, the article group X that was in the fourth section #24 finally arrives at the article discharge port B, and is discharged from the fifth section #25 to outside of the seasoning apparatus 720.

The following explains the discharge of the seasoned article group X.

As discussed earlier, the seasoned article group X is dropped from the fifth section #25 to the packaging apparatus 730 via the article discharge port B. In that case, when packaging one bag at a time for each singular section, there must be a distinct spacing (demarcation or partition) between the article group cluster that was previously dropped and discharged and the article group cluster that is to be dropped and subsequently discharged. Otherwise, articles will get caught in the transverse seals in the packaging apparatus 730. The present operational example is suitable because, at that point, the screw 721 is rotated intermittently and, from the time t6 to the time t2 of the next operation cycle, the transport, seasoning (spraying and agitation of seasoning), and discharge of articles are stopped, during which time a distinct spacing is formed between article groups before and after being dropped and discharged from the seasoning apparatus 720.

In addition, as shown by symbol α in FIG. 26, the screw 721 in the seasoning apparatus 720 stops and stands by at the 0° angle, at which state the upstream edge part of the article discharge port B is positioned by at least a prescribed distance more downstream than the helical blade 721A at the boundary between the fourth section #24 and the article discharge section #25. Thereby, even if the screw 721 starts to rotate at time t2, the fourth section #24 does not immediately communicate with the article discharge port B. In other words, the time at which the article group X in the fourth section #24 begins to drop and discharge from the discharge port B falls behind time t2 (refer to FIG. 32(b)). In the present example, when the screw 721 rotates approximately 110° (between times t4 and t5) as shown in the article discharge port B field in FIG. 31, the fourth section #24 starts to communicate with the article discharge port B, and the article group X in the fourth section #24 starts to drop and discharge from the discharge port B. By then, the supply of seasoning, via the spray gun 756, to the article group X in the fourth section #24 has already completed, and nearly the entire large quantity of articles scooped up by the agitating plate 723 once again drop back into the fourth section #24 (i.e., the agitation work is completed). Consequently, there is no problem even if the article group X in the fourth section #24 starts discharging when the screw 721 rotates approximately 110°. In this manner, the delay in the discharge start time of the seasoned article group X shortens the overall discharge time of the seasoned article group X as much as possible. As a result, the so-called tail end of the article group during its drop through the tube 733 of the packaging apparatus 730 shortens, further reducing the problem of articles getting caught in the transverse seals.

<Second Example of Control Operation>

Figure 33:
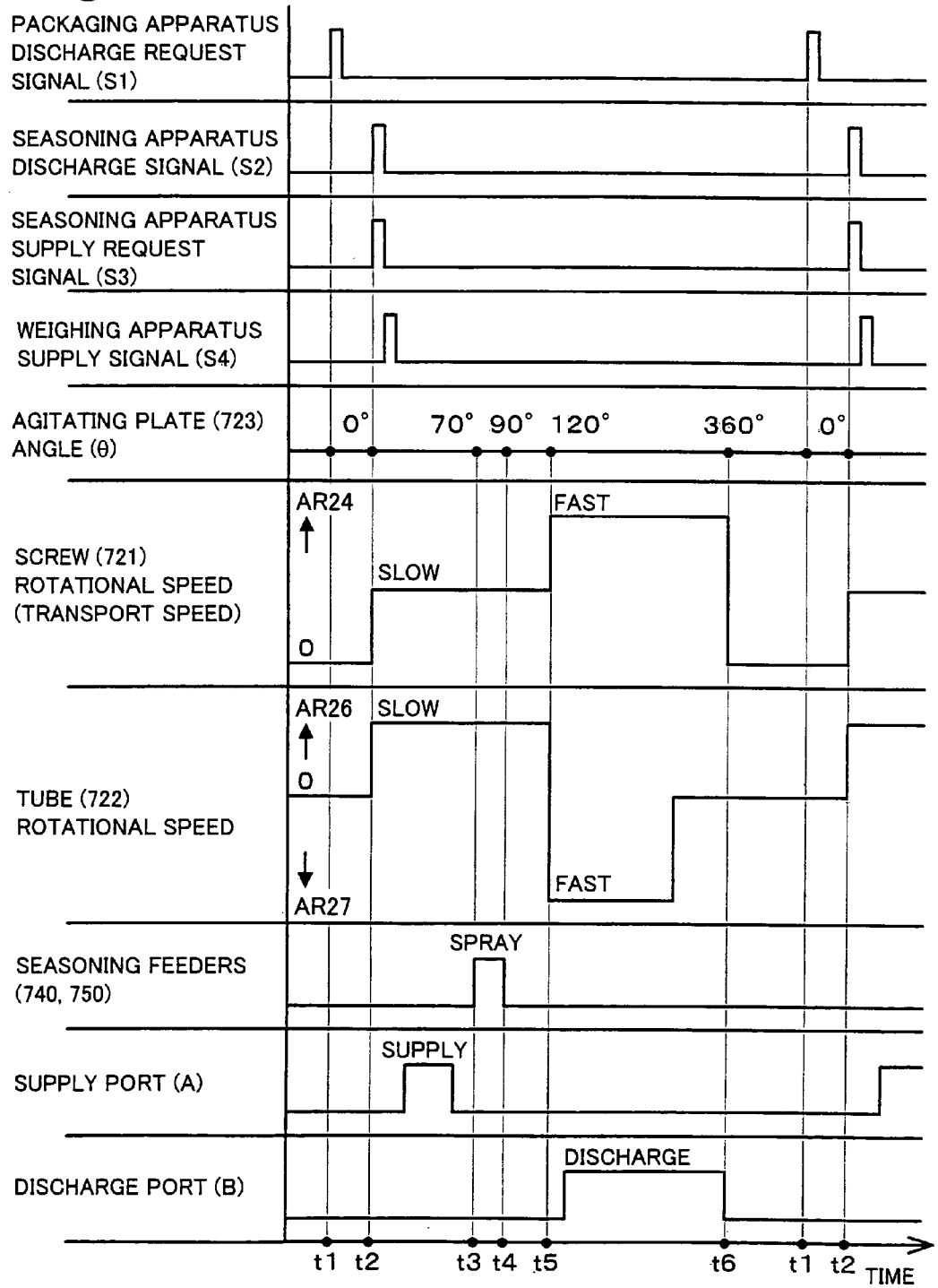
FIG. 33 is a time chart that shows another example of the operation for controlling the seasoning apparatus of the product manufacturing system according to the seventh embodiment.
Figure 34:
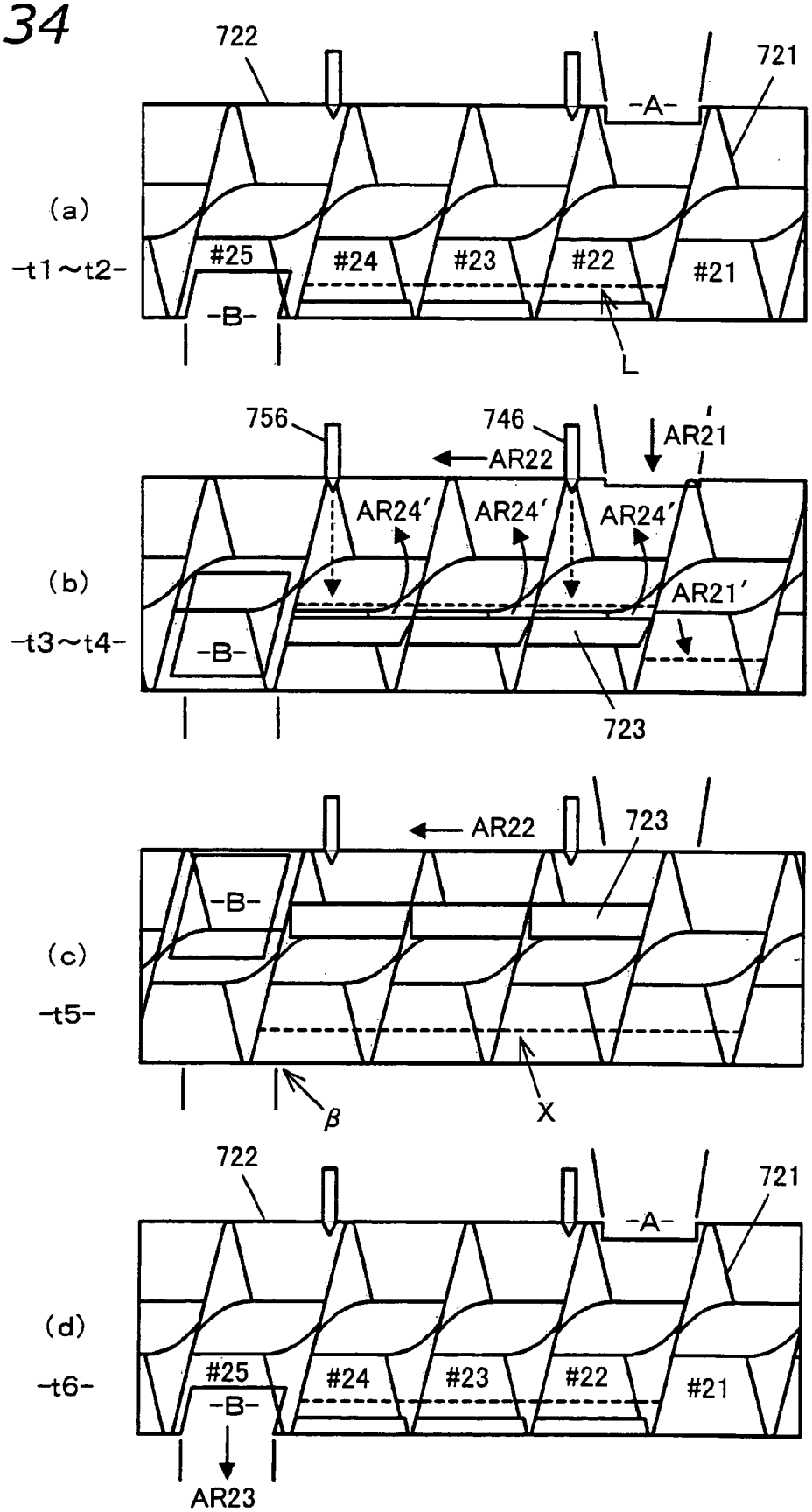
FIG. 34 is an operation diagram that shows the example of the operation shown in FIG. 33 for controlling the seasoning apparatus of the product manufacturing system according to the seventh embodiment.

FIG. 33 is a time chart that shows one concrete example of the operation for controlling the seasoning apparatus 720 in the product manufacturing system 701, and FIG. 34 is an operational diagram thereof. In the present example, the tube 722 also rotates synchronized to the rotation of the screw 721. Between times t2-t5, the tube 722 rotates at the same speed as the screw 721, and in the same AR26 direction. As a result, the discharge port B rises laterally while maintaining its positional relationship with the helical blade 721A and, as shown by the symbol β in FIG. 34(c), the article group X still does not begin to drop even when the fourth section #24 arrives above the discharge chute 720b.

Next, between times t5-t6, the screw 721 rotates at a high speed and the tube 722 rotates in the reverse direction AR27. Thereby, within a short time period, the article discharge section #25 communicates with the discharge port B, and the entire quantity of the seasoned article group X rapidly discharges from the seasoning apparatus 720 to the packaging apparatus 730. In this manner, the discharge start time of the seasoned article group X is much more delayed, and the overall discharge time of the seasoned article group X is much shorter. As a result, the tail end of the article group is much shorter, and the problem of articles getting caught in the transverse seals is greatly reduced.

Eighth Embodiment

Figure 35:
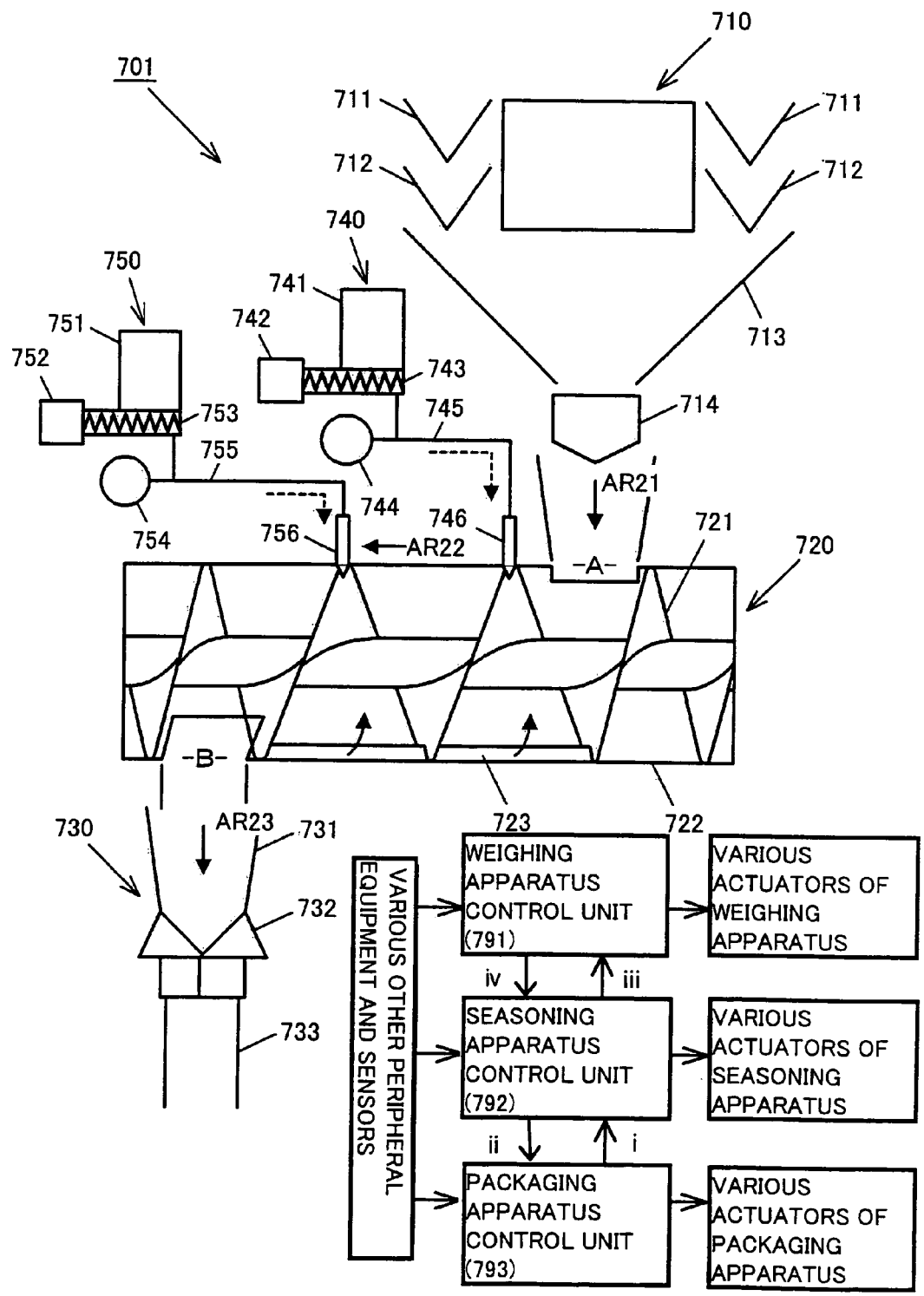
FIG. 35 is a block diagram of the entire product manufacturing system according to the eighth embodiment of the present invention.
Figure 36:
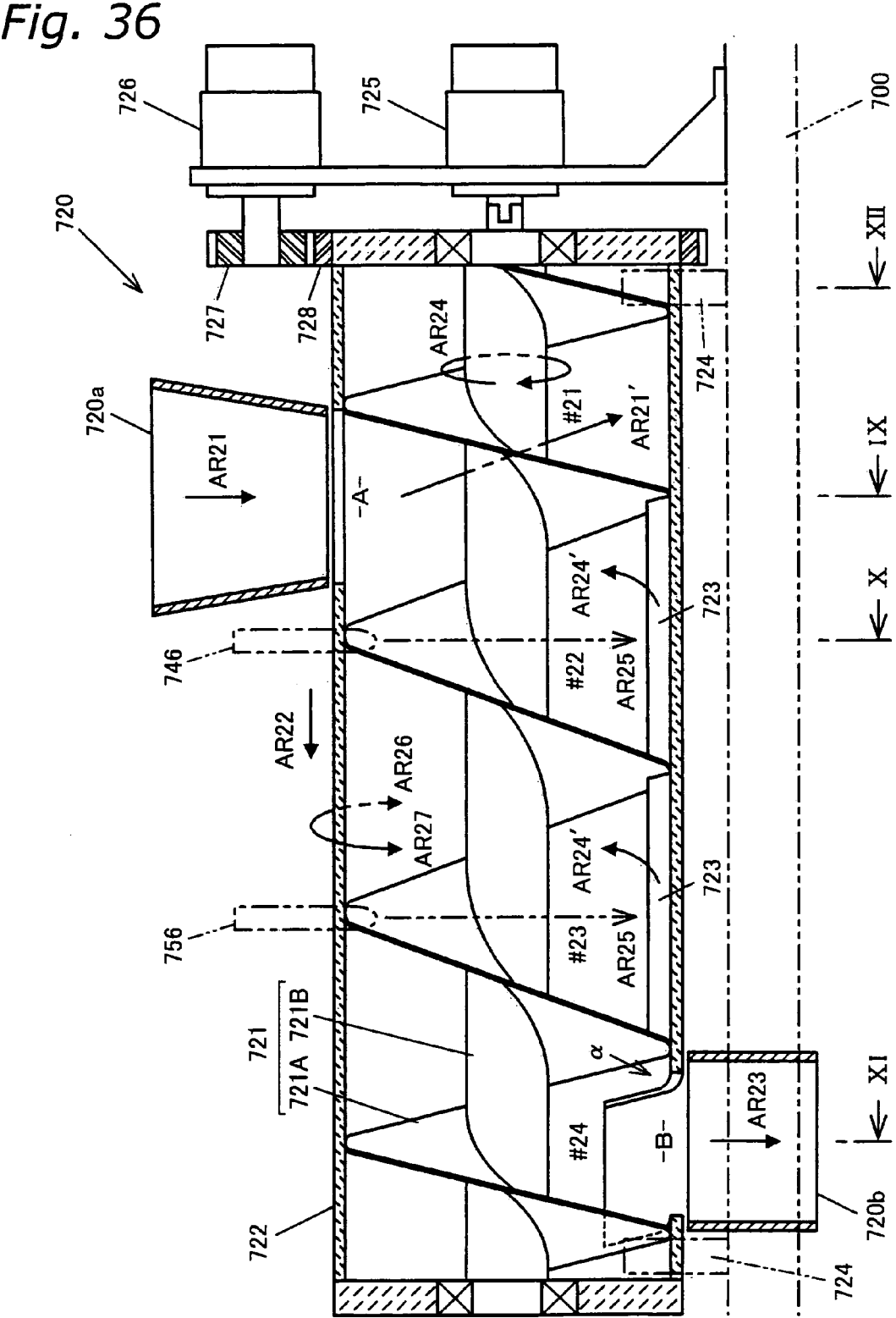
FIG. 36 is a side cross-sectional view of the seasoning apparatus provided in the product manufacturing system according to the eighth embodiment.
Figure 37:
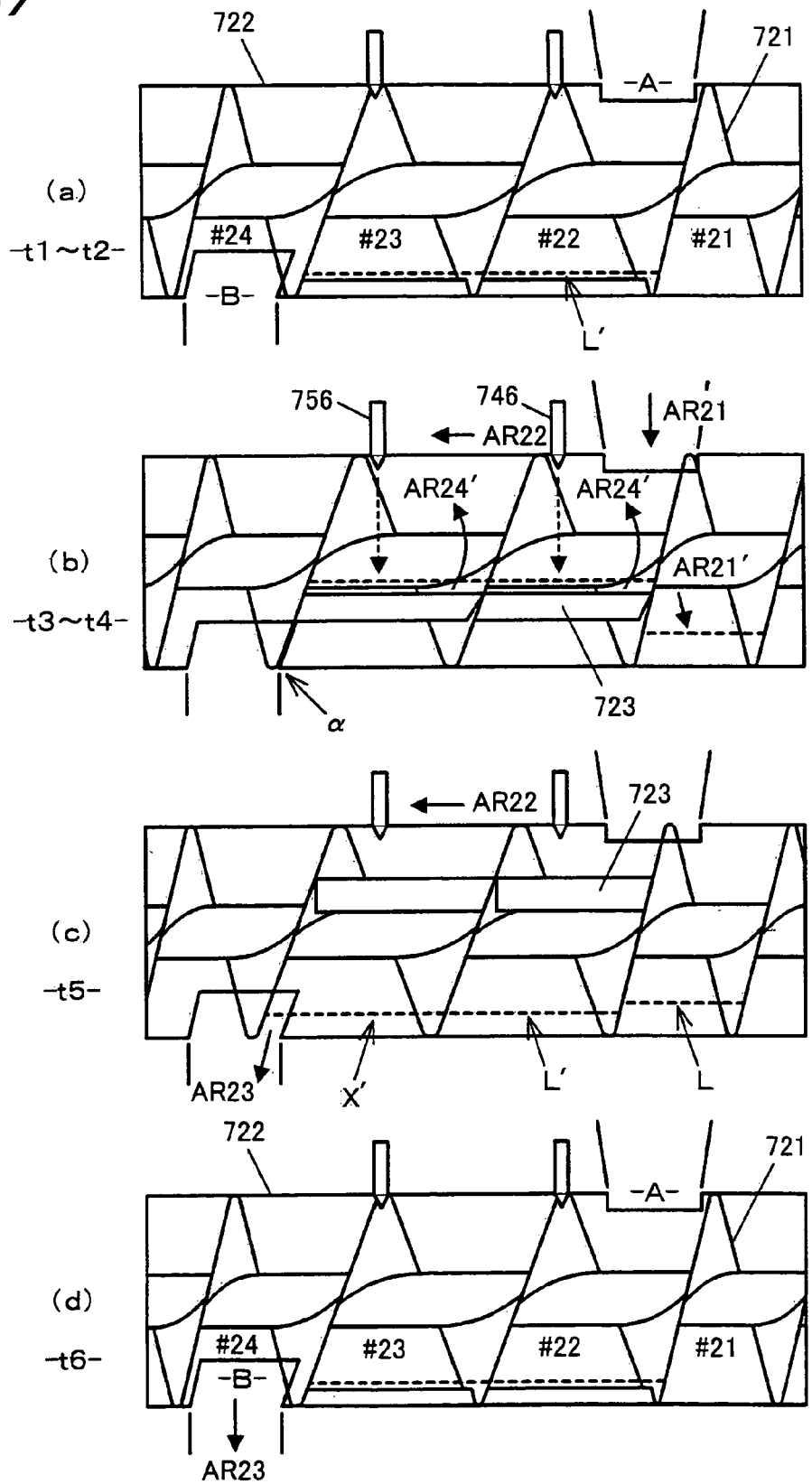
FIG. 37 is an operation diagram that shows one example of the operation for controlling the seasoning apparatus of the product manufacturing system according to the eighth embodiment.

FIG. 35 is a block diagram of the entire product manufacturing system 701 according to the eighth embodiment of the present invention. FIG. 36 is a side cross-sectional view of the seasoning apparatus 720 provided in the product manufacturing system 701 similar to that of FIG. 26. FIG. 37 is an operational diagram that shows one example of the operation for controlling a seasoning apparatus 720 similar to that of FIG. 32.

In the present embodiment, the second section #22 and the third section #23 are the seasoning supply sections, and the fourth section #24 is the discharge section. Further, the spacing of the partitions formed by the helical blade 721A widens in the seasoning supply sections #22-#23. In other words, while the article group X supplied with seasoning is being transported toward the discharge port B, the plane cross-sectional area (area viewed planarly) of each of the sections #22-#23 enlarges. Thereby, the article groups X separately accommodated in sections #22-#23 spread thinly across without forming a thick cluster, and seasoning adheres well to each and every individual article in the article groups X. As a result, the staying time and agitation time of the article group X with the seasoning are satisfied, thereby reliably achieving much more uniform seasoning, and no longer creating portions that are too heavily or too lightly seasoned.

Furthermore, as was clearly shown in FIG. 37 and FIG. 28, enlarging the plane cross-sectional area of each of the sections #22-#23 lowers the piled thickness (article group level) of the article group X, as shown by the symbol L' (in the seventh embodiment, the piled level of the article group X is assigned the Symbol L), and thereby reduces the possibility that articles will move to an adjacent section through the helical space, even if, for example, articles are kicked up by the agitating plate 723. Accordingly, the agitation speed due to the agitating plate 723, i.e., the rotational speed of the screw 721, can be increased, thereby improving the processing performance of the seasoning apparatus.

Furthermore, in the present embodiment, the agitating plate 723 is not necessarily a plate as in the previous embodiments (e.g., it may also be a round bar). In other words, the article group X is reliably seasoned uniformly just by the fact that the plane cross-sectional area of each of the sections #22-#23 is enlarged while the article group X supplied with seasoning is being transported toward the discharge port B.

Ninth Embodiment

In the seasoning apparatus 720 of the seventh embodiment, as shown in FIG. 38(a), the spacing between the partitions formed by the helical blade 721A in an article discharge section #25 is wide, the cluster of the article group X dropped and discharged from the discharge port B increases and, as a result, the tail end of the article group while dropping through the tube 733 of the packaging apparatus 730 lengthens, and there is a concern that articles will get caught in the transverse seals. Therefore, as shown in FIG. 38(b), the spacing between the partitions formed by the helical blade 721A in the article discharge section #25 is made narrower, and the cluster of the article group X dropped and discharged from the discharge port B is consequently reduced as much as possible, the tail end of the article group is shorter, and it is possible to reduce the concern of articles getting caught in the transverse seals.

In other words, the present embodiment is a seasoning apparatus 720 that transports an article group X supplied at a supply part (supply port) A to a discharge part (discharge port) B while seasoning the articles, including a transport means that accommodates each article group X supplied at the supply part A in a section, and transports each article group X to the discharge part B; and seasoning feeding means 740, 750 that supply seasoning to each article group X. The transport means includes a screw 721 that extends approximately horizontally between the supply part A and the discharge part B; a tube 722 wherein the screw 721 is installed; and a drive source 725 that rotates the screw 721 about a screw shaft 721B. The section is a space that is partitioned by the helical blade 721A of the screw 721 in the tube 722, and the spacing of the helical blade 721A that demarcates the section, wherein the article group X supplied with the seasoning is discharged (#25 in the example shown), is narrowed (shortened).

Tenth Embodiment

Generally, promotional items like coupons are inserted into the bag made by the packaging apparatus 730 of the seventh embodiment in order to promote the sale of products. Conventionally, the insertion of such a promotional item in a bag was principally done by, for example, inserting the promotional item into the intake chute 731 and the tube 733 synchronized to the drop supply of the article group X to the packaging apparatus 730. However, because of the differential in the specific gravity of the promotional item and the article group, their drop speeds differ when manufacturing at a high speed, causing problems such as the promotional items getting caught in the transverse seals. In addition, there are also cases in which, for example, the promotional items get stuck inside the tube 733, do not satisfactorily drop, and do not get mixed in with the article group. Therefore, it is preferable to provide an infeed port for the promotional items at a prescribed region of the tube 722 of the seasoning apparatus 720. Further, the present invention is constituted so that the article group X supplied at the supply part (supply port) A is seasoned, and is transported to the discharge part (discharge port) B while the promotional items are fed in. Thereby, it becomes easier to insert the promotional items, the promotional items are reliably mixed in with the article groups, and it becomes more difficult for infeed errors to occur, contributing to the improvement of productivity.

INDUSTRIAL FIELD OF APPLICATION

The use of the seasoning apparatus according to the present invention enables the even seasoning of each and every individual article in the article group at a prescribed optimal mixing ratio, without seasoning any article too heavily or too lightly, because each article group to be seasoned is separately transported.

The invention claimed is:

1. A seasoning apparatus that transports groups of articles supplied from an upstream apparatus to a downstream apparatus, said seasoning apparatus comprising:
a transport unit that has a supply part and a discharge part, accommodates each of the groups of articles supplied at said supply part in separate sections, and is configured to transport each of the groups of articles to said discharge part, the transport unit further having a tube and a solid helical blade which is installed within said tube and forms a plurality of solid partitions provided between said supply part and said discharge part to form said separate sections, such that the groups of articles are accommodated in said separate sections and transported by moving said partitions from said supply part toward said discharge part;
a seasoning feeding unit that is configured to spray seasoning only between a first partition and a second partition of said plurality of partitions onto each of the groups of articles in said separate sections, said first partition adjacent to said second partition; and
a control unit that is configured to control said transport unit so that an article group supplied with seasoning is reciprocatingly moved toward said discharge part and toward said supply part,
said transport unit configured such that seasoning sprayed onto the groups of articles is incapable of moving between adjacent sections.

2. The seasoning apparatus as recited in claim 1, wherein said transport unit has a screw that extends between said supply part and said discharge part, and a screw rotating device configured to rotate said screw about a rotary shaft.

3. The seasoning apparatus as recited in claim 2, wherein said screw extends approximately horizontally between said supply part and said discharge part.

4. The seasoning apparatus as recited in claim 3, wherein each of said sections is a space lower than the rotary shaft of said screw.

5. The seasoning apparatus as recited in claim 2, further comprising:
a discharge port provided at a peripheral surface of said tube in said discharge part; and
a tube rotating device configured to rotate said tube about an axis;
wherein,
said tube rotating device is configured to control the discharge of each of the groups of articles by selectively arranging, by the rotation of said tube, said discharge port at a lower article drop discharge position.

6. The seasoning apparatus as recited in claim 3, further comprising:
a supply port provided at a peripheral surface of said tube in said supply part; and
a tube rotating device configured to rotate said tube about an axis;
wherein,
said tube rotating device is configured to control the supply of each of the groups of articles by selectively arranging, by the rotation of said tube, said supply port at an upper article drop supply position.

7. The seasoning apparatus as recited in claim 3, further comprising:
a discharge port provided at a peripheral surface of said tube in said discharge part;
a supply port provided at the peripheral surface of said tube in said supply part; and
a tube rotating device configured to rotate said tube about an axis;
wherein,
said tube rotating device is configured to simultaneously control the discharge and supply of each of the groups of articles by selectively arranging, by the rotation of said tube, said discharge port at a lower article drop discharge position, and selectively arranging said supply port at an upper article drop supply position, respectively.

8. The seasoning apparatus as recited in claim 1, further comprising:
an agitating device that is configured to agitate each of the groups of articles and seasoning while the article group supplied with seasoning is being transported to said discharge part.

9. The seasoning apparatus as recited in claim 2, further comprising:
an agitating device that is configured to agitate each of the groups of articles and seasoning while the article group supplied with seasoning is being transported to said discharge part;
wherein,
said agitating device includes a comb-up member provided on said helical blade, and performs said agitation of each of the groups of articles and seasoning by combing the article group and seasoning upward by said comb-up member during rotation of said screw; and
said screw rotating device is configured to reduce a rotational speed of the screw when said comb-up member performs said comb-up.

10. The seasoning apparatus as recited in claim 5, further comprising:
an agitating device that is configured to agitate each of the groups of articles and seasoning while the article group supplied with seasoning is being transported to said discharge part;
wherein,
said agitating device includes a comb-up member provided on said helical blade, and performs said agitation of each of the groups of articles and seasoning by combing the article group and seasoning upward by said comb-up member during rotation of said screw;
said screw rotating device is configured to reduce the rotational speed of the screw when said comb-up member performs said comb-up; and
said tube rotating device is configured to change the position of said discharge port, synchronized to the reduction of the rotational speed of said screw by said screw rotating device when said comb-up member performs said comb-up.

11. The seasoning apparatus as recited in claim 1, wherein said tube is transparent.

12. The seasoning apparatus as recited in claim 1, further comprising:
an electric charging device that is configured to charge electrically at least one of the groups of articles and the seasoning.

13. The seasoning apparatus as recited in claim 12, wherein
said tube is an electrical insulator.

14. The seasoning apparatus as recited in claim 1, wherein
said seasoning feeding unit is configured to supply a quantity of seasoning corresponding to a quantity of each of the groups of articles.

15. The seasoning apparatus as recited in claim 1, wherein
said transport unit has a screw that extends between said supply part and said discharge part, and a screw rotating device that is configured to rotate said screw about a rotary shaft; and
said control unit is configured to rotate said screw normally and reversely by controlling said screw rotating device.

16. The seasoning apparatus as recited in claim 15, wherein
said screw extends approximately horizontally between said supply part and said discharge part.

17. The seasoning apparatus as recited in claim 1, wherein
said control unit is configured to control said seasoning feeding device such that said seasoning feeding unit, in accordance with the reciprocating motion of the article group, supplies seasoning a plurality of times to the same article group.

18. The seasoning apparatus as recited in claim 15, further comprising:
an agitating device that is provided on said helical blade and configured to agitate each of the groups of articles and seasoning while the article group supplied with seasoning is being transported to said discharge part;
wherein,
said control unit is configured to control said screw rotating device so that a rotational speed of said screw decreases during an interval when said agitating device agitates the article group and seasoning.

19. The seasoning apparatus as recited in claim 2, wherein
a speed at which said screw rotating device rotates said screw is adjustable.

20. A seasoning apparatus that transports groups of articles supplied from an upstream apparatus to a downstream apparatus, said seasoning apparatus comprising:
a transport unit that has a supply part and a discharge part, accommodates each of the groups of articles supplied at said supply part in separate sections, and is configured to transport each of the groups of articles to said discharge part, the transport unit further having a tube and a solid helical blade which is installed within said tube and forms a plurality of solid partitions provided between said supply part and said discharge part to form said separate sections, such that the groups of articles are accommodated in said separate sections and transported by moving said partitions from said supply part toward said discharge part; and
a seasoning feeding unit that is configured to spray seasoning only between a first partition and a second partition of said plurality of partitions onto each of the groups of articles in said separate sections, said first partition adjacent to said second partition, wherein
said transport unit configured such that seasoning sprayed onto the groups of articles is incapable of moving between adjacent sections, and
there is at least one section whose area as viewed planarly is greater than a planar area of a section that is closer to said supply part.

21. The seasoning apparatus as recited in claim 20, wherein
said transport unit has a screw that extends between said supply part and said discharge part, and a screw rotating device that is configured to rotate said screw about a rotary shaft; and
there is at least one section whose spacing as partitioned by said plurality of partitions is wider than the spacing of a section that is closer to said supply part.

22. The seasoning apparatus as recited in claim 21, further comprising:
a plate provided on said helical blade in said section that has a wider spacing, said plate being configured to agitate an article group and seasoning.

23. The seasoning apparatus as recited in claim 22, wherein
said plate is approximately vertical before arriving directly above the rotary shaft of said screw by the rotation of said screw.

24. The seasoning apparatus as recited in claim 22, wherein
a tip part of said plate in the rotational direction is proximate to an inner surface of said tube, and is thinner than the rest of said plate.

25. The seasoning apparatus as recited in claim 22, wherein
said screw rotating device is controlled so that the rotational speed of said screw decreases during an interval when said plate agitates the article group and seasoning.

26. A seasoning apparatus that transports groups of articles supplied from an upstream apparatus to a downstream apparatus, said seasoning apparatus comprising:
a transport unit that has a supply part and a discharge part, accommodates each of the groups of articles supplied at said supply part in separate sections, and is configured to transport each of the groups of articles to said discharge part, the transport unit further having a tube and a solid helical blade which is installed within said tube and forms a plurality of solid partitions provided between said supply part and said discharge part to form said separate sections, such that the groups of articles are accommodated in said separate sections and transported by moving said partitions from said supply part toward said discharge part; and
a seasoning feeding unit that is configured to spray seasoning only between a first partition and a second partition of said plurality of partitions onto each of the groups of articles in said separate sections, said first partition adjacent to said second partition, wherein
said transport unit configured such that seasoning sprayed onto the groups of articles is incapable of moving between adjacent sections,
said transport unit has a screw that extends approximately horizontally between said supply part and said discharge part, and a screw rotating device that is configured to rotate said screw about a rotary shafts,
said screw has said helical blade that forms said plurality of partitions,
each of said sections is a space partitioned by said helical blade in said tube, and
in a portion of said helical blade that partitions a section wherein an article group supplied with seasoning is accommodated, a plate is provided that agitates the seasoning and the article group.

27. The seasoning apparatus as recited in claim 26, wherein
said plate is approximately vertical before arriving directly above the rotary shaft of said screw by the rotation of said screw.

28. The seasoning apparatus as recited in claim 26, wherein
a tip part of said plate in the rotational direction is proximate to an inner surface of said tube, and is thinner than the rest of said plate.

29. The seasoning apparatus as recited in claim 26, wherein
said screw rotating device is controlled so that the rotational speed of said screw decreases during an interval when said plate agitates the article group and seasoning.

30. A product manufacturing system comprising
said seasoning apparatus as recited in claim 26; and
a weighing apparatus that weighs articles and supplies the weighed groups of articles to said seasoning apparatus.

31. The product manufacturing system as recited in claim 30, wherein
said weighing apparatus creates article weight data for the groups of articles, and
said seasoning feeding unit is configured to supply seasoning to the groups of articles based on the article weight data from said weighing apparatus.

32. The product manufacturing system as recited in claim 30, further comprising:
a packaging apparatus that receives the groups of articles from said seasoning apparatus and packages the groups of articles discharged from said seasoning apparatus, wherein,
said weighing apparatus weighs a single package unit quantity of said packaging apparatus, divides the articles of said single package unit quantity into the plurality of groups of articles, and supplies the groups of articles to said seasoning apparatus, a quantity of articles in each of the groups of articles being a divided single package unit quantity of said packaging apparatus.

* * * * *